(12) United States Patent  (10) Patent No.: US 8,860,676 B2
Higashi et al.  (45) Date of Patent: Oct. 14, 2014

(54) DISPLAY CONTROL DEVICE, METHOD, PROGRAM, AND INTEGRATED CIRCUIT

(75) Inventors: Akio Higashi, Osaka (JP); Masaki Yamauchi, Osaka (JP); Susumu Kobayashi, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 438 days.

(21) Appl. No.: 13/257,453

(22) PCT Filed: Jan. 19, 2011

(86) PCT No.: PCT/JP2011/000246
§ 371 (c)(1),
(2), (4) Date: Sep. 19, 2011

(87) PCT Pub. No.: WO2011/093033
PCT Pub. Date: Aug. 4, 2011

(65) Prior Publication Data
US 2012/0013463 A1   Jan. 19, 2012

(30) Foreign Application Priority Data
Jan. 26, 2010 (JP) ................................. 2010-014651

(51) Int. Cl.
*G06F 3/041* (2006.01)
*H04N 21/41* (2011.01)
*H04N 21/422* (2011.01)
*G06F 3/0354* (2013.01)
*G06F 3/0488* (2013.01)

(52) U.S. Cl.
CPC ........ *G06F 3/04883* (2013.01); *H04N 21/4126* (2013.01); *H04N 21/42204* (2013.01); *G06F 3/03547* (2013.01); *H04N 21/4104* (2013.01)
USPC ........... 345/173; 345/156; 345/520; 345/672; 340/407.1; 340/500; 340/540; 178/2 R; 178/18.01

(58) Field of Classification Search
USPC ............... 340/500, 540, 407.1; 345/156, 173, 345/672; 341/22–24; 116/200, 205, 209; 715/863; 178/2 R, 18.01
See application file for complete search history.

(56) References Cited

U.S. PATENT DOCUMENTS

| | | | |
|---|---|---|---|
| 2005/0168489 A1* | 8/2005 | Ausbeck, Jr. ................. | 345/672 |
| 2006/0119585 A1* | 6/2006 | Skinner ......................... | 345/173 |
| 2006/0161871 A1* | 7/2006 | Hotelling et al. ............. | 715/863 |
| 2008/0048993 A1 | 2/2008 | Yano | |

FOREIGN PATENT DOCUMENTS

| | | |
|---|---|---|
| AU | 739713 | 5/1999 |
| GB | 2 331 204 | 5/1999 |

(Continued)

OTHER PUBLICATIONS

International Search Report issued May 10, 2011 in International (PCT) Application No. PCT/JP2011/000246.

*Primary Examiner* — Steven Lim
*Assistant Examiner* — Sisay Yacob
(74) *Attorney, Agent, or Firm* — Wenderoth, Lind & Ponack, L.L.P.

(57) ABSTRACT

The display control device is a display control device which receives a signal from the operating device having a touchpad and generates screen data to be displayed on a screen, the display control device including: a touch information detecting unit (201) which detects touch information including position information about a position on the touchpad that is touched with a finger of a user during operation of the touchpad; a direction determining unit (203) which determines a direction intended by the user, using a characteristic which is indicated by the touch information detected by the touch information detecting unit (201) and which results from the operation on the touchpad with the finger; and a screen data generating unit (205) which generates the screen data depending on the direction determined by the direction determining unit (203).

16 Claims, 29 Drawing Sheets

(56) References Cited

FOREIGN PATENT DOCUMENTS

| | | |
|---|---|---|
| JP | 10-301695 | 11/1998 |
| JP | 11-143604 | 5/1999 |
| JP | 2007-122287 | 5/2007 |
| JP | 2008-52062 | 3/2008 |
| JP | 2009-140210 | 6/2009 |

* cited by examiner

1000

1100

DISPLAY CONTROL DEVICE, METHOD, PROGRAM, AND INTEGRATED CIRCUIT

TECHNICAL FIELD

The present invention relates to a display control device which receives signals from an operating device having a touchpad a user operates with a user's finger, and generates screen data to be displayed on a screen.

BACKGROUND ART

In recent years, CE (Consumer Electronics) apparatuses such as digital TV (digital televisions) and BD (Blu-ray Disc) recorders have various functions thanks to compatibility with a network and the like. As a result, applications have been increasing which do not provide sufficiently comfortable operability in screen display apparatuses having operating devices such as conventional remote-control devices (remote control).

For instance, as an application used by a screen display apparatus, there is a web browser for browsing contents on the Internet. Furthermore, examples of such an application include a picture viewer for browsing, using a digital TV or a BD recorder, image data recorded on an SD (Secure Digital) card or the like. Moreover, the examples of the application include a keyboard application for inputting a search string when search or the like is performed with the web browser or the like.

There has been a growing need for new screen display apparatuses which are flexibly compatible with network-compatible applications to be newly developed in the future, in addition to such an application, and have a high operability.

For example, as an implementation of the new screen display apparatuses, there is a screen display apparatus which includes an operating device having a touchpad instead of a remote control having a conventional fixed hardware key. Such a screen display apparatus allows free pointing on a GUI (Graphical User Interface) displayed on a screen of a digital TV or the like. A cursor displayed on the GUI (a pointer indicating an operation position on the GUI) is designed to move in response to an operation of a user trailing a user's finger on the touchpad.

Consequently, the user can operate the GUI without looking at the user's hand, and thus can intuitively operate various applications without a complex operation and memorization of an arrangement of the hardware key of the screen display apparatus.

Among such new screen display apparatuses, there is a screen display apparatus including an operating device which is top-bottom and left-right symmetrical. The user can freely operate the screen display apparatus without concern for a direction to which the operating device is held (which side of the operating device the user recognizes as an anterior direction while holding the operating device) and a hand of the user with which the operating device is held (with which one of right hand and left hand the operating device is held). Even when the user holds the operating device in any direction, such a new screen display apparatus needs to properly control and display the cursor on the GUI in response to the operation of the user.

In the meantime, there are several techniques known as a technique of checking a direction of the operating device included in the conventional screen display apparatus. It is to be noted that when the operating device is physically integrated with the screen display apparatus, the direction of the operating device is the same as that of the screen display apparatus.

For instance, PTL 1 discloses, as the screen display apparatus, a mobile terminal which a user can operate with one hand.

The mobile terminal includes a state detecting unit which checks a state of the mobile terminal such as which part of the mobile terminal is held (also referred to as gripped) and which directions are upward and downward directions (upper and lower directions) of the mobile terminal. The state detecting unit checks the state of the mobile terminal, using a contact sensor (also referred to as a pressure sensor, gripping sensor, or touch sensor) and a gravity sensor (also referred to as an acceleration sensor) that are attached to the mobile terminal. The mobile terminal then determines a display direction of a screen using the state detection result of the state detecting unit.

In other words, the mobile terminal checks its direction based on the detection results of the contact sensor and the gravity sensor.

PTL 2 discloses, as the screen display apparatus, a mobile terminal apparatus which makes it possible to switch between display directions of a display unit in response to a button operation of a user or a state of holding the mobile terminal apparatus by the user. A pressure sensor which is provided to a peripheral part of the mobile terminal apparatus detects the state of holding the mobile terminal apparatus by the user. In other words, the mobile terminal apparatus checks its direction based on the clear instruction from the user or the detection result of the state of holding by the pressure sensor.

PTL 3 discloses, as the screen display apparatus, an electronic paper device of which outer peripheral part includes touch sensors, and which makes it possible to optimize a display direction depending on a way a user holds the electronic paper device.

PTL 3 discloses a technique of checking the direction of the electronic paper device using the touch sensors, which is the same as the techniques disclosed by PTL 1 and PTL 2. However, PTL 3 indicates, as a problem in a method of checking, using only touch sensors, a direction of a device, a case where upper and lower directions of display may be reversed depending on a way the user holds the device. In this regard, PTL 3 discloses that increasing accuracy of estimating, using a gravity sensor jointly, the way the user holds the device enables correct display.

CITATION LIST

Patent Literature

[PTL 1]
Japanese Unexamined Patent Application Publication No. 10-301695
[PTL 2]
Japanese Unexamined Patent Application Publication No. 11-143604
[PTL 3]
Japanese Unexamined Patent Application Publication No. 2008-52062

SUMMARY OF INVENTION

Technical Problem

However, the techniques disclosed by PTL 1, PTL 2, and PTL 3 cause a case where the direction of the operating device may be not correctly recognized. These techniques are the techniques of recognizing the direction of the operating device such as the remote control, using the detection result of the sensor, such as recognizing the direction of the screen display apparatus, using the acceleration sensor included in the same, and recognizing the direction in which the user holds the remote control, using the pressure sensor. Nevertheless, a case where the recognized direction does not match a direction intended by the user occurs depending on a way of holding by the user. As a result, there is the possibility that the operability of the user may deteriorate or the user may be confused.

Specifically, when the user operates the remote control, the user holds the remote control in a direction in which the user somewhat looks up to a screen. In such a case, a face of the remote control on a screen side is positioned higher than that of the remote control on a user side (front side). Then, the acceleration sensor included in the remote control detects that the face on the user side (front side) is a downward direction. Finally, the direction of the remote control is recognized as downward to the face on the user side (front side) based on a common holding method.

Thus, the direction of the remote control recognized by the screen display apparatus matches the actual direction of the remote control intended by the user. In other words, in this case, the direction of the remote control is correctly recognized.

However, conversely, when the user holds and operates the remote control in a direction in which the user somewhat looks down at the screen, the face of the remote control on the screen side is positioned lower than that of the remote control on the user side (front side). For this reason, the acceleration sensor detects that the face on the screen side is the downward direction. Finally, the direction of the remote control is recognized as downward to the face on the user side (front side) based on the common holding method.

Thus, the face of the remote control on the user side (front side) is recognized as the face on the screen side. In other words, the direction of the remote control is wrongly recognized as a direction reverse to the actual direction of the remote control intended by the user. Similarly, when the user operates the remote control while lying, there is the possibility that the acceleration sensor or the like do not correctly recognize the direction intended by the user.

When the direction of the remote control is wrongly recognized, the movement of the cursor on the GUI contradicts the intention of the user. For example, the upper and lower directions are reversed for the movement of the user's finger on the touchpad. Such wrong recognition confuses the user or causes the user to switch the remote control from one hand to the other. Thus, the user is deprived of comfortable operability of the remote control.

Moreover, the screen display apparatus disclosed by PTL 2 instructs the user to reverse the upper and lower directions of the remote control by causing the user to operate a button. In other words, the screen display apparatus causes the user to expressly specify the direction of the remote control. Such a method further troubles the user. Consequently, in this case also, the comfortable operability of the remote control cannot be achieved.

The present invention has an object to provide a display control device for properly displaying an image or the like on a screen according to a user's natural operation on an operating device that is operated in various directions.

Solution to Problem

In order to solve the above problems, a display control device according to an aspect of the present invention is a display control device which receives a signal from an operating device having a touchpad and generates screen data to be displayed on a screen, the display control device including: a touch information detecting unit configured to detect touch information including position information about a position on the touchpad that is touched with a finger of a user during operation of the touchpad; a direction determining unit configured to determine a direction intended by the user, using a characteristic which is indicated by the touch information detected by the touch information detecting unit and which results from the operation on the touchpad with the finger; and a screen data generating unit configured to generate the screen data depending on the direction determined by the direction determining unit.

With this configuration, the display control device determines the direction intended by the user at the time of operation, from the characteristic resulting from the operation with the finger, e.g. a characteristic of an operation based on the structure of the human hand such as the way a thumb is attached. Thus, the display control device makes it possible to recognize the direction intended by the user, based on a natural operation by the user. Consequently, the display control device makes it possible to properly display an image or the like on a screen based on the recognized direction.

Moreover, the direction determining unit may determine, using the characteristic, the direction that is an upward, downward, left, or right direction on the touchpad as viewed by the user.

With this configuration, the display control device makes it possible to properly display the image or the like on the screen based on the direction that is the upward, downward, left, or right direction on the touchpad.

Moreover, the direction determining unit may determine, using the characteristic, the direction that is a direction of the operating device.

With this configuration, the display control device makes it possible to properly display the image or the like on the screen based on the direction of the operating device.

Moreover, the display control device further includes a touch information accumulation unit configured to accumulate a plurality of touch information items including the touch information detected by the touch information detecting unit, wherein the direction determining unit may determine the direction using the characteristic indicated by the touch information items accumulated by the touch information accumulation unit.

With this configuration, the display control device makes it possible to determine the direction intended by the user, using a more detailed characteristic based on the touch information items. Consequently, the display control device makes it possible to more properly display the image or the like on the screen.

Moreover, the direction determining unit may determine the direction using the characteristic that is a shape of a trajectory formed by a transition indicated by a plurality of position information items in the touch information items.

With this configuration, the display control device makes it possible to determine the direction intended by the user, based on the trajectory formed according to the natural operation with the finger.

Moreover, the direction determining unit may determine the direction such that (i) when the trajectory is convex, a convex side of the trajectory is an upper side or (ii) when the trajectory is concave, a concave side of the trajectory is a lower side.

With this configuration, the display control device makes it possible to directly determine the direction intended by the user, from the shape of the trajectory.

Moreover, the direction determining unit may determine the direction using the characteristic that is a distribution indicated by a plurality of position information items in the touch information items.

With this configuration, the display control device makes it possible to determine the direction intended by the user, based on the distribution of the position information items obtained according to the natural operation with the finger.

Moreover, the display control device further includes a cursor position determining unit configured to determine a display position of a cursor indicating a pointing position on the screen, from the position information in the touch information detected by the touch information detecting unit, wherein the cursor position determining unit may determine the display position depending on the direction determined by the direction determining unit, and the screen data generating unit may generate the screen data for displaying the cursor at the display position determined by the cursor position determining unit.

With this configuration, the display control device makes it possible to display the cursor at the appropriate position based on the direction intended by the user.

Moreover, the cursor position determining unit may correct, when the direction determined by the direction determining unit is different from a predetermined direction for the operating device, the display position determined by the position information and the predetermined direction, to determine the display position.

With this configuration, when the user is operating the touchpad in a direction different from the predetermined direction, the cursor is displayed at the appropriate position.

Moreover, the display control device further includes an alert data generating unit configured to generate alert data for notifying the user of an alert, wherein the alert data generating unit may generate the alert data when the direction determined by the direction determining unit is different from a predetermined direction for the operating device.

With this configuration, when the user is trying to operate the touchpad in a wrong direction, the user can learn the mistake.

Moreover, the display control device further includes a sensor information detecting unit configured to detect held-part information that is information about part of the operating device held by the user, from a sensor provided at an outer periphery of the operating device and detecting a touch by the user, wherein the direction determining unit may determine the direction depending on the characteristic and the held-part information detected by the sensor information detecting unit.

With this configuration, the direction is recognized more properly based on the held-part information about the part of the operating device held by the user and the information obtained from the natural operation by the user.

Moreover, the display control device further includes a sensor information detecting unit configured to detect gravity direction information that is information about a gravity direction of gravity on the operating device, from a sensor detecting the gravity direction, wherein the direction determining unit may determine the direction depending on the characteristic and the gravity direction information detected by the sensor information detecting unit.

With this configuration, the direction is recognized more properly based on the gravity direction information about the gravity on the operating device and the information obtained from the natural operation by the user.

Moreover, the display control device further includes an alert data generating unit configured to generate alert data for notifying the user of an alert; and a sensor information detecting unit configured to detect held-part information that is information about part of the operating device held by the user, from a sensor provided at an outer periphery of the operating device and detecting a touch by the user, wherein the alert data generating unit may generate the alert data when a direction estimated, based on the held-part information detected by the sensor information detecting unit, as the direction intended by the user is different from the direction determined by the direction determining unit.

With this configuration, the display control device makes it possible to verify validity of the direction determined according to the natural operation by the user, using the held-part information about the part of the operating device held by the user. Thus, a more certain direction can be obtained.

Moreover, the display control device further includes an alert data generating unit configured to generate alert data for notifying the user of an alert; and a sensor information detecting unit configured to detect gravity direction information that is information about a gravity direction of gravity on the operating device, from a sensor detecting the gravity direction, wherein the alert data generating unit may generate the alert data when a direction estimated, based on the gravity direction information detected by the sensor information detecting unit, as the direction intended by the user is different from the direction determined by the direction determining unit.

With this configuration, the display control device makes it possible to verify validity of the direction determined according to the natural operation by the user, the gravity direction information about the gravity on the operating device. Thus, a more certain direction can be obtained.

Moreover, the display control device further includes an alert data generating unit configured to generate after data for notifying the user of an alert; and a sensor information detecting unit configured to detect, from a first sensor, held-part information that is information about part of the operating device held by the user, and detect, from a second sensor, gravity direction information that is information about a gravity direction of gravity on the operating device, the first sensor being provided at an outer periphery of the operating device and detecting a touch by the user, and the second sensor detecting the gravity direction, wherein the cursor position determining unit may determine the display position depending on the direction determined by the direction determining unit, when a direction estimated, based on the held-part information and the gravity direction information detected by the sensor information detecting unit, as the direction intended by the user matches the direction determined by the direction determining unit, and the alert data generating unit may generate the alert data when the direction estimated, based on the held-part information and the gravity direction information detected by the sensor information detecting unit, as the direction intended by the user does not match the direction determined by the direction determining unit.

With this configuration, when the direction is recognized properly, the cursor is displayed at the appropriate position, and when the direction is not recognized properly, the user can learn the failure in recognition.

Moreover, the touch information detecting unit may receive a signal from the operating device having two touchpads, and detect two touch information items each including position information about a position on one of the two touchpads which is touched with one of fingers of a user during operation of the two touchpads, and wherein, when two characteristics respectively indicated by the two touch information items detected by the touch information detecting unit match each other, the direction determining unit may determine the direction using one of the two characteristics.

With this configuration, the display control device makes it possible to more properly determine the direction intended by the user, using the touchpad information items.

A display control method according to another aspect of the present invention is a display control method for receiving a signal from an operating device having a touchpad, and generating screen data to be displayed on a screen, the display control method including: detecting touch information including position information about a position on the touchpad that is touched with a finger of a user during operation of the touchpad; determining a direction intended by the user, using a characteristic which is indicated by the touch information detected in the detecting and which results from the operation on the touchpad with the finger; and generating the screen data depending on the direction determined in the determining.

With this, the display control device is realized as the display control method.

A program according to still another aspect of the present invention may be a program causing a computer to execute the display control method.

With this, the display control method is realized as the program.

An integrated circuit according to yet another aspect of the present invention is an integrated circuit which receives a signal from an operating device having a touchpad and generates screen data to be displayed on a screen, the integrated circuit including: a touch information detecting unit configured to detect touch information including position information about a position on the touchpad that is touched with a finger of a user during operation of the touchpad; a direction determining unit configured to determine a direction intended by the user, using a characteristic which is indicated by the touch information detected by the touch information detecting unit and which results from the operation on the touchpad with the finger; and a screen data generating unit configured to generate the screen data depending on the direction determined by the direction determining unit.

With this, the display control device is realized as the integrated circuit.

Advantageous Effects of Invention

The present invention allows the image or the like to be properly displayed on the screen according to the natural operation by the user on the operating device that is operated in various directions. As a result, the comfortable operability for the user is assured. Moreover, additional costs can be reduced by using an original function of the operating device, that is, input to a touchpad by the user. In other words, it is possible to achieve both increase in the operability for the user and reduction in the additional costs.

DESCRIPTION OF EMBODIMENTS

The following describes embodiments of the present invention with reference to the drawings.

Embodiment 1

A screen display apparatus according to Embodiment 1 recognizes a direction (also referred to as an orientation) of an operating device including a touchpad, using a trajectory shape of plural position information items (coordinates) each indicating an input on the touchpad by a user. The screen display apparatus corrects display information of a cursor on a screen (a pointer indicating an operation position on a GUI) based on the direction of the operating device.

Figure 1:
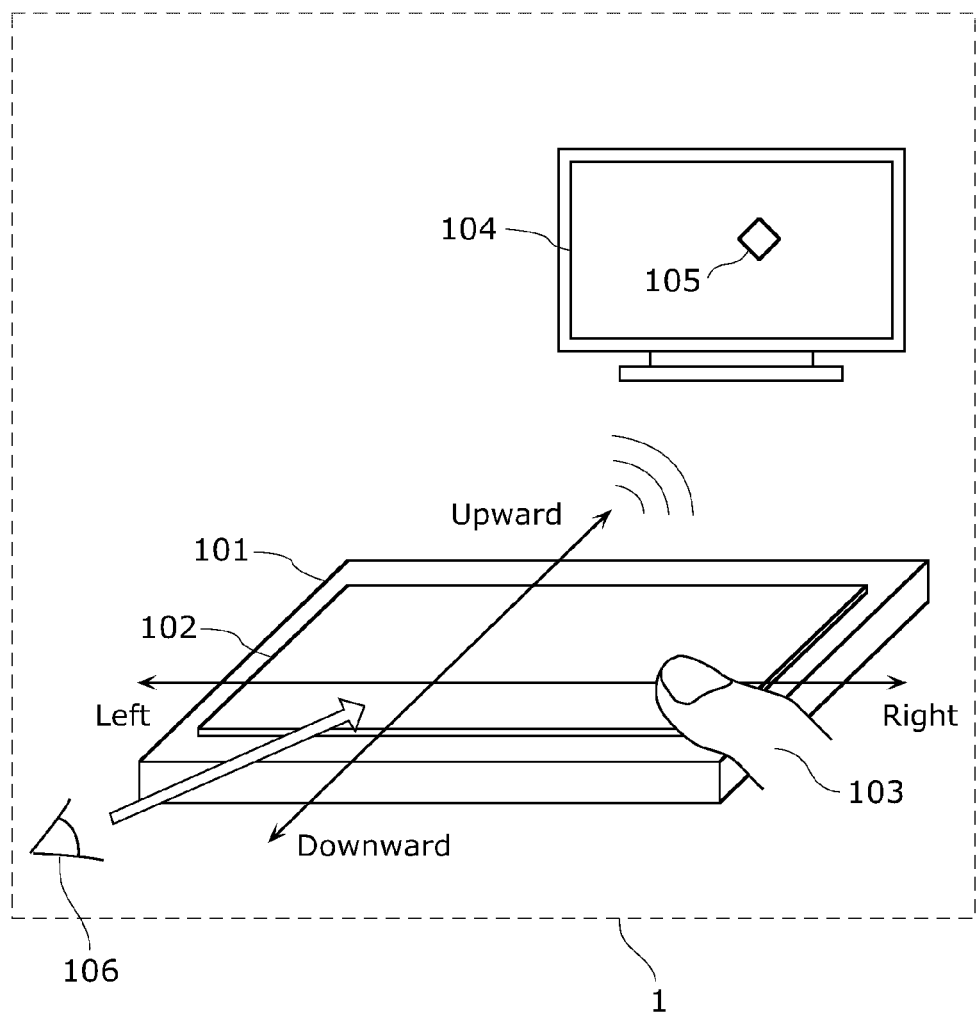
FIG. 1 is a schematic diagram of a screen display apparatus according to Embodiment 1.

FIG. 1 is a schematic diagram of a screen display apparatus according to Embodiment 1. A screen display apparatus 1 shown in FIG. 1 receives an input from a user, and displays a cursor 105 or the like on a screen 104.

A remote control 101 is an example of an operating device with which the user operates a GUI on the screen 104. The remote control 101 includes a touchpad 102 which receives an input by a user's finger 103.

A method of detecting variation of capacitance or the like performs an input receiving process by the touchpad 102. The process is a publicly known technique, and thus a description thereof is omitted here. The remote control 101 transmits signals to the screen 104 through wireless communication such as Bluetooth and ZigBee/IEEE802.15.4. The technique of transmitting a signal is also a publicly known technique, and thus a description thereof is omitted here.

When the user touches the touchpad 102 with the finger 103, the touch position on the touchpad 102 is detected as position information represented by an x coordinate and a y coordinate. A coordinate system on the touchpad 102 corresponds one-on-one to a coordinate system on the screen 104. For this reason, the screen display apparatus 1 can calculate a value of coordinates of the cursor 105 on the screen 104 based on the detected position information. It is to be noted that examples of the touch by the finger 103 include an indirect touch via a glove or the like.

FIG. 1 also shows upward, downward, left, and right directions on the touchpad 102 as viewed with user's eyes 106. It is assumed that a direction intended when the user operates the touchpad 102 indicates the upward, downward, left, or right direction shown in FIG. 1. In other words, it is assumed that the direction intended by the user is the upward, downward, left, or right direction on the touchpad 102 as viewed by the user. The screen display apparatus 1 recognizes such a direction, and displays the cursor 105 at an appropriate position based on the recognized direction.

The direction intended by the user can be referred to as a direction intended by the user with respect to the operating device, that is, a direction of the operating device. The directions shown in FIG. 1 are directions of the operating device such as the remote control 101.

It is to be noted that the operating device may have predetermined upward, downward, left, and right directions. The predetermined direction of the operating device typically corresponds to a display direction of a logo attached to the operating device. A direction of the operating device may be quantitatively expressed by a rotation angle with reference to the predetermined direction.

Figure 2:
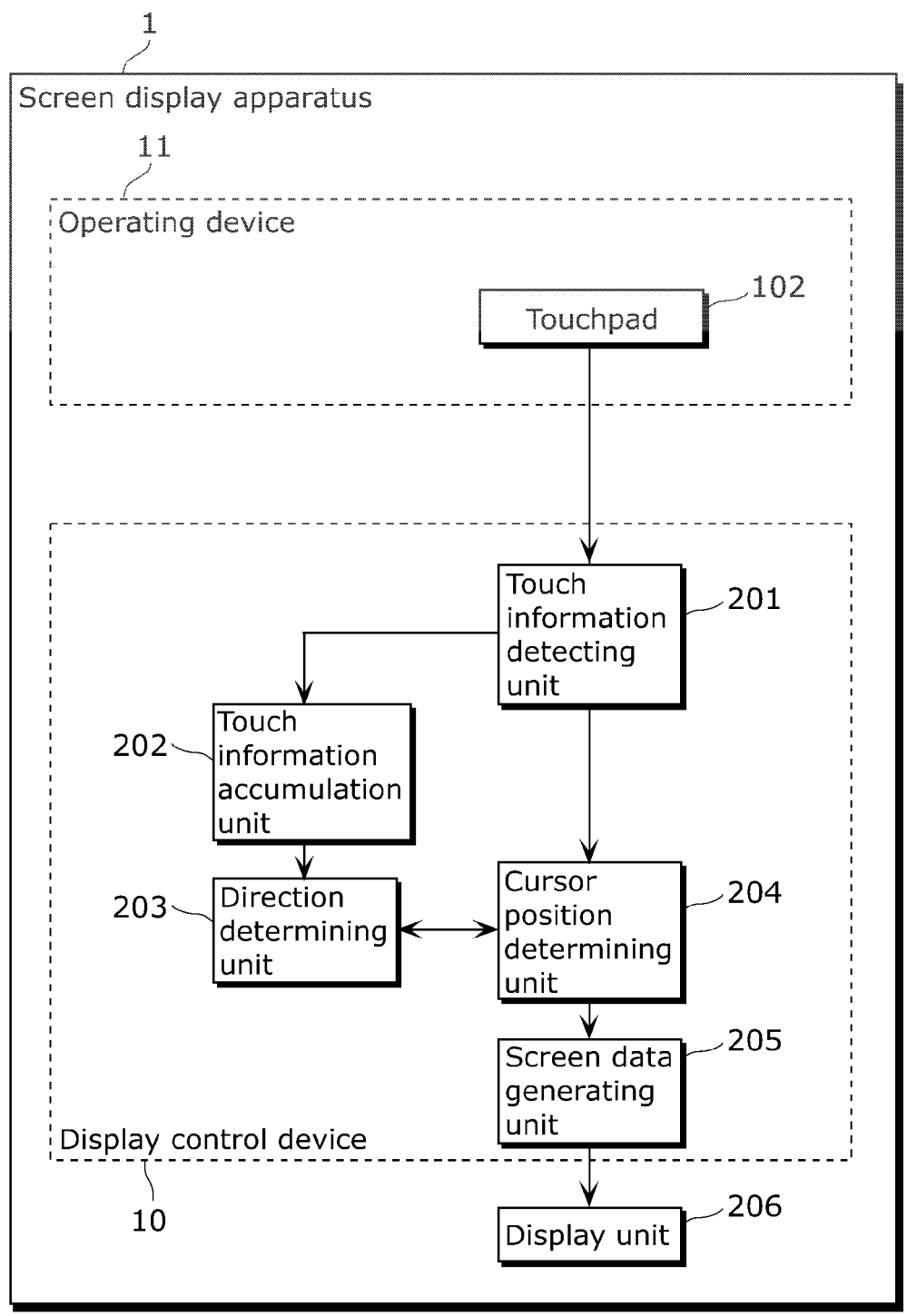
FIG. 2 is a configuration diagram of the screen display apparatus according to Embodiment 1.

FIG. 2 is a configuration diagram of the screen display apparatus 1 according to Embodiment 1 which is shown in FIG. 1. In FIG. 2, the same reference signs are assigned to the same constituent elements as in FIG. 1, and a description thereof is omitted.

The screen display apparatus 1 shown in FIG. 2 includes the touchpad 102, a touch information detecting unit 201, a touch information accumulation unit 202, a direction determining unit 203, a cursor position determining unit 204, a screen data generating unit 205, and a display unit 206.

An operating device 11 shown in FIG. 2 is realized by the remote control 101 or the like, and includes the touchpad 102. Moreover, a display control device 10 includes the touch information detecting unit 201, the touch information accumulation unit 202, the direction determining unit 203, the cursor position determining unit 204, and the screen data generating unit 205.

The display control device 10 receives signals from the operating device 11, and generates screen data for displaying an image or the like on the screen 104. It is to be noted that the display control device 10 may be incorporated into the operating device 11 or the display unit 206.

The touch information detecting unit 201 is a unit which detects touch information including position information that is an x coordinate and a y coordinate which indicate at least a touch position on the touchpad 102, in response to a touch operation or a click operation on the touchpad 102 by the user. Here, although the touch information detecting unit 201 is included in the display control device 10, the touch information detecting unit 201 may be included in the operating device 11. The touch information detecting unit 201 detects the touch information at predetermined time intervals, and transmits the detected touch information to the touch information accumulation unit 202. A composition example of the touch information is described in detail later with reference to FIG. 3.

The touch information accumulation unit 202 includes, for example, a storage unit, and is a unit which accumulates the touch information received from the touch information detecting unit 201. The touch information accumulation unit 202 accumulates, in chronological order or the like, touch information generated during a predetermined time period or having a predetermined amount so that the direction determining unit 203 can determine a direction of the operating device 11 using the touch information. A composition example of a touch information table for accumulating the touch information is described in detail later with reference to FIG. 4.

The direction determining unit 203 is a unit which determines the direction of the operating device 11 based on the touch information accumulated in the touch information accumulation unit 202. Specifically, the direction determining unit 203 determines which face of the operating device 11 points to a side of the screen 104, by analyzing the touch information based on predetermined algorithm. The algorithm is described in detail later with reference to FIG. 6.

It is to be noted that, hereafter, although the direction determining unit 203 can basically determine the direction of the operating device 11 using touch information obtained through an operation of naturally touching a touchpad by the user, the present invention is not limited to this. Such touch information is obtained at a moment when the user starts holding the operating device 11, when an application is switched, when a holding direction of the operating device 11 is changed while an application is being used, or the like.

The cursor position determining unit 204 is a unit which calculates a position of the cursor 105 to be displayed on the screen 104, from the direction of the operating device 11 determined by the direction determining unit 203 and the touch information detected by the touch information detecting unit 201. In other words, the cursor position determining unit 204 determines the display position of the cursor 105 indicating a pointing position on the screen 104, from the position information included in the touch information.

When the direction determining unit 203 determines that the user does not hold the operating device 11 in a "correct direction", that is, the user holds the operating device 11 in a "reverse direction", the cursor position determining unit 204 converts (coordinate converts) values of the position information included in the touch information. Consequently, the cursor position determining unit 204 corrects the position information so that the cursor 105 moves in the same manner as in the case where the user holds the operating device 11 in the "correct direction".

On the other hand, when the direction determining unit 203 determines that the user holds the operating device 11 in the "correct direction", the cursor position determining unit 204 does not correct the position information.

It is to be noted that here the "correct direction" indicates a direction matching a direction of a coordinate system on the touchpad 102. To put it differently, the "correct direction" refers to a state where the direction intended by the user matches a predetermined direction of the operating device 11.

In contrast, the "reverse direction" refers to a state where the direction intended by the user is the exact reverse of the predetermined direction of the operating device 11. A "right direction" refers to a state where an upward direction intended by the user is a predetermined right direction of the operating device 11. A "left direction" refers to a state where the upward direction intended by the user is a predetermined left direction of the operating device 11.

Moreover, the cursor position determining unit 204 determines the display position of the cursor 105 (a cursor position) on the screen 104 using the position information received from the touch information detecting unit 201 or the position information corrected by the cursor position determining unit 204.

The screen data generating unit 205 is a unit which generates screen data based on the display position of the cursor 205 or the like determined by the cursor position determining unit 204. Specifically, the screen data generating unit 205 generates the screen data to be displayed by the display unit 206, by superimposing an image of an application such as a video viewer and a web browser on a cursor image.

The display unit 206 is a unit which displays, as an image or the like, the screen data received from the screen data generating unit 205. The display unit 206 is, for example, a screen of a digital TV. It is to be noted that the display unit 206 may be outside the screen display apparatus 1.

This is the end of the description of the configuration of the screen display apparatus 1 according to Embodiment 1.

Figure 3:
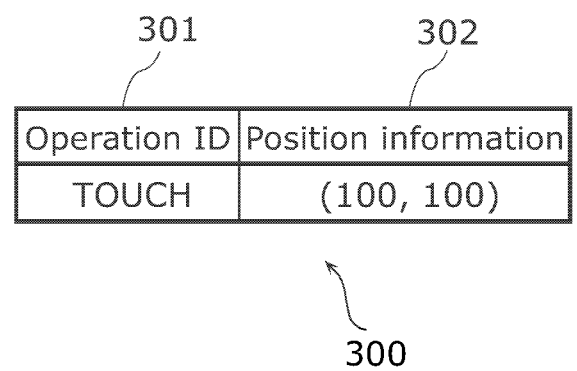
FIG. 3 is a diagram showing a composition example of touch information according to Embodiment 1.

The following describes touch information detected by the touch information detecting unit 201 with reference to FIG. 3.

FIG. 3 is a diagram showing a composition example of touch information. Touch information 300 shown in FIG. 3 includes an operation ID 301 and position information 302.

The operation ID 301 is an ID indicating a type of an operation performed on the touchpad 102 by a user. Examples of the operation ID 301 include "TOUCH" indicating a touch operation on the touchpad 102 and "CLICK" indicating a click operation on the touchpad 102.

The position information 302 includes a value of an x coordinate and a value of a y coordinate on the touchpad 102 on which an operation indicated by the operation ID 301 is performed, and is expressed in a format of (value of x coordinate, value of y coordinate).

FIG. 3 illustrates the touch information 300 indicating that "the touch operation on the touchpad 102 has occurred at (100, 100)".

This is the end of the description of the composition example of the touch information 300.

Figure 4:
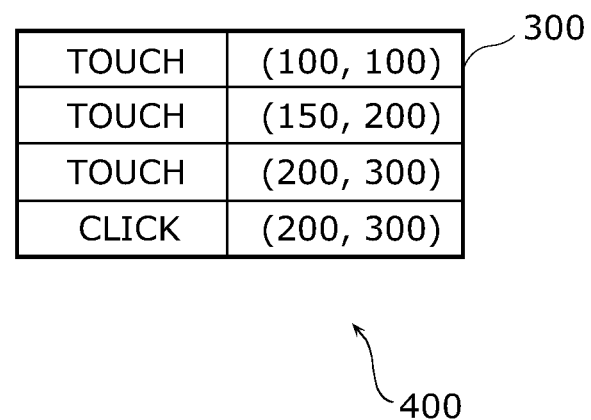
FIG. 4 is a diagram showing a composition example of a touch information table according to Embodiment 1.

The following describes the touch information table which is shown in FIG. 2 and held by the touch information accumulation unit 202 with reference to FIG. 4.

FIG. 4 is a diagram showing a composition example of the touch information table which is shown in FIG. 2 and held by the touch information accumulation unit 202. A touch information table 400 shown in FIG. 4 is stored in a RAM (Random Access Memory), a flash memory, or the like.

The touch information 300 received from the touch information detecting unit 201 is accumulated in the touch information table 400 in chronological order. Specifically, each time the touch information 300 is received from the touch information detecting unit 201, the touch information accumulation unit 202 adds the received touch information 300 to the touch information table 400.

An example shown in FIG. 4 indicates the following: (i) "a touch operation on the touchpad 102 has occurred at (100, 100)"; (ii) "a touch operation on the touchpad 102 has occurred at (150, 200)"; (iii) "a touch operation on the touchpad 102 has occurred at (200, 300)"; and (iv) "a click operation on the touchpad 102 has occurred at (200, 300)".

Here, the touch information detecting unit 201 detects a touch operation and a click operation on the touchpad 102 at predetermined time intervals. For this reason, movements of the user's finger are interpreted as "touching the touchpad 102 at (100, 100), moving to (200, 300) via (150, 200) with the touchpad 102 touched, and clicking the touchpad 102 at (200, 300)", from the touch information table 400 shown in FIG. 4.

It is to be noted that when a predetermined time elapses, the touch information accumulation unit 202 may periodically delete old touch information 300 from the touch information table 400. Moreover, in the case where an amount of accumulated touch information exceeds a predetermined amount when new touch information 300 is received from the touch information detecting unit 201, the touch information accumulation unit 202 may update the old touch information 300 with the new touch information 300.

This is the end of the description of the composition example of the touch information table 400.

Figure 5:
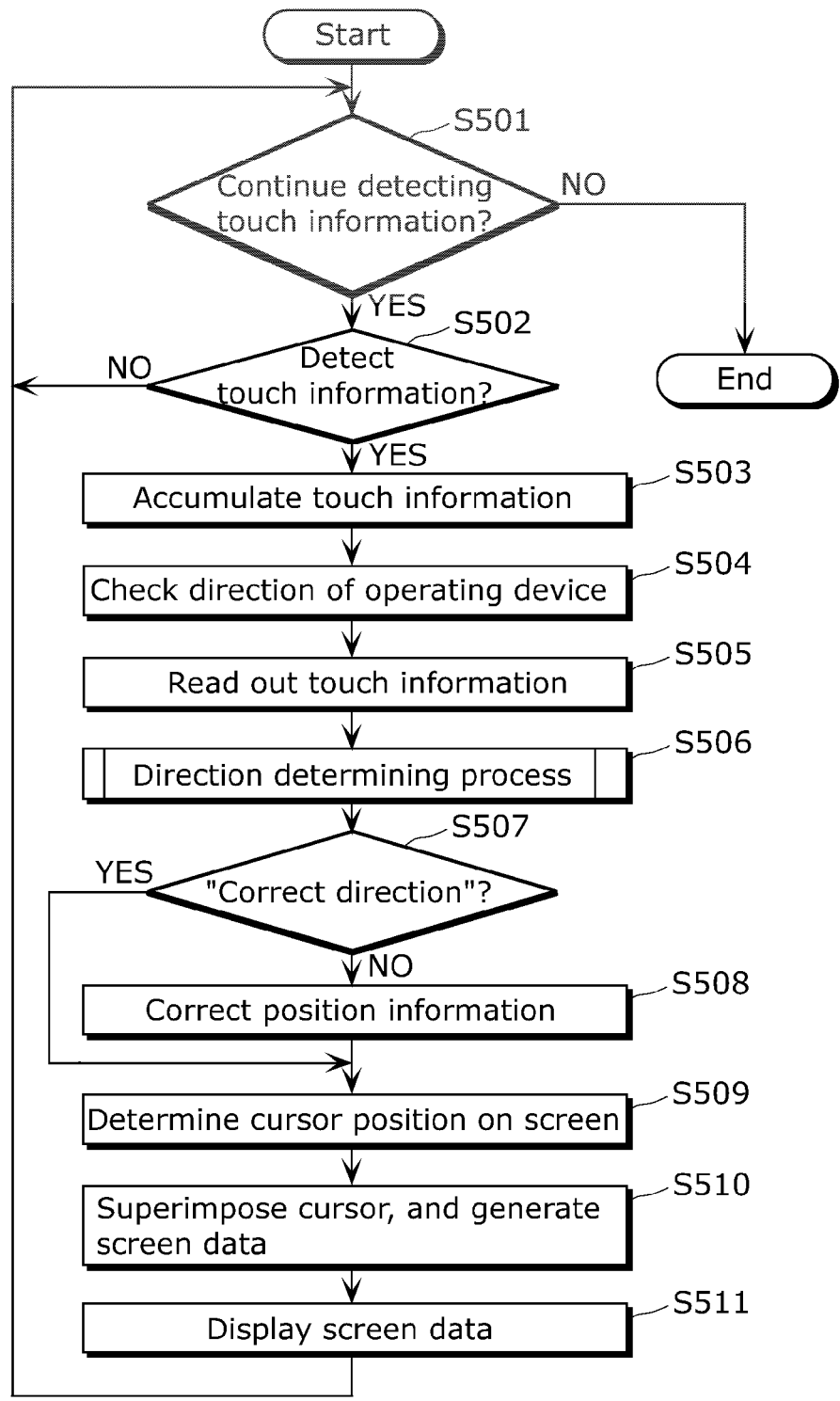
FIG. 5 is diagram showing a whole process flow of the screen display apparatus according to Embodiment 1.

The following describes a process flow of the screen display apparatus 1 according to Embodiment 1 with reference to FIG. 5.

FIG. 5 is a whole process flow of the screen display apparatus 1 according to Embodiment 1 which is shown in FIG. 2.

First, the touch information detecting unit 201 of the screen display apparatus 1 checks whether or not to continue detecting an input to the touchpad 102, based on an instruction from an instruction unit not shown in FIG. 2 (S501).

Here, when the touch information detecting unit 201 is instructed to discontinue detecting the input to the touchpad 102 (NO in S501), the screen display apparatus 1 ends the process.

On the other hand, when the touch information detecting unit 201 is instructed to continue detecting the input to the touchpad 102 (YES in S501), the touch information detecting unit 201 checks the presence or absence of the input to the touchpad 102. Then, the touch information detecting unit 201 detects the presence or absence of the touch information 300 shown in FIG. 3 (S502).

Here, when the touch information detecting unit 201 detects "the absence of the touch information" (NO in S502), the touch information detecting unit 201 checks again whether or not to continue detecting the input (S501).

On the other hand, when the touch information detecting unit 201 detects "the presence of the touch information" (YES in S502), the touch information detecting unit 201 causes the touch information accumulation unit 202 to accumulate the touch information 300 (S503). More specifically, the touch information detecting unit 201 adds the touch information 300 to the touch information table 400 shown in FIG. 4. Moreover, the touch information detecting unit 201 transmits the detected touch information 300 to the cursor position determining unit 204, for cursor display on the screen.

Next, after the cursor position determining unit 204 receives the touch information 300 from the touch information detecting unit 201, the cursor position determining unit 204 determines whether or not it is necessary to correct the position information 302 in the touch information 300. For that purpose, the cursor position determining unit 204 checks a direction of the operating device 11 with the direction determining unit 203 (S504).

Next, after the cursor position determining unit 204 checks with the direction determining unit 203, the direction determining unit 203 accesses the touch information table 400 of the touch information accumulation unit 202 to read out the touch information 300 (S505). Here, the direction determining unit 203 reads out touch information 300 generated during a predetermined time period or touch information 300 having a predetermined amount which is set to the direction determining unit 203 in advance.

It is to be noted that the touch information accumulation unit 202 sequentially accumulates the touch information 300 received from the touch information detecting unit 201 at the predetermined time intervals. This makes it possible to obtain, by calculation, an amount of touch information generated during a predetermined time period.

Moreover, when the direction determining unit 203 reads out the touch information 300, the touch information accumulation unit 202 may cause the direction determining unit 203 or the like to temporarily hold the read touch information 300. The touch information accumulation unit 202 may read out only a difference from touch information 300 to be newly required. This reduces an amount of the touch information 300 to be read out subsequently.

The direction determining unit 203 determines the direction of the operating device 11 using the touch information 300 read out in the touch information readout process (S505) (S506: a direction determining process). Subsequently, the direction determining unit 203 notifies the cursor position determining unit 204 of the determined direction of the operating device 11. The direction determining process is described in detail later with reference to FIG. 6.

The cursor position determining unit 204 receives the direction of the operating device 11 from the direction determining unit 203, and judges whether or not the direction of the operating device 11 is the "correct direction" (S507).

Here, when the direction of the operating device 11 is the "correct direction" (YES in S507), the cursor position determining unit 204 performs a process of determining a cursor position on a screen (S509).

On the other hand, when the direction of the operating device 11 is other than the "correct direction" (NO in S507), the cursor position determining unit 204 corrects the position information 302 in the touch information 300 received from the touch information detecting unit 201, based on the direction of the operating device 11 (S508: a position information correcting process). In this case, the cursor position determining unit 204 corrects the position information 302 so that the cursor is displayed at the same position as in the case where the direction of the operating device 11 is the "correct direction". The position information correcting process is described in detail later.

Next, the cursor position determining unit 204 determines the cursor position on the screen using the position information 302 in the touch information 300 received from the touch information detecting unit 201 or the corrected position information 302 (S509). Specifically, the cursor position determining unit 204 determines the cursor position by obtaining, from the maximum value and the minimum value in each of a coordinate system of the touchpad 102 and a coordinate system on a screen display, a magnification ratio between the coordinate system of the touchpad 102 and the coordinate system on the screen display.

In other words, the cursor position determining unit 204 determines, for each of an x coordinate and a y coordinate of the position information, the cursor position on the screen through the following calculation: (the cursor position on the screen display)=(the cursor position on the touchpad 102)×{(the maximum value of the coordinate system on the screen display)−(the minimum value of the coordinate system on the screen display)}/{(the maximum value of the coordinate system on the touchpad 102)−(the minimum value of the coordinate system on the touchpad 102)}.

Subsequently, the cursor position determining unit 204 notifies the screen data generating unit 205 of the x coordinate and the y coordinate of the determined cursor position.

The screen data generating unit 205 generates screen data by superimposing a cursor image on a video, an animation, or the like to be displayed by the display unit 206, based on the cursor position notified by the cursor position determining unit 204 (S510). Then, the screen data generating unit 205 transmits the generated screen data to the display unit 206.

The display unit 206 displays, on the screen or the like, the screen data received from the screen data generating unit 205 (S511). After this process ends, the touch information detecting unit 201 performs again the process of checking whether or not to continue detecting the input to the touchpad 102 (S501).

This is the end of the description of the whole process flow of the screen display apparatus 1 which is shown in FIG. 5.

Figure 6:
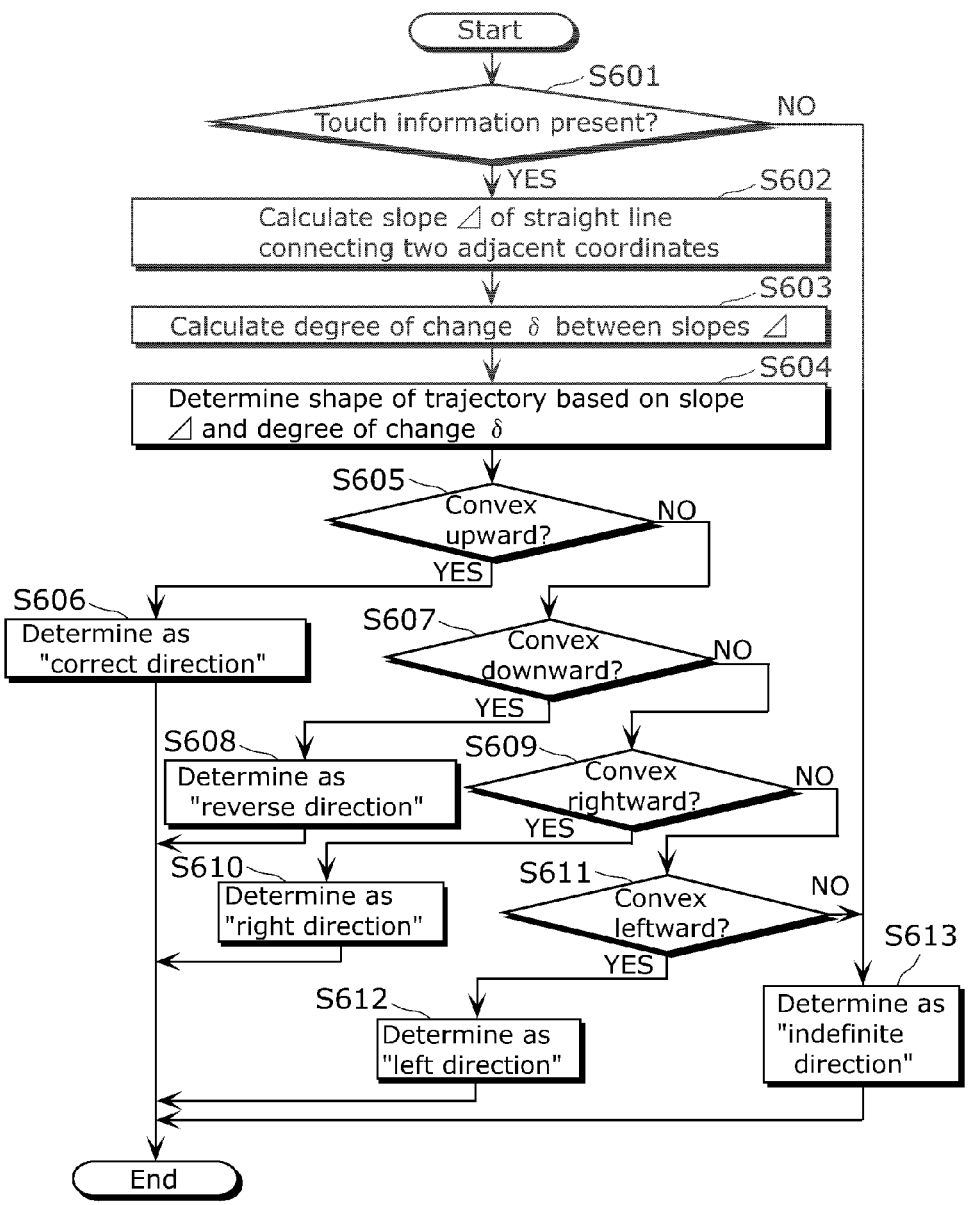
FIG. 6 is a diagram showing a direction determination process flow in a direction determining unit according to Embodiment 1.
Figure 7A:
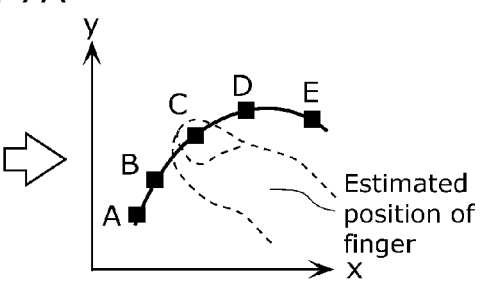
FIG. 7A is an explanatory diagram showing a first example of a trajectory shape determining process in the direction determining unit according to Embodiment 1.
Figure 7B:
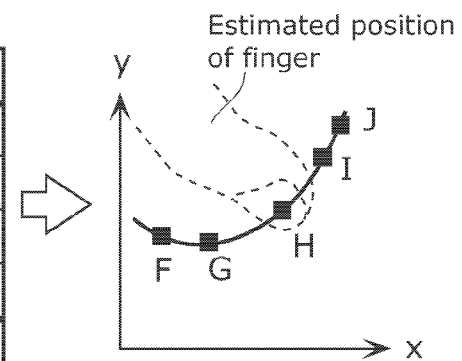
FIG. 7B is an explanatory diagram showing a second example of a trajectory shape determining process in the direction determining unit according to Embodiment 1.
Figure 7C:
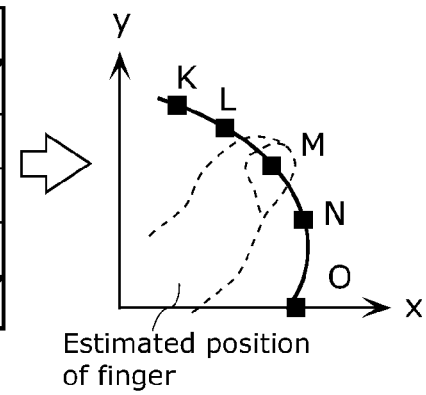
FIG. 7C is an explanatory diagram showing a third example of a trajectory shape determining process in the direction determining unit according to Embodiment 1.
Figure 7D:
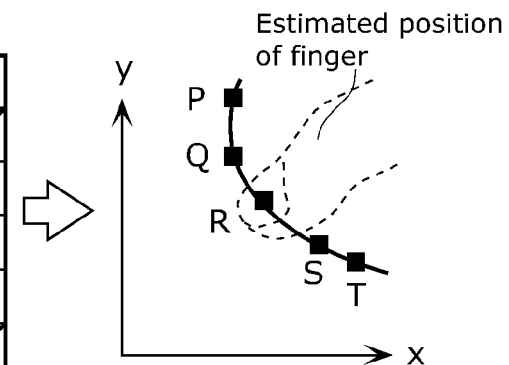
FIG. 7D is an explanatory diagram showing a fourth example of a trajectory shape determining process in the direction determining unit according to Embodiment 1.

The following describes the direction determining process (S506) shown in FIG. 5 with reference to FIGS. 6 to 7D. Hereafter, plural position information items 302 in plural touch information items 300 read out in the touch information readout process (S505) shown in FIG. 5 are arranged in chronological order, and line segments each of which connects two adjacent points of position information items among the plural position information items are collectively referred to as a "trajectory".

FIG. 6 is a diagram showing a direction determining process flow in the direction determining unit 203 shown in FIG. 2.

First, the direction determining unit 203 checks the presence or absence of the touch information 300 read out from the touch information table 400 (S601).

Here, when the read touch information 300 is absent (NO in S601), the direction determining unit 203 determines a direction of the operating device 11 as an "indefinite direction" (S613).

On the other hand, when the read touch information 300 is present (YES in S601), the direction determining unit 203 calculates, for the touch information 300 read out in the preceding process (S601), a slope Δ of a line segment connecting two points of position information items 302 on a trajectory (S602).

The slope Δ is calculated as (Slope Δ)=(yb−ya)/(xb−xa), where position information items of two points A and B adjacent to each other in chronological order are A (xa, ya) and B (xb, yb). However, here, signs of (yb−ya) and (xb−xa) are considered. In other words, the calculated slope Δ is held in association with its positive and negative. In this manner, the direction determining unit 203 calculates slopes Δ for all of read touch information items 300.

Next, the direction determining unit 203 calculates, for the slope Δ calculated in the preceding process (S602), a degree of change δ between two slopes Δ adjacent to each other in chronological order (S603). The degree of change δ is calculated as (Degree of Change δ)=ΔB-ΔA, where the two slopes Δ adjacent to each other in chronological order are ΔA and ΔB. The direction determining unit 203 calculates degrees of change δ for all of slopes Δ calculated in the preceding process (S602).

The direction determining unit 203 determines a shape of a trajectory from the position information 302, the slope Δ, and the degree of change δ (S604: a trajectory shape determining process). The trajectory shape determining process is described in detail later with reference to FIGS. 7A to 7D.

The direction determining unit 203 checks whether or not the shape of the trajectory determined in the trajectory shape determining process (S604) is "convex upward" (S605).

Here, when the shape of the trajectory is "convex upward" (YES in S605), the direction determining unit 203 determines a direction of the user's finger 103 as the upward direction of the touchpad 102 (the same as a direction in the coordinate system of the touchpad 102), in view of structural characteristics or the like of a person's finger.

Moreover, it is considered that a direction of the operating device 11 intended by the user matches the direction of the user's finger 103. Thus, the direction determining unit 203 determines the direction of the operating device 11 as the "correct direction" (S606). Then, the direction determining unit 203 notifies the cursor position determining unit 204 of the determined direction of the operating device 11, and ends this process.

On the other hand, when the shape of the trajectory determined in the trajectory shape determining process (S604) is not "convex upward" (NO in S605), the direction determining unit 203 checks whether or not the shape of the trajectory is "convex downward" (S607).

Here, when the shape of the trajectory is "convex downward" (YES in S607), the direction determining unit 203 determines the direction of the user's finger 103 as the downward direction of the touchpad 102 (upside-down of a direction in the coordinate system of the touchpad 102 or a direction resulting from turning the touchpad 102 180 degrees to the right or the left), in view of the structural characteristics or the like of the person's finger.

Moreover, it is considered that a direction of the operating device 11 intended by the user matches the direction of the user's finger 103. Thus, in contradiction to the case where the direction determining unit 203 determines the direction of the operating device 11 as the "correct direction" (S606), the direction determining unit 203 determines the direction of the operating device 11 as the "reverse direction" (S608). Then, the direction determining unit 203 notifies the cursor position determining unit 204 of the determined direction of the operating device 11, and ends this process.

Meanwhile, when the shape of the trajectory determined in the trajectory shape determining process (S604) is not "convex downward" (NO in S607), the direction determining unit 203 checks whether or not the shape of the trajectory is "convex rightward" (S609).

Here, when the shape of the trajectory is "convex rightward" (YES in S609), the direction determining unit 203 determines the direction of the user's finger 103 as a right direction of the touchpad 102 (a direction resulting from turning the coordinate system of the touchpad 102 90 degrees to the right), in view of the structural characteristics or the like of the person's finger.

Moreover, it is considered that a direction of the operating device 11 intended by the user matches the direction of the user's finger 103. Thus, the direction determining unit 203 determines the direction of the operating device 11 as the "right direction" (S610). The direction determining unit 203 notifies the cursor position determining unit 204 of the determined direction of the operating device 11, and ends this process.

Meanwhile, when the shape of the trajectory determined in the trajectory shape determining process (S604) is not "convex rightward" (NO in S607), the direction determining unit 203 checks whether or not the shape of the trajectory is "convex leftward" (S611).

Here, when the shape of the trajectory is "convex leftward" (YES in S611), the direction determining unit 203 determines the direction of the user's finger 103 as a left direction of the touchpad 102 (a direction resulting from turning the coordinate system of the touchpad 102 90 degrees to the left), in view of the structural characteristics or the like of the person's finger.

Moreover, it is considered that a direction of the operating device 11 intended by the user matches the direction of the user's finger 103. Thus, the direction determining unit 203 determines the direction of the operating device 11 as the "left direction" (S612). The direction determining unit 203 notifies the cursor position determining unit 204 of the determined direction of the operating device 11, and ends this process.

Meanwhile, when the shape of the trajectory is not "convex leftward" (NO in S611), the direction determining unit 203 cannot determine the shape of the trajectory in the preceding process (an "indefinite shape"). In this case, the direction determining unit 203 determines the direction of the operating device 11 as the "indefinite direction" (S613).

It is to be noted that when the direction of the operating device 11 is the indefinite direction (S613), the direction determining unit 203 may determine that the direction of the operating device 11 is the "correct direction" as a default direction. The default direction may be a direction set in advance as a default value to the screen display apparatus 1 before shipping or a direction set in advance as a default value by the user.

This is the end of the description of the direction determining process flow in the direction determining unit 203.

The following describes the trajectory shape determining process in the direction determining unit 203 with reference to FIGS. 7A to 7D.

Each of FIGS. 7A to 7D is a diagram showing a method of determining a shape of a trajectory from slopes A and degrees of change δ and further estimating a direction of a user's finger based on the shape of the trajectory, and consequently determining a direction of the operating device 11. Examples of the direction of the operating device 11 include four patterns, that is, a "correct direction", a "reverse direction", a "right direction", and a "left direction". FIGS. 7A to 7D show the "correct direction", the "reverse direction", the "right direction", and the "left direction", respectively.

The direction determining unit 203 judges whether a value of the slope Δ calculated in the slope Δ calculation process (S602) in the direction determining process flow shown in FIG. 6 is positive or negative. Moreover, the direction determining unit 203 judges whether a difference "Δx" of an x coordinate and a difference "Δy" of a y coordinate at the time of calculating the slope Δ are positive or negative. Furthermore, the direction determining unit 203 judges whether a value of the degree of change δ calculated in the degree of change δ calculation process (S603) is positive or negative.

In each of FIGS. 7A to 7D, a table shows the results of judging whether the values are positive or negative. Here, "+" indicates positive, and "−" indicates negative. Though not shown in the table, a case where a slope Δ or a degree of change δ is 0 may be considered as a special situation expressed by "±". Moreover, though not shown in the table, a case where a slope Δ is infinity, a case where the slope Δ cannot be calculated when Δx is 0, or the like can be considered. These cases may be considered as characteristics of a shape of a trajectory.

In the case of FIG. 7A, the slope Δ changes from "+" to "−", and all of the degrees of change δ are "−". The direction determining unit 203 determines that the trajectory is "convex upward", in consideration of values of Δx and Δy.

In the case of FIG. 7B, the slope Δ changes from "−" to "+", and all of the degrees of change δ are "+". The direction determining unit 203 determines that the trajectory is "convex downward", in consideration of values of Δx and Δy.

In the case of 7C, the slope Δ changes from "−" to "+", and the degree of change δ changes from "−" to "+". The direction determining unit 203 determines that the trajectory is "convex rightward", in consideration of values of Δx and Δy.

In the case of 7D, the slope Δ changes from "+" to "−", and the degree of change δ changes from "−" to "+". The direction determining unit 203 determines that the trajectory is "convex leftward", in consideration of values of Δx and Δy.

When a combination of changes in the slope Δ and the degree of change δ does not correspond to any of the cases of FIGS. 7A to 7D, the direction determining unit 203 cannot determine the shape of the trajectory. As a result, the direction determining unit 203 determines the shape of the trajectory as the "indefinite shape". For instance, a case where the number of position information items 302 included in a trajectory is not enough can be considered as the case where the direction determining unit 203 cannot determine the shape of the trajectory.

It is to be noted that even when the combination of the changes in the slope Δ and the degree of change δ does not correspond to any of the cases of FIGS. 7A to 7D, the direction determining unit 203 may determine which of the patterns of FIGS. 7A to 7D the combination of the changes in the slope Δ and the degree of change δ is most similar to. In this manner, the direction determining unit 203 may determine the shape of the trajectory as one of the shapes shown in FIGS. 7A to 7D.

This is the end of the description of the trajectory shape determining process in the direction determining unit 203.

The following describes the position information correcting process in the cursor position determining unit 204.

The cursor position determining unit 204 obtains corrected position information by calculating coordinates turned around central coordinates C on the touchpad 102.

For instance, it is assumed that a possible minimum value and a possible maximum value of an x coordinate of the coordinate system of the touchpad 102 are x_min and x_max, respectively, and a possible minimum value and a possible maximum value of a y coordinate of the coordinate system of the touchpad 102 are and y_min, and y_max, respectively. In this case, the central coordinates C are expressed as C((x_max−x_min)/2, (y_max−y_min)/2). The cursor position determining unit 204 obtains the corrected position information by calculating the coordinates turned around the central coordinates C.

When the direction of the operating device 11 notified by the direction determining unit 203 is the "reverse direction", the cursor position determining unit 204 turns the position information received from the touch information detecting unit 201 180 degrees to the right (or the left) with the central coordinates C being a pivot.

When the direction of the operating device 11 notified by the direction determining unit 203 is the "right direction", the cursor position determining unit 204 turns the position information received from the touch information detecting unit 201 90 degrees to the left with the central coordinates C being the pivot. When the direction of the operating device 11 notified by the direction determining unit 203 is the "left direction", the cursor position determining unit 204 turns the position information received from the touch information detecting unit 201 90 degrees to the right with the central coordinates C being the pivot.

Even when the user holds the operating device 11 in any direction, the cursor position determining unit 204 makes it possible to correct, through such a process, the cursor position so that the cursor position is the same as in the case where the user holds the operating device 11 in the "correct direction".

This is the end of the description of the position information correcting process in the cursor position determining unit 204.

This is the end of the description of the process flow of the screen display apparatus 1 according to Embodiment 1.

With the above-described configuration, the touch information accumulation unit 202 of the screen display apparatus 1 accumulates the touch information 300 detected by the touch information detecting unit 201. Then, the direction determining unit 203 determines the direction of the operating device 11 using the shape of the trajectory indicated by the position information 302 in the touch information 300. The cursor position determining unit 204 properly corrects the position information 302 in the touch information 300 received from the touch information detecting unit 201, depending on the direction, and determines the display position of the cursor 105.

Consequently, even when the user holds the operating device 11 in a manner that any face of the operating device 11 is directed to the side of the screen 104, the screen display apparatus 1 makes it possible to properly and automatically determine the direction of the operating device 11 based only on the input to the touchpad 102 by the user. Thus, the screen display apparatus 1 makes it possible to display the cursor 105 at a correct position. Therefore, the screen display apparatus 1 makes it possible to achieve the comfortable operability for the user.

Embodiment 2

A screen display apparatus according to Embodiment 2 includes two touchpads, and recognizes a direction of an operating device using an input on the two touchpads by a user. The screen display apparatus then corrects display positions of cursors on a screen based on the direction of the operating device.

Figure 8:
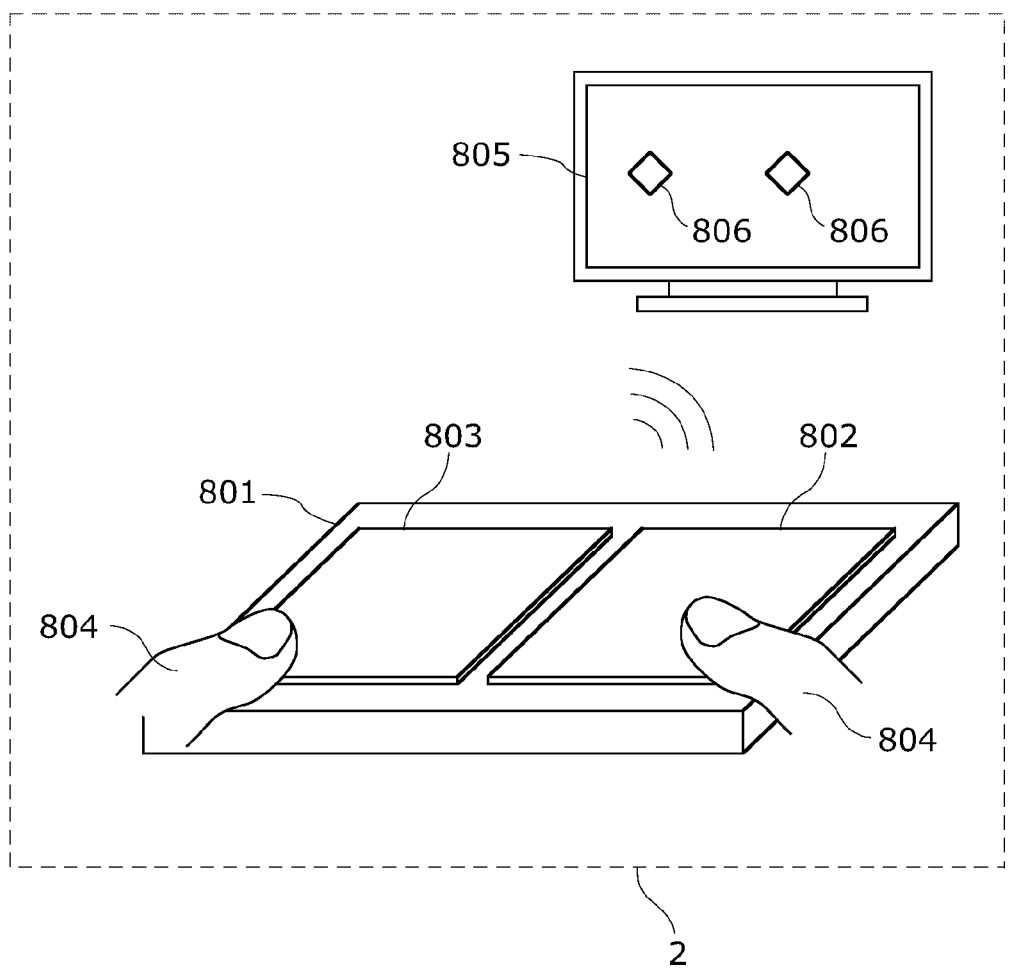
FIG. 8 is a schematic diagram of a screen display apparatus according to Embodiment 2.

FIG. 8 is a schematic diagram of a screen display apparatus according to Embodiment 2. A screen display apparatus 2 shown in FIG. 8 receives an input from a user, and displays cursors 806 or the like on a screen 805.

A remote control 801 is an example of the operating device with which the user operates a GUI on the screen 805. The remote control 801 includes a right touchpad 802 and a left touchpad 803 which receive an input by a user's finger 804.

A method of detecting variation of capacitance or the like performs an input receiving process by the right touchpad 802 and the left touchpad 803. The process is a publicly known technique, and thus a description thereof is omitted here. The remote control 801 transmits signals to the screen 805 through wireless communication such as Bluetooth and Zig-Bee/IEEE802.15.4. The technique of transmitting a signal is also a publicly known technique, and thus a description thereof is omitted here.

It is to be noted that Embodiment 2 describes an example where the user holds the remote control 801 with both hands, and uses the remote control 801 in a direction in which the two touchpads are horizontally arranged side by side (hereafter, also referred to as a holding direction indicating "lateral holding"). Thus, the direction of the operating device held by the user is a "correct direction" or a "reverse direction" with respect to coordinate systems of position information items on the two touchpads.

It is to be noted that the following describes an example where an application or the like specifies that the holding direction of the operating device is fixed to lateral holding. However, when the application or the like specifies that the holding direction is fixed to longitudinal holding, the screen display apparatus 2 may turn the coordinate systems on the two touchpads 90 degrees to the right or the left. With this, it is possible to achieve the same process as in an example described below.

When the user touches the right touchpad 802 with the finger 804, the touch position on the right touchpad 802 is detected as position information represented by an x coordinate and a y coordinate. A coordinate system on the touchpad 802 corresponds one-on-one to a coordinate system on the screen 805. For this reason, the screen display apparatus 2 can calculate a value of coordinates of the cursor 806 on the screen 805 based on the detected position information.

Likewise, the left touchpad 803 has a coordinate system independent of the coordinate system of the right touchpad 802. A touch position on the left touchpad 803 is detected as position information represented by an x coordinate and a y coordinate. The coordinate system on the left touchpad 803 corresponds one-on-one to the coordinate system on the screen 805. For this reason, the screen display apparatus 2 can calculate the value of the coordinates of the cursor 806 on the screen 805 based on the detected position information.

Figure 9:
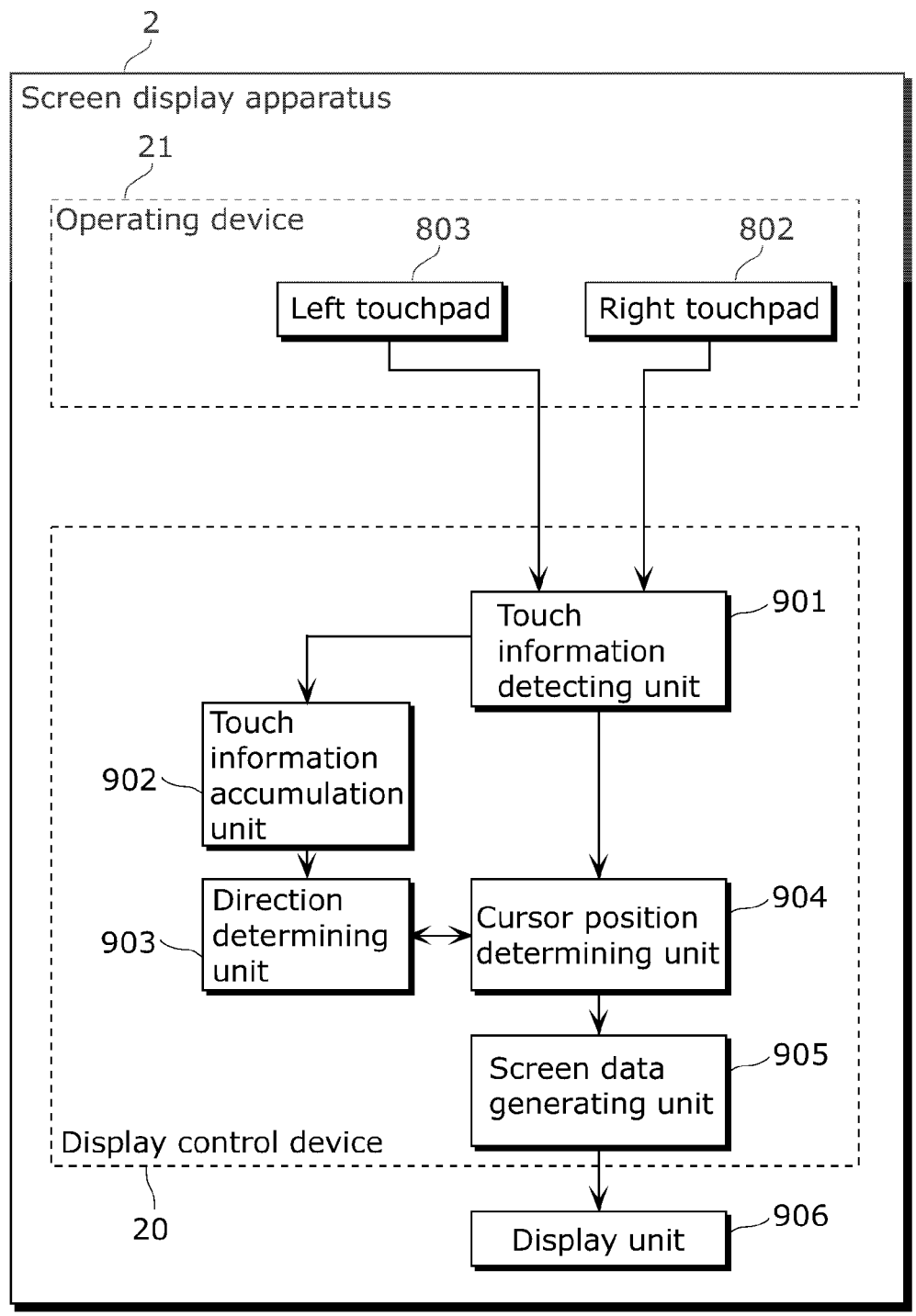
FIG. 9 is a configuration diagram of the screen display apparatus according to Embodiment 2.

FIG. 9 is a configuration diagram of the screen display apparatus 2 according to Embodiment 2 which is shown in FIG. 8. In FIG. 9, the same reference signs are assigned to the same constituent elements as in FIG. 8, and a description thereof is omitted.

The screen display apparatus 2 shown in FIG. 9 includes the right touchpad 802, the left touchpad 803, a touch information detecting unit 901, a touch information accumulation unit 902, a direction determining unit 903, a cursor position determining unit 904 a screen data generating unit 905, and a display unit 906.

An operating device 21 shown in FIG. 9 is realized by the remote control 801 or the like, and includes the right touchpad 802 and the left touchpad 803. Moreover, a display control device 20 includes the touch information detecting unit 901, the touch information accumulation unit 902, the direction determining unit 903, the cursor position determining unit 904, and the screen data generating unit 905.

The display control device 20 receives signals from the operating device 21, and generates screen data to be displayed on the screen 805. It is to be noted that the display control device 20 may be incorporated into the operating device 21 or the display unit 906.

The touch information detecting unit 901 is a unit which detects touch information in response to a touch operation or a click operation on the right touchpad 802 or the left touchpad 803 by the user. Here, although the touch information detecting unit 901 is included in the display control device 20, the touch information detecting unit 901 may be included in the operating device 21. The touch information includes position information that is an x coordinate and a y coordinate which indicate at least a touch position on the right touchpad 802 or the left touchpad 803. The touch information detecting unit 901 detects the touch information at predetermined time intervals, and transmits the detected touch information to the touch information accumulation unit 902. A composition example of the touch information is described in detail later with reference to FIG. 10.

The touch information accumulation unit 902 is a unit which accumulates the touch information received from the touch information detecting unit 901. The touch information accumulation unit 902 accumulates, in chronological order or the like, touch information generated during a predetermined time period or having a predetermined amount so that the direction determining unit 903 can determine a direction of the operating device 21 using the touch information. A composition example of a touch information table is described in detail later with reference to FIG. 11.

The direction determining unit 903 is a unit which determines the direction of the operating device 21 based on the touch information accumulated in the touch information accumulation unit 902. Specifically, the direction determining unit 903 determines to which direction the operating device 21 faces, by analyzing the touch information based on predetermined algorithm. The algorithm is described in detail later with reference to FIGS. 13 and 14.

It is to be noted that, hereafter, although the direction determining unit 903 can basically determine the direction of the operating device 21 using touch information obtained through an operation of naturally touching a touchpad by the user, the present invention is not limited to this. Such touch information is obtained at a moment when the user starts holding the operating device 21, when an application is switched, when a holding direction of the operating device 21 is changed while an application is being used, or the like.

The cursor position determining unit 904 is a unit which calculates a position of the cursor 806 to be displayed on the screen 104, from the direction of the operating device 21 determined by the direction determining unit 903 and the touch information detected by the touch information detecting unit 901.

When the direction determining unit 903 determines that the user does not hold the operating device 21 in a "correct direction", the cursor position determining unit 904 converts (coordinate converts) values of the position information included in the touch information. With this, the cursor position determining unit 904 corrects the position information so that the cursor 806 moves in the same manner as in the case where the user holds the operating device 21 in the "correct direction". On the other hand, when the direction determining unit 903 determines that the user holds the operating device 21 in the "correct direction", the cursor position determining unit 904 does not correct the position information.

Moreover, the cursor position determining unit 904 determines a display position of the cursor 806 (a cursor position) on the screen 805 using the position information received from the touch information detecting unit 901 or the position information corrected by the cursor position determining unit 904.

The screen data generating unit 905 is a unit which generates screen data based on the display position of the cursor 806 or the like determined by the cursor position determining unit 904. Specifically, the screen data generating unit 905 generates the screen data to be displayed by the display unit 906, by superimposing an image of an application such as a video viewer and a web browser on a cursor image.

The display unit 906 is a unit which displays the screen data received from the screen data generating unit 905. The display unit 906 is, for example, a screen of a digital TV. It is to be noted that the display unit 906 may be outside the screen display apparatus 2.

This is the end of the description of the configuration of the screen display apparatus 2 according to Embodiment 2.

Figure 10:
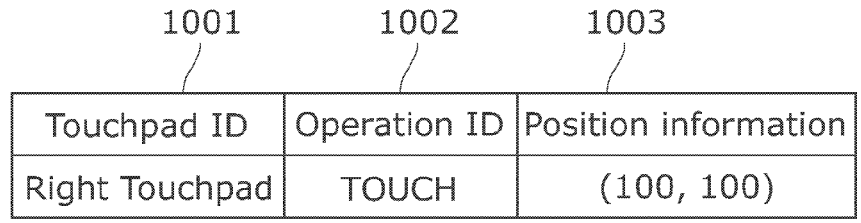
FIG. 10 is a diagram showing a composition example of touch information according to Embodiment 2.

The following describes touch information detected by the touch information detecting unit 901 with reference to FIG. 10.

FIG. 10 is a diagram showing a composition example of touch information. Touch information 1000 shown in FIG. 10 includes a touch pad ID1001, an operation ID 1002, and position information 1003.

The touchpad ID 1001 is an ID indicating on which of the right touchpad 802 and the left touchpad 803 a touch operation or a click operation is performed to generate the touch information 1000. Examples of the touchpad ID 1001 include "Right Touchpad" indicating the right touchpad 802, and "Left Touchpad" indicating the left touchpad 803.

The operation ID 1002 is an ID indicating a type of an operation the user performed on the right touchpad 802 or the left touchpad 803. Examples of the operation ID 1002 include "TOUCH" indicating the touch operation on the right touchpad 802 or the left touchpad 803, and "CLICK" indicating the click operation on the right touchpad 802 or the left touchpad 803.

Position information 1003 includes a value of an x coordinate and a value of a y coordinate on the right touchpad 802 or the left touchpad 803 on which the operation indicated by the operation ID 1002 is performed, and expressed in a format of (value of x coordinate, value of y coordinate).

FIG. 10 illustrates the touch information 1000 indicating that "the touch operation on the right touchpad 802 has occurred at (100, 100)".

This is the end of the description of the composition example of the touch information 1000.

Figure 11:
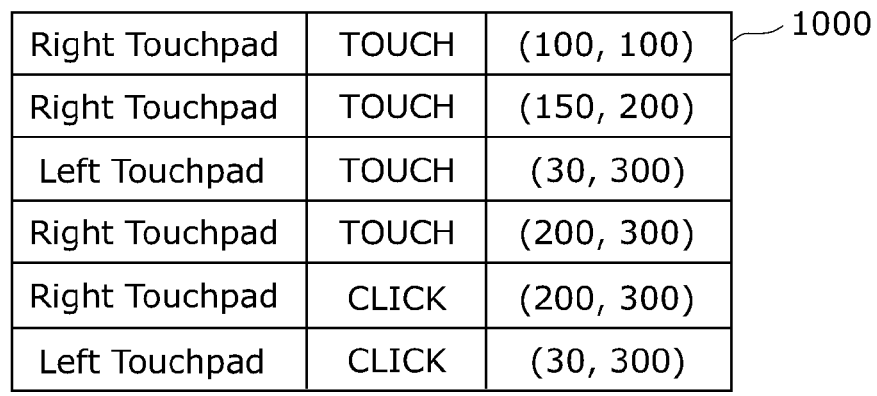
FIG. 11 is a diagram showing a composition example of a touch information table according to Embodiment 2.

The following describes a touch information table 1100 held by the touch information accumulation unit 902 with reference to FIG. 11.

FIG. 11 is a diagram showing a composition example of the touch information table 1100 held by the touch information accumulation unit 902. The touch information table 1100 is a table stored in a RAM, a flash memory, or the like in which the touch information accumulation unit 902 accumulates, in chronological order, the touch information 1000 received from the touch information detecting unit 901. Each time the touch information 1000 is received from the touch information detecting unit 901, the touch information accumulation unit 902 adds the received touch information 1000 to the touch information table 1100.

An example shown in FIG. 11 indicates the following: (i) "the touch operation on the right touchpad 802 has occurred at (100, 100)"; (ii) "the touch operation on the right touchpad 802 has occurred at (150, 200)"; (iii) "the touch operation on the left touchpad 803 has occurred at (30, 300)"; (iv) "the touch operation on the right touchpad 802 has occurred at (200, 300)"; (v) "the click operation on the right touchpad 802 has occurred at (200, 300)"; and (vi) "the click operation on the left touchpad 803 has occurred at (30, 300)".

Here, the touch information detecting unit 901 detects a touch operation and a click operation on the right touchpad 802 and the left touch pad 803 at predetermined time intervals.

Thus, from the touch information table 1100 shown in FIG. 11, movements of the user's finger are interpreted as follows. First, the user's finger touches the right touchpad 802 at (100, 100). Then, the user's finger moves via (150, 200) to (200, 300) while touching the right touchpad 802. Then, the user's finger clicks the right touchpad 802. Moreover, the user's finger touches the left touchpad 803 at (30, 300). The user's finger clicks the left touchpad 803 there. The above movements are interpreted from the touch information table 1100.

It is to be noted that when a predetermined time elapses, the touch information accumulation unit 902 may periodically delete old touch information 1000 from the touch information table 1100. Moreover, in the case where an amount of accumulated touch information exceeds a predetermined amount when new touch information 1000 is received from the touch information detecting unit 901, the touch information accumulation unit 902 may update the old touch information 1000 with the new touch information 1000.

This is the end of the description of the composition example of the touch information table 1100.

Figure 12:
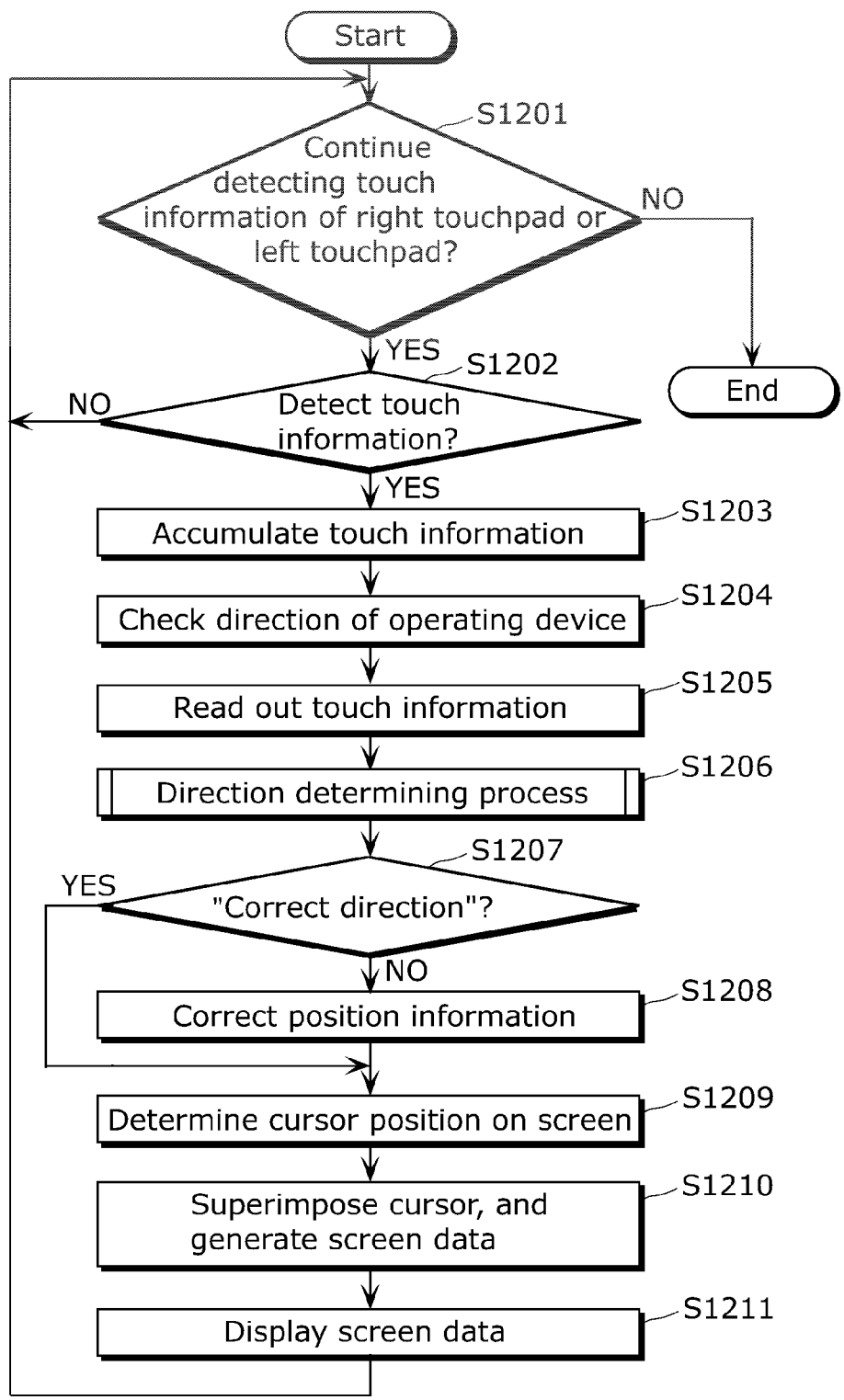
FIG. 12 is diagram showing a whole process flow of the screen display apparatus according to Embodiment 2.
Figure 13:
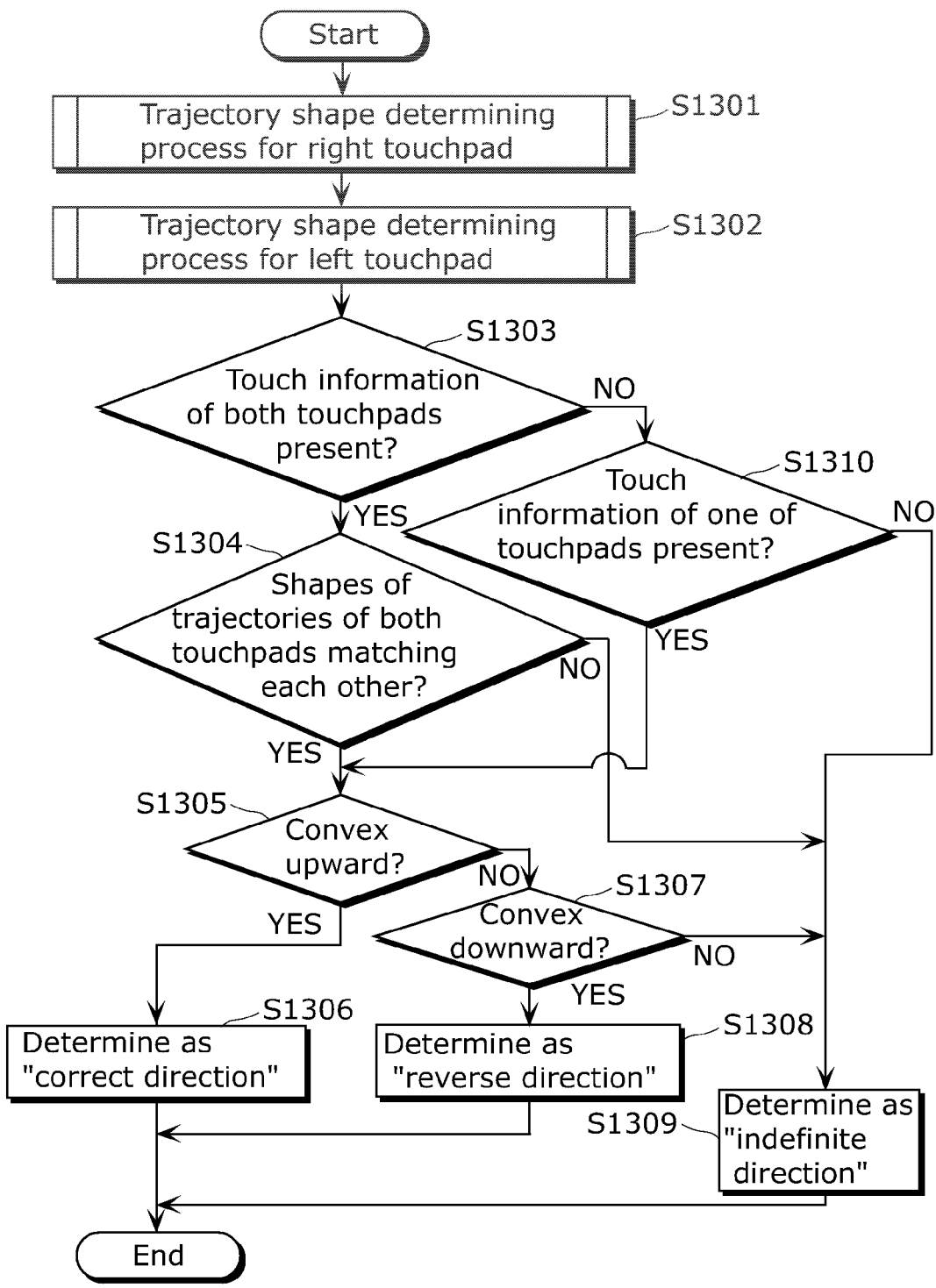
FIG. 13 is a diagram showing a direction determining process flow in a direction determining unit according to Embodiment 2.
Figure 14:
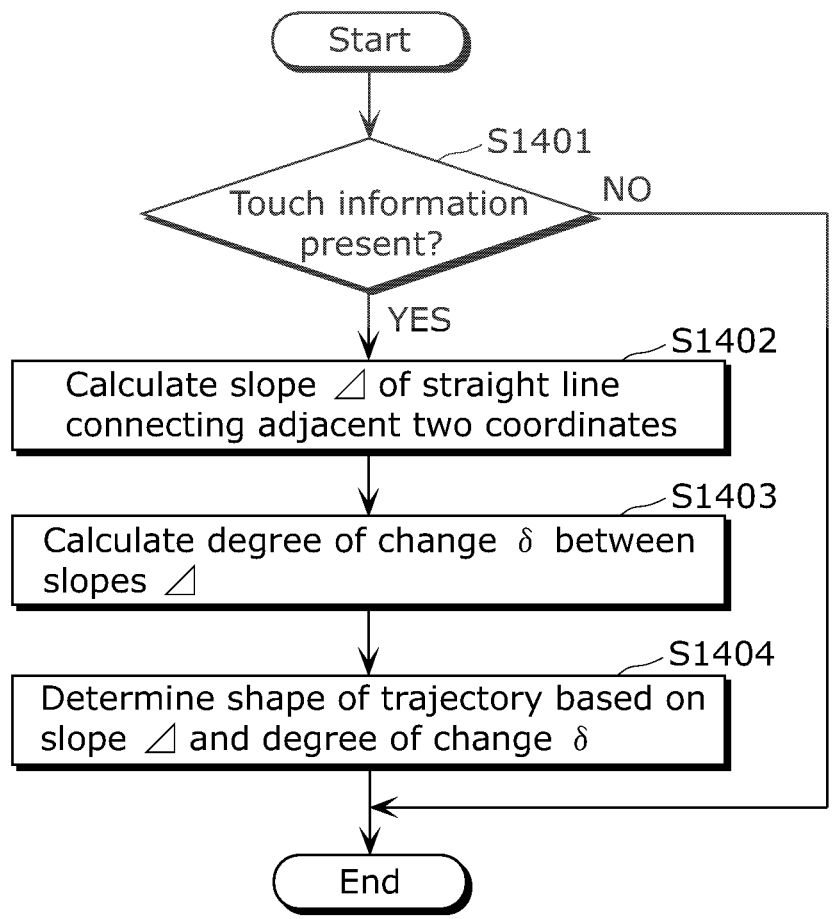
FIG. 14 is a diagram showing a trajectory shape determining process flow in the direction determining unit according to Embodiment 2.

The following describes a process flow of the screen display apparatus 2 according to Embodiment 2 with reference to FIGS. 12 to 14.

FIG. 12 is a whole process flow of the screen display apparatus 2 according to Embodiment 2 which is shown in FIG. 9.

First, the touch information detecting unit 901 of the screen display apparatus 2 checks whether or not to continue detecting an input to the right touchpad 802 or the left touchpad 803, based on an instruction from an instruction unit not shown in FIG. 9 (S1201).

Here, when the touch information detecting unit 901 is instructed to discontinue detecting the input to the right touchpad 802 or the left touchpad 803 (NO in S1201), the screen display apparatus 2 ends the process.

On the other hand, when the touch information detecting unit 901 is instructed to continue detecting the input to the right touchpad 802 or the left touchpad 803 (YES in S1201), the touch information detecting unit 901 detects the presence or absence of the touch information 1000 shown in FIG. 10

(S1202). In this case, the touch information detecting unit 901 detects the presence or absence of the touch information 1000 by checking the presence or absence of the input to the right touchpad 802 or the left touchpad 803.

Here, when the touch information detecting unit 901 detects "the absence of the touch information" (NO in S1202), the touch information detecting unit 901 checks again whether or not to continue detecting the input (S1201).

On the other hand, when the touch information detecting unit 901 detects "the presence of the touch information" (YES in S1202), the touch information detecting unit 901 causes the touch information accumulation unit 902 to accumulate the touch information 1000 (S1203). More specifically, the touch information detecting unit 901 adds the touch information 1000 to the touch information table 1100 shown in FIG. 11. Moreover, the touch information detecting unit 901 transmits the detected touch information 1000 to the cursor position determining unit 904, for cursor display on the screen.

Next, after the cursor position determining unit 904 receives the touch information 1000 from the touch information detecting unit 901, the cursor position determining unit 904 determines whether or not it is necessary to correct the position information 1003 in the touch information 1000. For that purpose, the cursor position determining unit 904 checks a direction of the operating device 21 with the direction determining unit 903 (S1204).

Next, after the cursor position determining unit 904 checks with the direction determining unit 903, the direction determining unit 903 accesses the touch information table 1100 of the touch information accumulation unit 902 to read out the touch information 1000 (S1205). Here, the direction determining unit 903 reads out the touch information 1000 for a predetermined time or the touch information 1000 having a predetermined amount which is set to the direction determining unit 903 in advance.

It is to be noted that the touch information accumulation unit 902 sequentially accumulates the touch information 1000 received from the touch information detecting unit 901 at the predetermined time intervals. This makes it possible to obtain, by calculation, an amount of touch information generated during a predetermined time period.

Moreover, when the direction determining unit 903 reads out the touch information 1000, the touch information accumulation unit 902 may cause the direction determining unit 903 or the like to temporarily hold the read touch information 1000. The touch information accumulation unit 902 may read out only a difference from touch information 1000 to be newly required. This reduces an amount of the touch information 1000 to be read out subsequently.

The direction determining unit 903 determines the direction of the operating device 21 using the touch information 1000 read out in the preceding process (S1205) (S1206: a direction determining process). Subsequently, the direction determining unit 903 notifies the cursor position determining unit 904 of the determined direction of the operating device 21. The direction determining process is described in detail later with reference to FIG. 13.

The cursor position determining unit 904 is notified of the direction of the operating device 21 by the direction determining unit 903, and judges whether or not the direction of the operating device 21 is the "correct direction" (S1207).

Here, when the direction of the operating device 21 is the "correct direction" (YES in S1207), the cursor position determining unit 904 performs a process of determining cursor positions on the screen (S1209).

On the other hand, when the direction of the operating device 21 is other than the "correct direction" (NO in S1207), the cursor position determining unit 904 corrects the position information 1003 in the touch information 1000 received from the touch information detecting unit 901 (S1208: a position information correcting process). In this case, the cursor position determining unit 904 corrects, based on the direction of the operating device 21, the position information 1003 so that the cursor is displayed at the same position as in the case where the direction of the operating device 21 is the "correct direction". The position information correcting process is the same as the process described in Embodiment 1.

Next, the cursor position determining unit 904 determines the cursor position on the screen using the position information 1003 in the touch information 1000 received from the touch information detecting unit 901 or the corrected position information 1003 (S1209).

Specifically, the cursor position determining unit 904 obtains, from the maximum value and the minimum value in each of the coordinate system of the right touchpad 802 and the coordinate system on the screen display, a magnification ratio between the coordinate system of the right touchpad 802 and the coordinate system on the screen display. Moreover, the cursor position determining unit 904 obtains, from the maximum value and the minimum value in each of the coordinate system of the left touchpad 803 and the coordinate system on the screen display, a magnification ratio between the coordinate system of the left touchpad 803 and the coordinate system on the screen display. This allows the cursor position determining unit 904 to determine the cursor positions on the screen.

In other words, the cursor position determining unit 904 determines, for each of an x coordinate and a y coordinate of the position information, the cursor position corresponding to the right touchpad 802 through the following calculation: (the cursor position of the right touchpad 802 on the screen display)=(the cursor position on the right touchpad 802)×{(the maximum value of the coordinate system on the screen display)−(the minimum value of the coordinate system on the screen display)}/{(the maximum value of the coordinate system on the right touchpad 802)−(the minimum value of the coordinate system on the right touchpad 802)}.

Likewise, the cursor position determining unit 904 determines the cursor position corresponding to the left touchpad 803 through the following calculation: (the cursor position of the left touchpad 803 on the screen display)=(the cursor position on the left touchpad 803)×{(the maximum value of the coordinate system on the screen display)−(the minimum value of the coordinate system on the screen display)}/{(the maximum value of the coordinate system on the left touchpad 803)−(the minimum value of the coordinate system on the left touchpad 803)}.

Subsequently, the cursor position determining unit 904 notifies the screen data generating unit 905 of the x coordinate and the y coordinate of each of the determined cursor positions.

It is to be noted that a different coordinate system on the screen display may be assigned to each of the right touchpad 802 and the left touchpad 803. In this case, "the maximum value of the coordinate system on the screen display" and "the minimum value of the coordinate system on the screen display" are provided for each of the right touchpad 802 and the left touchpad 803 in the above respective calculations. This allows each cursor position to be determined.

The screen data generating unit 905 generates screen data by superimposing a cursor image on a video, an animation, or the like to be displayed by the display unit 906, based on the cursor position notified by the cursor position determining unit 904 (S1210). Then, the screen data generating unit 905 transmits the generated screen data to the display unit 906.

The display unit 906 displays, on the screen or the like, the screen data received from the screen data generating unit 905 (S1211). After this process ends, the touch information detecting unit 901 checks again whether or not to continue detecting the input (S1201).

This is the end of the description of the whole process flow of the screen display apparatus 2 which is shown in FIG. 12.

The following describes the direction determining process (S1206) shown in FIG. 12 with reference to FIGS. 13 to 15B. Hereafter, plural position information 1003 in plural touch information 1000 read out in the touch information readout process (S1205) shown in FIG. 12 are arranged in chronological order, and line segments each of which connects two adjacent points of position information items among the plural position information items are collectively referred to as a "trajectory".

First, the direction determining unit 903 performs a trajectory shape determining process for the right touchpad 802 using the touch information 1000 read out from the touch information table 1100 (S1301). The trajectory shape determining process is described in detail later with reference to FIG. 14.

Next, the direction determining unit 903 performs a trajectory shape determining process for the left touchpad 803 using the touch information 1000 read out from the touch information table 1100 (S1302). The trajectory shape determining process is the same as the preceding trajectory shape determining process (S1301).

Next, the direction determining unit 903 checks the presence of the touch information items of both touchpads, from the results of the trajectory shape determining process for the right touchpad (S1301) and the trajectory shape determining process for the left touchpad (S1302). In other words, the direction determining unit 903 checks the presence of both touch information 1000 of the right touchpad 802 and touch information 1000 of the left touchpad 803.

Here, when both touch information 1000 of the right touchpad 802 and touch information 1000 of the left touchpad 803 are present (YES in S1303), the direction determining unit 903 checks whether or not shapes of both trajectories match each other (S1304). In other words, in this case, the direction determining unit 903 checks whether or not the shape of the trajectory of the right touchpad 802 matches that of the left touchpad 803, from the results of the trajectory shape determining process for the right touchpad (S1301) and the trajectory shape determining process for the left touchpad (S1302).

More specifically, the direction determining unit 903 checks whether the shapes of both trajectories of the right touchpad 802 and the left touchpad 803 are "convex upward" or "convex downward". It is to be noted that the result of the trajectory shape determining process for the right touchpad (1301) or the trajectory shape determining process for the left touchpad (S1302) may show "indefinite shape". In this case, it is judged that the shape of the trajectory of the right touchpad 802 does not match that of the left touchpad 803.

On the other hand, when the touch information 1000 of the right touchpad 802 or that of the left touchpad 803 is absent (NO in S1303), the direction determining unit 903 checks which one of the touch information 1000 of the right touchpad 802 and that of the left touchpad 803 is present (S1310). In other words, in this case, the direction determining unit 903 checks which one of the touch information 1000 of the right touchpad 802 and that of the left touchpad 803 is present, from the results of the trajectory shape determining process for the right touchpad (S1301) and the trajectory shape determining process for the left touchpad (S1302).

It is to be noted that, here, an example is shown where when the touch information 1000 of one of the right touchpad 802 and the left touchpad 803 is detected, the direction determining unit 903 performs the direction determining process using a shape of a trajectory. However, only when the touch information 1000 of the right touchpad 802 and that of the left touchpad 803 are detected, the direction determining unit 903 may perform the direction determining process. In this case, the process of checking which one of the touch information items 1000 of the respective touchpads is present (S1310) is omitted.

When the shapes of both touchpads do not match each other (NO in S1304) or when the touch information items 1000 of respective touchpads are absent (NO in S1310), the direction determining unit 903 determines the direction of the operating device 21 as an "indefinite direction" (S1309). It is to be noted that, in this case, the direction determining unit 903 may determine that the direction of the operating device 21 is the "correct direction" as a default direction. The default direction may be a direction set in advance as a default value to the screen display apparatus 2 before shipping or a direction set in advance as a default value by the user.

When the shape of the trajectory of the right touchpad 802 matches that of the left touchpad 803 (YES in S1304) or when the touch information 1000 of one of the touchpads is present (YES in S1310), the direction determining unit 903 checks whether or not the matched shape of the trajectories checked in the preceding process is "convex upward" (S1305).

Here, when the matched shape of the trajectories is "convex upward" (YES in S1305), the direction determining unit 903 determines a direction of the user's finger 804 as an upward direction of the right touchpad 802 and the left touchpad 803, in view of structural characteristics or the like of a person's finger. In other words, the direction determining unit 903 determines that the direction of the user's finger 804 is the same as a direction in the coordinate system of the right touchpad 802 and the coordinate system of the left touchpad 803.

Moreover, it is considered that a direction of the operating device 21 intended by the user matches the direction of the user's finger 804. Thus, the direction determining unit 903 determines the direction of the operating device 21 as the "correct direction" (S1306). Then, the direction determining unit 903 notifies the cursor position determining unit 904 of the determined direction of the operating device 21, and ends this process.

Meanwhile, when the matched shape of the trajectories is not "convex upward" (NO in S1305), the direction determining unit 903 checks whether or not the matched shape of the trajectories checked in the preceding process is "convex downward" (S1307).

Here, when the matched shape of the trajectories is "convex downward" (YES in S1307), the direction determining unit 903 determines the direction of the user's finger 804 as a downward direction of the right touchpad 802 and the left touchpad 803, in view of the structural characteristics or the like of the person's finger. In other words, the direction determining unit 903 determines that the direction of the user's finger 804 is upside-down of a direction in the coordinate system of the right touchpad 802 and the coordinate system of the left touchpad 803 or a direction resulting from turning each of the right touchpad 802 and the left touchpad 803 180 degrees to the right or the left.

Moreover, it is considered that the direction of the operating device 21 intended by the user matches the direction of the user's finger 804. Thus, in contradiction to the case where the direction determining unit 903 determines the direction of the operating device 21 as the "correct direction" (S1306), the direction determining unit 903 determines the direction of the operating device 21 as the "reverse direction" (S1308). Then, the direction determining unit 903 notifies the cursor position determining unit 904 of the determined direction of the operating device 21, and ends this process.

Meanwhile, when the matched shape of the trajectories is not "convex downward" (NO in S1307), as with the case where the shapes of the trajectories of both touchpads do not match each other (NO in S1304) or the like, the direction determining unit 903 determines the direction of the operating device 21 as the "indefinite direction" (S1309).

This is the end of the description of the direction determining process flow in the direction determining unit 903.

Figure 15A:
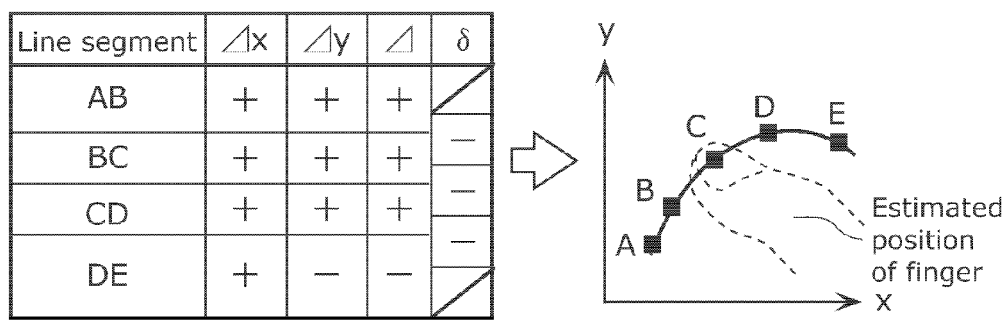
FIG. 15A is an explanatory diagram showing a first example of a trajectory shape determining process in the direction determining unit according to Embodiment 2.
Figure 15B:
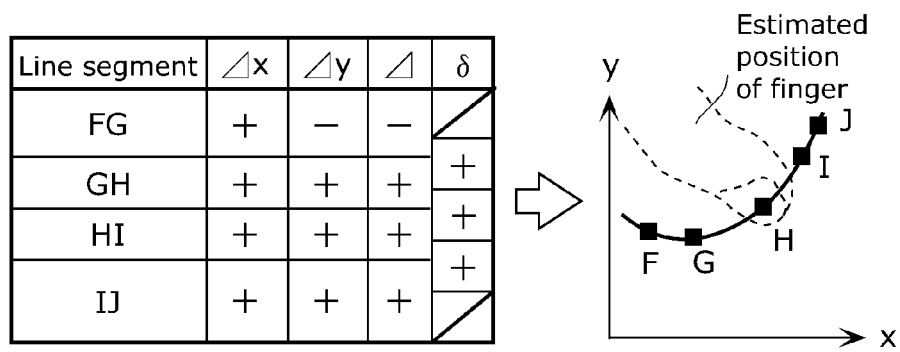
FIG. 15B is an explanatory diagram showing a second example of a trajectory shape determining process in the direction determining unit according to Embodiment 2.

The following describes a flow of the trajectory shape determining process for the right touchpad (S1301) and the trajectory shape determining process for the left touchpad (S1302) shown in FIG. 13, with reference to FIG. 14 and FIGS. 15A and 15B.

First, the direction determining unit 903 checks the presence or absence of the touch information 1000 read out from the touch information table 1100 (S1401).

Here, when the read touch information 1000 is absent (NO in S1401), the direction determining unit 903 ends this process.

On the other hand, when the touch information 1000 read out in the preceding process (S1401) is present (YES in S1401), the direction determining unit 903 calculates, for the touch information 1000, a slope $\Delta$ of a line segment connecting, on a trajectory, two points each of which is indicated by the position information 1003 (S1402).

The slope $\Delta$ is calculated as (Slope $\Delta$)=(yb−ya)/(xb−xa), where position information of two points A and B adjacent to each other in chronological order are A (xa, ya) and B (xb, yb). However, here, signs of (yb−ya) and (xb−xa) are considered, and held in association with the calculated slope $\Delta$. In this manner, the direction determining unit 903 calculates slopes $\Delta$ for all of read touch information items 1000.

Next, the direction determining unit 903 calculates, for the slope $\Delta$ calculated in the preceding process (S1402), a degree of change $\delta$ between two slopes $\Delta$ adjacent to each other in chronological order (S1403). The degree of change $\delta$ is calculated as (Degree of Change $\delta$)=$\Delta$B−$\Delta$A, where the two slopes $\Delta$ adjacent to each other in chronological order are $\Delta$A and $\Delta$B. The direction determining unit 903 calculates degrees of change $\delta$ for all of slopes $\Delta$ calculated in the preceding process (S1402).

Next, the direction determining unit 903 determines a shape of a trajectory from the position information 1003, the slope $\Delta$, and the degree of change $\delta$ (S1404). This process is described in detail later with reference to FIGS. 15A and 15B.

Each of FIGS. 15A to 15BD is a diagram showing a method of determining a shape of a trajectory from slopes $\Delta$ and degrees of change $\delta$ and further estimating a direction of a user's finger based on the shape of the trajectory, and consequently determining a direction of the operating device 21. Examples of the direction of the operating device 21 include two patterns, that is, a "correct direction" and a "reverse direction". FIG. 15A shows the "correct direction", and FIG. 15B shows the "reverse direction".

The direction determining unit 903 judges whether a value of the slope $\Delta$ calculated in the slope $\Delta$ calculation process (S1402) in the direction determining process flow shown in FIG. 14 is positive or negative. Moreover, the direction determining unit 903 judges whether a difference "$\Delta$x" of an x coordinate and a difference "$\Delta$y" of a y coordinate at the time of calculating the slope $\Delta$ are positive or negative. Furthermore, the direction determining unit 903 judges whether a value of the degree of change $\delta$ calculated in the degree of change $\delta$ calculation process (S1403) is positive or negative.

In each of FIGS. 15A and 15B, a table shows the results of judging whether the values are positive or negative. Here, "+" indicates positive, and "−" indicates negative. Though not shown in the table, a case where a slope $\Delta$ or a degree of change $\delta$ is 0 may be considered as a special situation expressed by "±". Moreover, though not shown in the table, a case where a slope $\Delta$ is infinity, a case where the slope $\Delta$ cannot be calculated when $\Delta$x is 0, or the like can be considered. These cases may be considered as characteristics of a shape of a trajectory.

In the case of FIG. 15A, the slope $\Delta$ changes from "+" to "−", and all of the degrees of change $\delta$ are "−". The direction determining unit 903 determines that the trajectory is "convex upward", in consideration of values of $\Delta$x and $\Delta$y.

In the case of FIG. 15B, the slope $\Delta$ changes from "−" to "+", and all of the degrees of change $\delta$ are "+". The direction determining unit 903 determines that the trajectory is "convex downward", in consideration of values of $\Delta$x and $\Delta$y.

When a combination of changes in the slope $\Delta$ and the degree of change $\delta$ does not correspond to any of the cases of FIGS. 15A and 15B, the direction determining unit 903 cannot determine the shape of the trajectory. As a result, the direction determining unit 903 determines the shape of the trajectory as the "indefinite shape". For instance, a case where the number of position information items 902 included in a trajectory is not enough can be considered as the case where the direction determining unit 903 cannot determine the shape of the trajectory.

It is to be noted that even when the combination of the changes in the slope $\Delta$ and the degree of change $\delta$ does not correspond to any of the cases of FIGS. 15A and 15B, the direction determining unit 903 may determine which of the patterns of FIGS. 15A and 15B the combination of the changes in the slope $\Delta$ and the degree of change $\delta$ is most similar to. In this manner, the direction determining unit 903 may determine the shape of the trajectory as one of the shapes shown in FIGS. 15A and 15B.

This is the end of the description of the trajectory shape determining process for the right touchpad (S1301) and the trajectory shape determining process for the left touchpad (S1302) shown in FIG. 13.

This is the end of the description of the process flow of the screen display apparatus 2 according to Embodiment 2.

With the above-described configuration, the touch information accumulation unit 902 of the screen display apparatus 2 accumulates the touch information items 1000 detected on the two touchpads, the right touchpad 802 and the left touchpad 803, by the touch information detecting unit 901. Then, the direction determining unit 903 determines the direction of the operating device 21 using the shapes of both trajectories of the right touchpad 802 and the left touchpad 803, from the position information items 1003 in the touch information items 1000.

The cursor position determining unit 904 properly corrects the position information items 1003 in the touch information items 1000 received from the touch information detecting unit 901, depending on the direction of the operating device 21, and determines the display positions of the cursors 806.

Consequently, even when the user holds the operating device 21 in any direction, the screen display apparatus 2 makes it possible to properly and automatically determine the direction of the operating device 21 based only on the inputs to the right touchpad 802 and the left touchpad 803 by the user, and display the cursors 806 at the correct positions. Therefore, the screen display apparatus 2 makes it possible to achieve the comfortable operability for the user.

Embodiment 3

A screen display apparatus according to Embodiment 3 which includes two touchpads further includes a sensor for detecting which part of an operating device a user holds.

Figure 16:
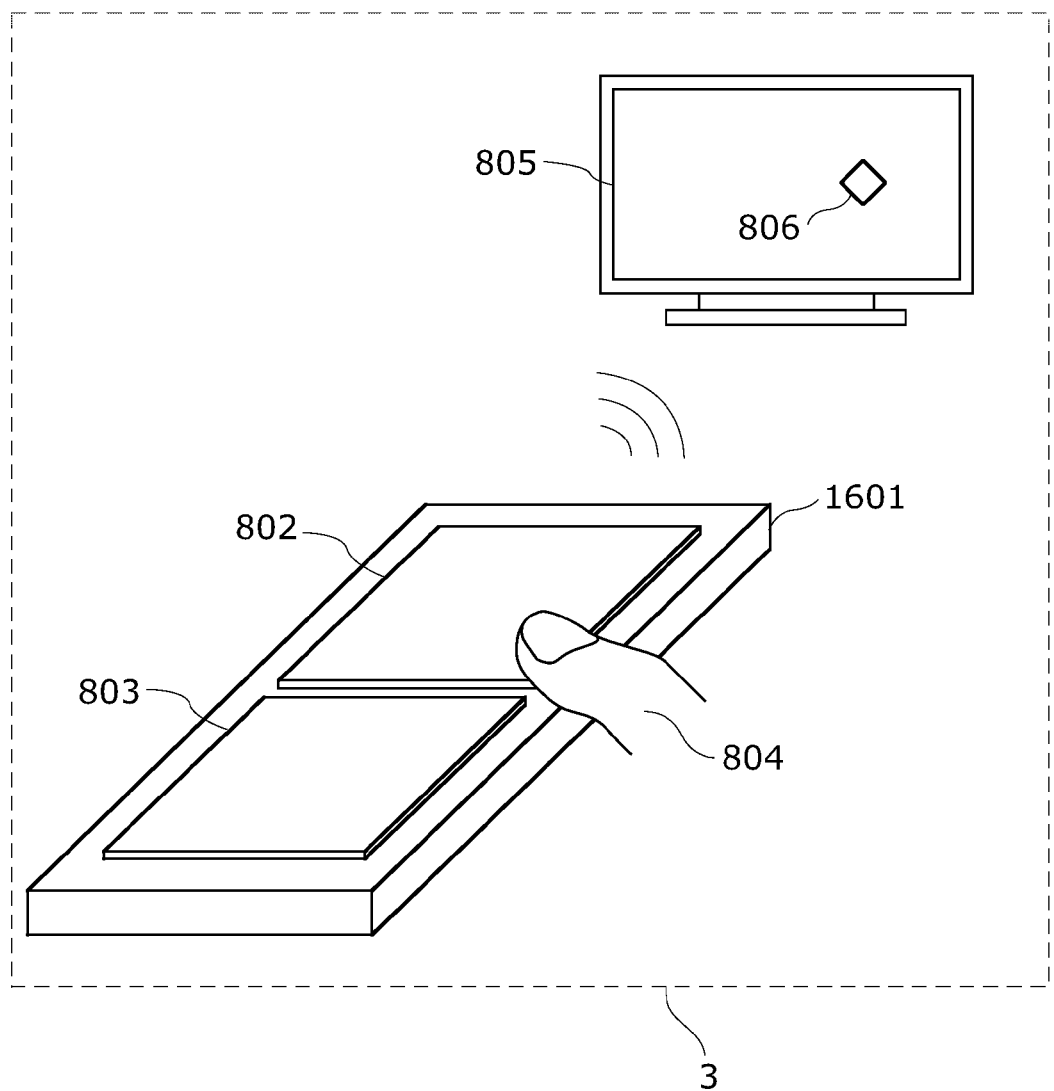
FIG. 16 is a schematic diagram of a screen display apparatus according to Embodiment 3.

This configuration allows the screen display apparatus according to Embodiment 3 to respond to a holding direction (hereafter, also referred to as "longitudinal holding") of a remote control shown in FIG. 16, in addition to a holding direction (hereafter, also referred to as "lateral holding") of the remote control according to Embodiment 2 shown in FIG. 8. The screen display apparatus according to Embodiment 3 recognizes a direction of the operating device in connection with one of the longitudinal holding and the lateral holding (the holding directions) using inputs on the touchpads of the screen display apparatus by the user, and corrects a display position of a cursor on a screen based on the holding direction and direction of the operating device.

FIG. 16 is a schematic diagram of a screen display apparatus according to Embodiment 3. In FIG. 16, the same reference signs are assigned to the same constituent elements as in FIG. 8, and a description thereof is omitted. A screen display apparatus 3 shown in FIG. 8 receives an input from a user, and displays the cursor 806 on the screen 805.

A remote control 1601 differs from the remote control 801 shown in FIG. 8 in that at least one sensor for detecting a touch position of a user's finger is provided at an outer peripheral part of the remote control 1601. This allows the screen display apparatus 3 to automatically detect whether the user holds the remote control 1601 in a lateral direction (the direction of the remote control 801 shown in FIG. 8) or a longitudinal direction (a direction of the remote control 1601 shown in FIG. 16).

Consequently, the user can freely hold the remote control 1601 in the lateral direction or the longitudinal direction. It is to be noted that such a sensor for detecting a touch with the user's finger (such as a touch sensor, a gripping sensor, and a pressure sensor) is a publicly known technique, and a detailed description thereof is omitted here.

Figure 17:
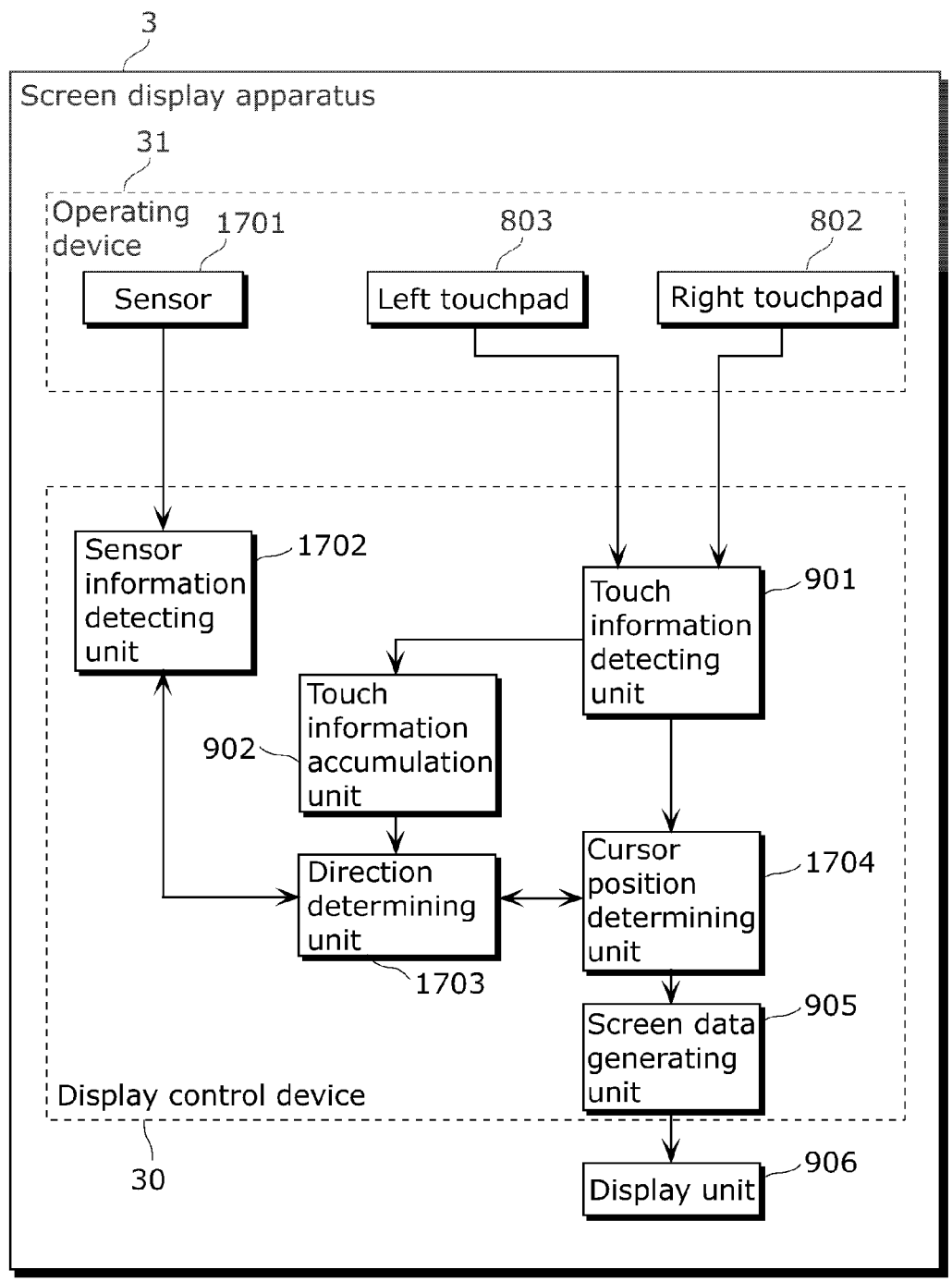
FIG. 17 is a configuration diagram of the screen display apparatus according to Embodiment 3.

FIG. 17 is a configuration diagram of the screen display apparatus 3 according to Embodiment 3 which is shown in FIG. 16. In FIG. 17, the same reference signs are assigned to the same constituent elements as in FIG. 9, and a description thereof is omitted.

The screen display apparatus 3 shown in FIG. 17 includes a sensor 1701, a sensor information detecting unit 1702, a direction determining unit 1703, a cursor position determining unit 1704, the right touchpad 802, the left touchpad 803, the touch information detecting unit 901, the touch information accumulation unit 902, the screen data generating unit 905, and the display unit 906.

An operating device 31 shown in FIG. 17 is realized by the remote control 1601 or the like, and includes the sensor 1701, the right touchpad 802, and the left touchpad 803. A display control device 30 includes the sensor information detecting unit 1702, the direction determining unit 1703, the cursor position determining unit 1704, the touch information detecting unit 901, the touch information accumulation unit 902, and the screen data generating unit 905.

The display control device 30 receives signals from the operating device 31, and generates screen data to be displayed on the screen 805. It is to be noted that the display control device 30 may be incorporated into the operating device 31 or the display unit 906. Here, although the touch information detecting unit 901 is included in the display control device 30, the touch information detecting unit 901 may be included in the operating device 31.

The sensor 1701 is a touch sensor for detecting a touch with a user's finger. At least one touch sensor is provided at an outer peripheral part of the operating device 31.

The sensor information detecting unit 1702 receives, from the sensor 1701, a signal indicating detection of a touch with a user's finger or the like. The sensor information detecting unit 1702 detects, as a holding direction of the operating device 31, whether the user holds the operating device 31 in the lateral direction, that is, the user performs "lateral holding", or the user holds the operation device 31 in the longitudinal direction, that is, the user performs "longitudinal holding", in view of a position of the sensor 1701 provided at the outer peripheral part of the operating device 31.

The sensor information detecting unit 1702 notifies the direction determining unit 1703 of the detected holding direction of the operating device 31, in response to a request from the direction determining unit 1703 or depending on a detection situation of sensor information of the sensor information detecting unit 1702.

The direction determining unit 1703 is a unit which determines the direction of the operating device 31 based on a holding position of the operating device 31 by the user, which is detected by the sensor information detecting unit 1702, and touch information accumulated by the touch information accumulation unit 902. Specifically, the direction determining unit 1703 determines, from the holding position detected by the sensor information detecting unit 1702, whether the holding direction of the operating device 31 is lateral holding or longitudinal holding, and analyzes the touch information based on predetermined algorithm. In this way, the direction determining unit 1703 determines to which direction the operating device 31 faces.

It is to be noted that, hereafter, although the direction determining unit 1703 can basically determine the direction of the operating device 31 using touch information obtained through an operation of naturally touching a touchpad by the user, the present invention is not limited to this. Such touch information is obtained at a moment when the user starts holding the operating device 31, when an application is switched, when a holding direction of the operating device 31 is changed while an application is being used, or the like.

The cursor position determining unit 1704 is a unit which calculates a position of the cursor 806 to be displayed on the screen 805, from the holding direction of the operating device 31 notified by the direction determining unit 1703, the direction of the operating device 31 determined by the direction determining unit 1703, and the touch information detected by the touch information detecting unit 901.

The cursor position determining unit 1704 converts (coordinate converts) values of position information in the touch information, based on the holding direction (lateral holding or longitudinal holding) of the operating device 31.

When the direction determining unit 1703 determines that the user does not hold the operating device 31 in a "correct direction", the cursor position determining unit 1704 converts (coordinate converts) the values of the position information included in the touch information. With this, the cursor position determining unit 1704 corrects the position information so that the cursor 806 moves in the same manner as in the case where the user holds the operating device 31 in the "correct direction". On the other hand, when the direction determining unit 1703 determines that the user holds the operating device 31 in the "correct direction", the cursor position determining unit 1704 does not correct the position information.

Here, the conversion of the position information based on the holding direction (lateral holding or longitudinal holding) of the operating device 31 refers to a process of converting position information into a coordinate system of a holding direction set as a standard. For instance, when coordinate systems of the right touchpad 802 and the left touchpad 803 are set as fixed with the longitudinal holding of the operating device 31 (the holding direction of the remote control 1601 shown in FIG. 16) being a standard and when the operating device 31 is held laterally, position information is converted.

In this case, the cursor position determining unit 1704 turns the coordinate systems of the right touchpad 802 and the left touchpad 803 90 degrees to the left so that the coordinate systems correspond to the coordinate system of the holding direction set as the standard. In other words, the cursor position determining unit 1704 turns the position information 90 degrees to the left with central coordinates C of the coordinate system of each of the right touchpad 802 and the left touchpad 803 being a pivot.

Moreover, the cursor position determining unit 1704 determines the display position of the cursor 806 (a cursor position) on the screen 805 using the position information received from the touch information detecting unit 901 or the position information corrected by the cursor position determining unit 904.

This is the end of the description of the configuration of the screen display apparatus 3 according to Embodiment 3.

Figure 18:
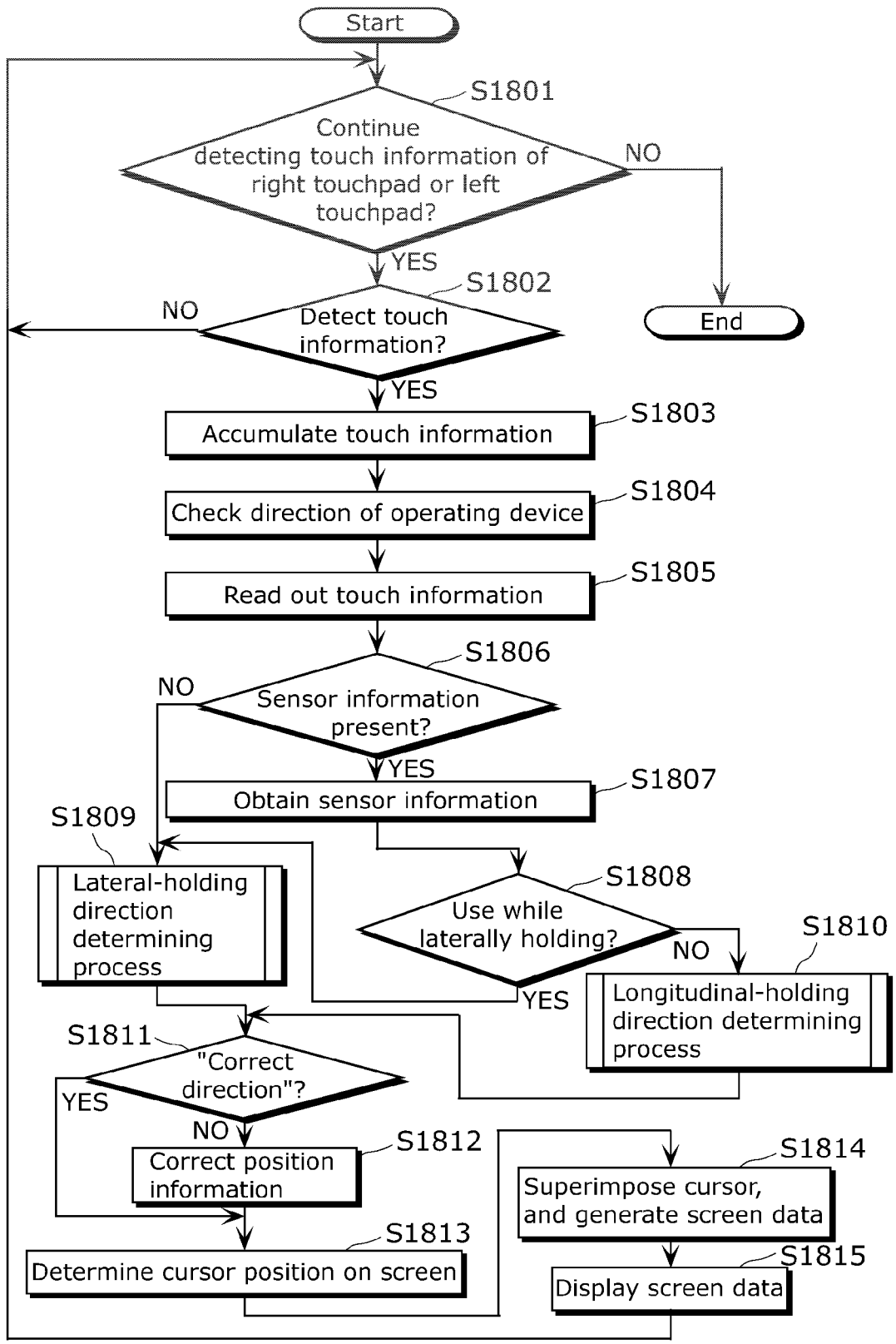
FIG. 18 is diagram showing a whole process flow of the screen display apparatus according to Embodiment 3.
Figure 19:
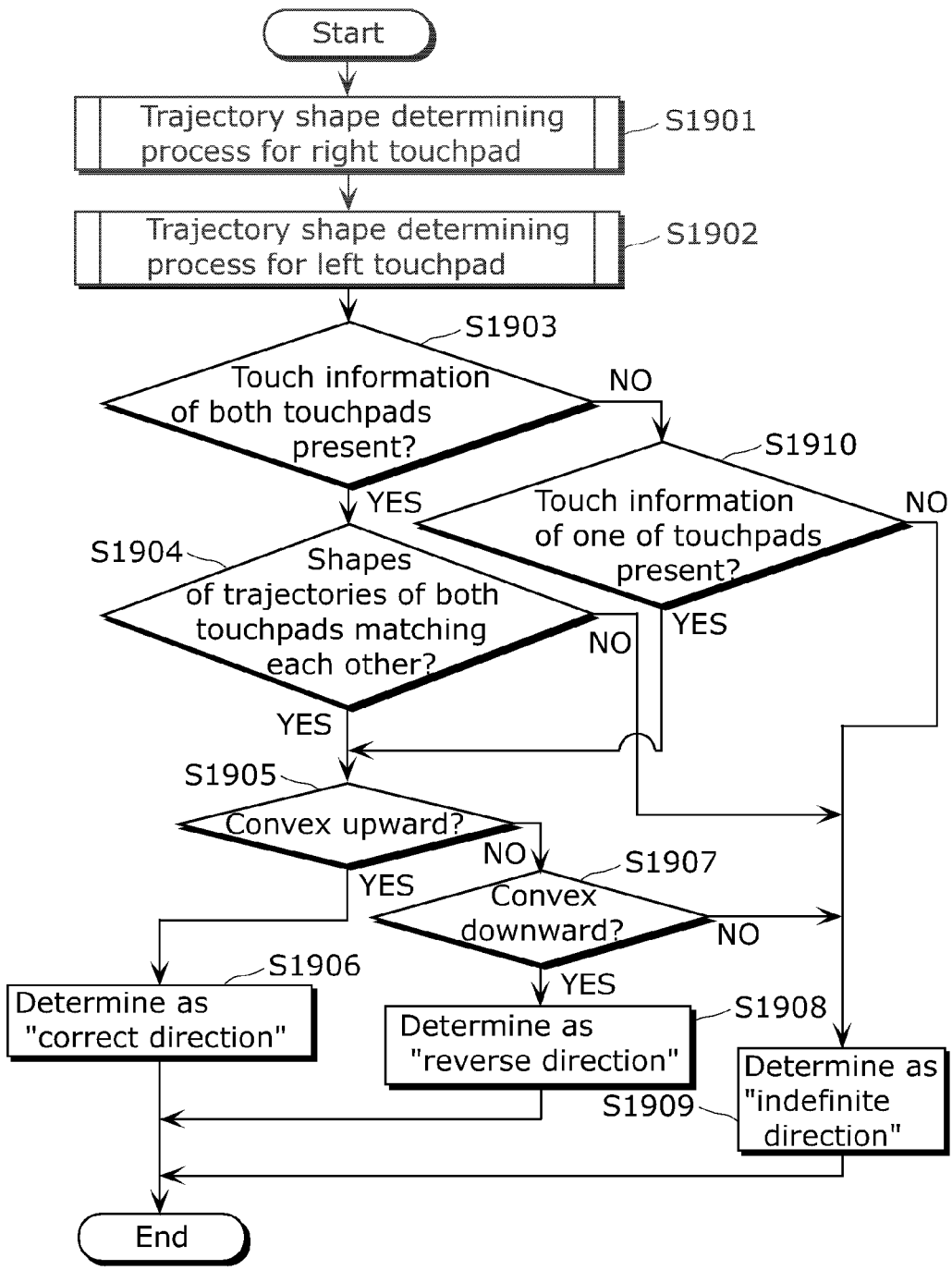
FIG. 19 is a diagram showing a lateral-holding direction determining process flow in a direction determining unit according to Embodiment 3.
Figure 20:
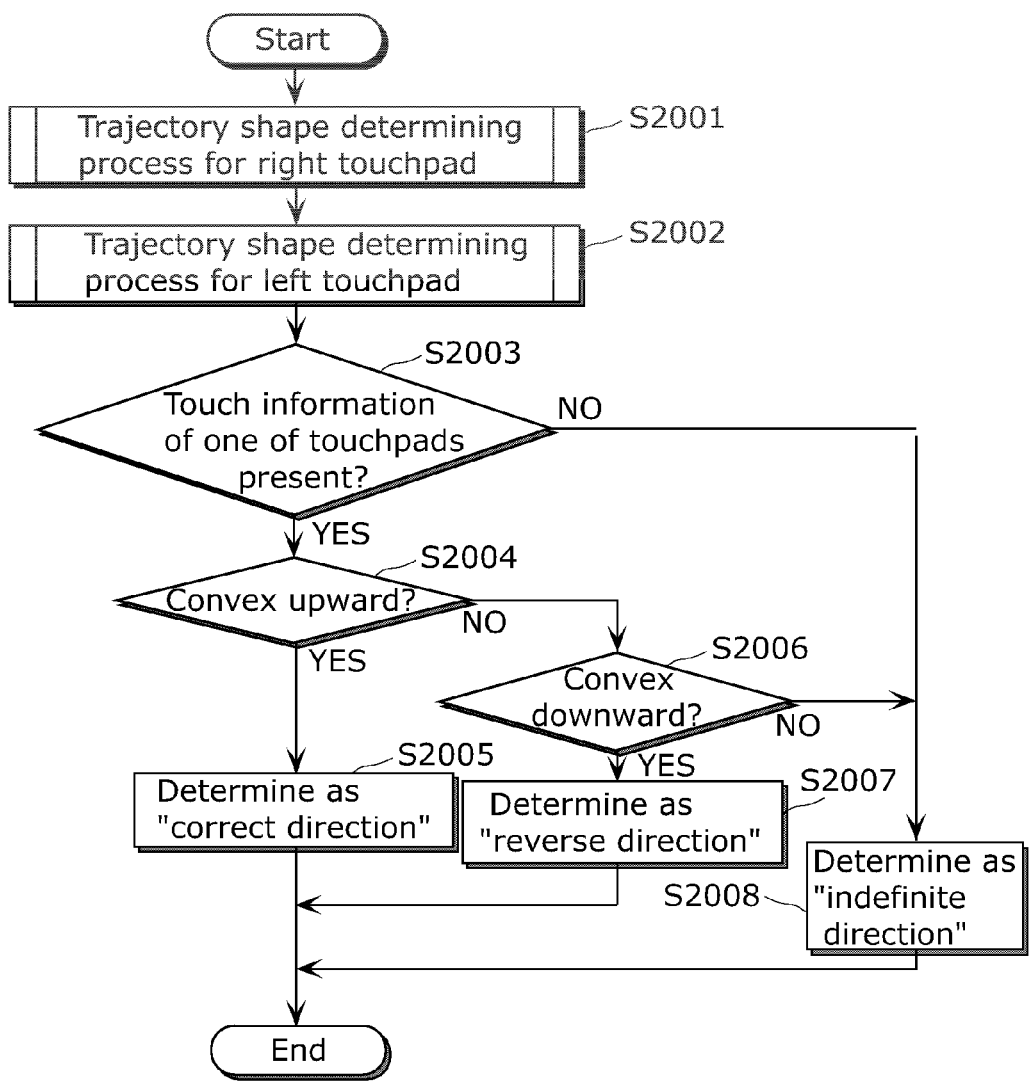
FIG. 20 is a diagram showing a longitudinal-holding direction determining process flow in the direction determining unit according to Embodiment 3.

The following describes a process flow of the screen display apparatus 3 according to Embodiment 3 shown in FIG. 17 with reference to FIGS. 18 to 20.

FIG. 18 is a whole process flow of the screen display apparatus 3 according to Embodiment 3 which is shown in FIG. 17.

First, the touch information detecting unit 901 of the screen display apparatus 3 checks whether or not to continue detecting an input to the right touchpad 802 or the left touchpad 803, based on an instruction from an instruction unit not shown in FIG. 17 (S1801).

Here, when the touch information detecting unit 901 is instructed to discontinue detecting the input to the right touchpad 808 or the left touchpad 803 (NO in S1801), the screen display apparatus 3 ends the process.

On the other hand, when the touch information detecting unit 901 is instructed to continue detecting the input to the right touchpad 802 or the left touchpad 803 (YES in S1801), the touch information detecting unit 901 checks the presence or absence of the input to the right touchpad 802 or the left touchpad 803. Then, the touch information detecting unit 901 detects the presence or absence of the touch information 1000 shown in FIG. 10 (S1802).

Here, when the touch information detecting unit 901 detects "the absence of the touch information" (NO in S1802), the touch information detecting unit 901 checks again whether or not to continue detecting the input (S1801).

On the other hand, when the touch information detecting unit 901 detects "the presence of the touch information" (YES in S1802), the touch information detecting unit 901 causes the touch information accumulation unit 908 to accumulate the touch information 1000 (S1803). More specifically, the touch information detecting unit 901 adds the touch information 1000 to the touch information table 1100 shown in FIG. 11. Moreover, the touch information detecting unit 901 transmits the detected touch information 1000 to the cursor position determining unit 1704, for cursor display on the screen.

Next, the cursor position determining unit 1704 receives the touch information 1000 from the touch information detecting unit 901. Then, the cursor position determining unit 1704 determines whether or not it is necessary to correct the position information 1003 in the touch information 1000. For that purpose, the cursor position determining unit 1704 checks a direction of the operating device 31 with the direction determining unit 1703 (S1804).

Next, the direction determining unit 1703 is checked by the cursor position determining unit 1704. Then, the direction determining unit 1703 accesses the touch information table 1100 of the touch information accumulation unit 902 to read out the touch information 1000 (S1805). Here, the direction determining unit 1703 reads out touch information 1000 generated during a predetermined time period or touch information 1000 having a predetermined amount which is set to the direction determining unit 1703 in advance.

It is to be noted that the touch information accumulation unit 902 sequentially accumulates the touch information 1000 received from the touch information detecting unit 901 at the predetermined time intervals. This makes it possible to obtain, by calculation, an amount of touch information generated during a predetermined time period.

Moreover, when the direction determining unit 1703 reads out the touch information 1000, the touch information accumulation unit 902 may cause the direction determining unit 1703 or the like to temporarily hold the read touch information 1000. The touch information accumulation unit 902 may read out only a difference from touch information 1000 to be newly required. This reduces an amount of the touch information 1000 to be read out subsequently.

Next, the direction determining unit 1703 checks the presence or absence of sensor information with the sensor information detecting unit 1702. Then, the sensor information detecting unit 1702 checks the presence or absence of a signal detected by the sensor 1701 (S1806).

Here, the sensor information detecting unit 1702 obtains the sensor information (S1807) when detecting the sensor information (YES in S1806), and detects which part of the operating device 31 the user holds.

For instance, the sensor 1701, which is a touch sensor, may be disposed at each of four sides of the operating device 31 that are two long side faces and two short side faces. When the sensor information detecting unit 1702 detects touches at the sensors 1701 on the two short side faces, the operating device 31 is recognized as being "held laterally". When the sensor information detecting unit 1702 detects a touch at one of the sensors 1701 on the long side faces, the operating device 31 is recognized as being "held longitudinally".

Subsequently, the sensor information detecting unit 1702 notifies the direction determining unit 1703 of "lateral holding" or "longitudinal holding" as a holding direction.

Next, the direction determining unit 1703 checks whether or not the operating device 31 is "held laterally", from the holding direction notified by the sensor information detecting unit 1702 (S1808).

When the operating device 31 is "held laterally" (YES in S1808), a "lateral-holding" direction of the operating device 31 is determined (S1809: a lateral-holding direction determining process). In this case, the direction determining unit 1703 determines the direction of the operating device 31 using the touch information 1000 read out in the touch information readout process (S1805). Moreover, when the sensor information detecting unit 1702 does not detect the sensor information (NO in S1806), the direction determining unit 1703 determines the direction of the operating device 31 at the time when the operating device 31 is "held laterally".

Subsequently, the direction determining unit 1703 notifies the cursor position determining unit 1704 of the determined direction of the operating device 31. The lateral-holding direction determining process is described in detail later with reference to FIG. 19.

On the other hand, when the operating device 31 is "held longitudinally" (NO in S1808), the direction determining unit 1703 determines a direction of the operating device 31 at the time when the operating device is "held longitudinally" (S1810: a longitudinal-holding direction determining process). In this case, the direction determining unit 1703 determines the direction of the operating device 31 using the touch information 1000 read out in the touch information readout process (S1805).

Subsequently, the direction determining unit 1703 notifies the cursor position determining unit 1704 of the determined direction of the operating device 31. The longitudinal-holding direction determining process is described in detail later with reference to FIG. 20.

The cursor position determining unit 1704 is notified of the determined direction of the operating device 31 by the direction determining unit 1703. Then, the cursor position determining unit 1704 determines whether or not the direction of the operating device 31 is the "correct direction" (S1811).

Here, when the direction of the operating device 31 is the "correct direction" (YES in S1811), the cursor position determining unit 1704 performs a process of determining a cursor position on a screen (S1813).

On the other hand, when the direction of the operating device 31 is other than the "correct direction" (NO in S1811), the cursor position determining unit 1704 corrects the position information 1003 in the touch information 1000 received from the touch information detecting unit 901 (S1812: a position information correcting process). In this case, the cursor position determining unit 1704 corrects, based on the direction of the operating device 31, the position information 1003 so that the cursor is displayed at the same position as in the case where the direction of the operating device 31 is the "correct direction". The position information correcting process is the same as the process described in Embodiment 1.

Next, the cursor position determining unit 1704 determines the cursor position on the screen using the position information 1003 in the touch information 1000 received from the touch information detecting unit 901 or the corrected position information 1003 (S1813).

Specifically, the cursor position determining unit 1704 obtains, from the maximum value and the minimum value in each of a coordinate system of the right touchpad 802 and a coordinate system on screen display, a magnification ratio between the coordinate system of the right touchpad 802 and the coordinate system on the screen display. Moreover, the cursor position determining unit 1704 obtains, from the maximum value and the minimum value in each of a coordinate system of the left touchpad 803 and the coordinate system on the screen display, a magnification ratio between the coordinate system of the left touchpad 803 and the coordinate system on the screen display. This allows the cursor position determining unit 1704 to determine the cursor position on the screen.

In other words, the cursor position determining unit 1704 determines, for each of an x coordinate and a y coordinate of the position information, a cursor position corresponding to the right touchpad 802 through the following calculation: (the cursor position of the right touchpad 802 on the screen display)=(the cursor position on the right touchpad 802)×{(the maximum value of the coordinate system on the screen display)−(the minimum value of the coordinate system on the screen display)}/{(the maximum value of the coordinate system on the right touchpad 802)−(the minimum value of the coordinate system on the right touchpad 802)}.

Likewise, the cursor position determining unit 1704 determines a cursor position corresponding to the left touchpad 803 through the following calculation: (the cursor position of the left touchpad 803 on the screen display)=(the cursor position on the left touchpad 803)×{(the maximum value of the coordinate system on the screen display)−(the minimum value of the coordinate system on the screen display)}/{(the maximum value of the coordinate system on the left touchpad 803)−(the minimum value of the coordinate system on the left touchpad 803)}.

Subsequently, the cursor position determining unit 1704 notifies the screen data generating unit 905 of the x coordinate and the y coordinate of each of the determined cursor positions.

It is to be noted that a different coordinate system on the screen display may be assigned to each of the right touchpad 802 and the left touchpad 803. In this case, "the maximum value of the coordinate system on the screen display" and "the minimum value of the coordinate system on the screen display" are provided for each of the right touchpad 802 and the left touchpad 803 in the above respective calculations. This allows each cursor position to be determined.

The screen data generating unit 905 generates screen data by superimposing a cursor image on a video, an animation, or the like to be displayed by the display unit 906, based on the cursor position notified by the cursor position determining unit 1704 (S1814). Then, the screen data generating unit 905 transmits the generated screen data to the display unit 906.

The display unit 906 displays, on the screen or the like, the screen data received from the screen data generating unit 905 (S1815). After this process ends, the touch information detecting unit 901 checks again whether or not to continue detecting the input (S1801).

This is the end of the description of the whole process flow of the screen display apparatus 3 which is shown in FIG. 18.

The following describes the lateral-holding direction determining process (S1809) shown in FIG. 18 with reference to FIG. 19. Hereafter, plural position information items 1003 in plural touch information items 1000 read out in the touch information readout process (S1805) shown in FIG. 18 are arranged in chronological order, and line segments each of which connects two adjacent points of position information items among the plural position information items are collectively referred to as a "trajectory".

First, the direction determining unit 1703 performs a trajectory shape determining process for the right touchpad 802 using the touch information 1000 read out from the touch information table 1100 (S1901). The trajectory shape determining process is described in detail later with reference to FIG. 21.

Next, the direction determining unit 1703 performs a trajectory shape determining process for the left touchpad 803 using the touch information 1000 read out from the touch information table 1100 (S1902). The trajectory shape determining process is the same as the trajectory shape determining process for the right touchpad (S1901).

Next, the direction determining unit 1703 checks the presence of both touch information 1000 of the right touchpad 802 and touch information 1000 of the left touchpad 803, from the results of the trajectory shape determining process for the right touchpad (S1901) and the trajectory shape determining process for the left touchpad (S1902) (S1903).

Here, when both touch information 1000 of the right touchpad 802 and touch information 1000 of the left touchpad 803 are present (YES in S1903), the direction determining unit 1703 checks whether or not shapes of both trajectories match each other (S1904). In other words, the direction determining unit 1703 checks whether or not the shape of the trajectory of the right touchpad 802 matches that of the left touchpad 803, from the results of the trajectory shape determining process for the right touchpad (S1901) and the trajectory shape determining process for the left touchpad (S1902).

More specifically, the direction determining unit 1703 checks whether the shapes of both trajectories of the right touchpad 802 and the left touchpad 803 are "convex upward" or "convex downward".

On the other hand, when the touch information 1000 of the right touchpad 802 or the touch information 1000 of the left touchpad 803 is absent (NO in S1903), the direction determining unit 1703 checks the presence of one of the touch information 1000 of the right touchpad 802 and the touch information 1000 of the left touchpad 803, from the results of the trajectory shape determining process for the right touchpad (S1901) and the trajectory shape determining process for the left touchpad (S1902) (S1910).

It is to be noted that, here, an example is shown where when one of the touch information 1000 of the right touchpad 802 and the touch information 1000 of the left touchpad 803 is detected, the direction determining unit 1703 performs the direction determining process using a shape of a trajectory. However, only when both touch information 1000 of the right touchpad 802 and touch information 1000 of the left touchpad 803 are detected, the direction determining unit 1703 may perform the direction determining process. In this case, this process (S1910) can be omitted.

When the shape of the trajectory of the right touchpad 802 does not match that of the left touchpad 803 (NO in S1904), the direction determining unit 1703 determines the direction of the operating device 31 as an "indefinite direction" (S1909). Moreover, when both touch information 1000 of the right touchpad 802 and touch information 1000 of the left touchpad 803 are absent (NO in S1910), the direction determining unit 1703 determines the direction of the operating device 31 as the "indefinite direction".

It is to be noted that, in this case, the direction determining unit 1703 may determine that the direction of the operating device 31 is the "correct direction" as a default direction. The default direction may be a direction set in advance as a default value to the screen display apparatus 3 before shipping or a direction set in advance as a default value by the user.

On the other hand, when the shape of the trajectory of the right touchpad 802 matches that of the left touchpad 803 (YES in S1904), the direction determining unit 1703 checks whether or not the matched shape of the trajectories checked in the preceding process is "convex upward" (S1905). Moreover, when one of the touch information 1000 of the right touchpad 802 and the touch information 1000 of the left touchpad 803 is present (YES in S1910), the direction determining unit 1703 checks whether or not the matched shape of the trajectories is "convex upward".

Here, when the matched shape of the trajectories is "convex upward" (YES in S1305), the direction determining unit 1703 determines a direction of the user's finger 804 as an upward direction of the right touchpad 802 and the left touchpad 803, in view of structural characteristics or the like of a person's finger. In other words, the direction determining unit 1703 determines that the direction of the user's finger 804 is the same as a direction in the coordinate system of the right touchpad 802 and the coordinate system of the left touchpad 803.

Moreover, it is considered that the direction of the operating device 31 intended by the user matches the direction of the user's finger 804. Thus, the direction determining unit 1703 determines the direction of the operating device 31 as the "correct direction" (S1906). The direction determining unit 1703 notifies the cursor position determining unit 1704 of the determined direction of the operating device 31, and ends this process.

Meanwhile, when the matched shape of the trajectories is not "convex upward" (NO in S1905), the direction determining unit 903 checks whether or not the matched shape of the trajectories checked in the preceding process is "convex downward" (S1907).

Here, when the matched shape of the trajectories is "convex downward" (YES in S1907), the direction determining unit 1703 determines the direction of the user's finger 804 as a downward direction of the right touchpad 802 and the left touchpad 803, in view of the structural characteristics or the like of the person's finger. In other words, the direction determining unit 1703 determines that the direction of the user's finger 804 is upside-down of a direction in the coordinate system of the right touchpad 802 and the coordinate system of the left touchpad 803 or a direction resulting from turning each of the right touchpad 802 and the left touchpad 803 180 degrees to the right or the left.

Moreover, it is considered that the direction of the operating device 31 intended by the user matches the direction of the user's finger 804. Thus, in contradiction to the case where the direction determining unit 903 determines the direction of the operating device 21 as the "correct direction" (S1906), the direction determining unit 1703 determines the direction of the operating device 31 as the "reverse direction" (S1908). The direction determining unit 1703 notifies the cursor position determining unit 1704 of the determined direction of the operating device 31, and ends this process.

Meanwhile, when the matched shape of the trajectories is not "convex downward" (NO in S1907), as with the case where the shapes of the trajectories of both touchpads do not match each other (NO in S1904) or the like, the direction determining unit 1703 determines the direction of the operating device 31 as the "indefinite direction" (S1909).

This is the end of the description of the lateral-holding direction determining process flow in the direction determining unit 1703.

The following describes the longitudinal-holding direction determining process (S1810) shown in FIG. 18 with reference to FIG. 20.

First, the direction determining unit 1703 performs the trajectory shape determining process for the right touchpad 802 using the touch information 1000 read out from the touch information table 1100 (S2001). The trajectory shape determining process is described in detail later with reference to FIG. 21.

Next, the direction determining unit 1703 performs the trajectory shape determining process for the left touchpad 803 using the touch information 1000 read out from the touch information table 1100 (S2002). The trajectory shape determining process is the same as the trajectory shape determining process for the right touchpad (S2001).

Next, the direction determining unit 1703 checks the presence of at least one of the touch information 1000 of the right touchpad 802 and the touch information 1000 of the left touchpad 803, from the results of the trajectory shape determining process for the right touchpad (S2001) and the trajectory shape determining process for the left touchpad (S2002) (S2003).

Here, when both touch information 1000 of the right touchpad 802 and touch information 1000 of the left touchpad 803 are absent (NO in S2003), the direction determining unit 1703 determines a direction of the operating device 31 as an "indefinite direction" (S2008).

It is to be noted that, in this case, the direction determining unit 1703 may determine that the direction of the operating device 31 is a "correct direction" as a default direction. The default direction may be a direction set in advance as a default value to the screen display apparatus 3 before shipping or a direction set in advance as a default value by the user.

On the other hand, when the at least one of the touch information 1000 of the right touchpad 802 and the touch information 1000 of the left touchpad 803 is present (YES in S2003), the direction determining unit 1703 checks whether or not a shape of a trajectory checked in the preceding process is "convex upward" (S2004). It is to be noted that when both touch information 1000 of the right touchpad 802 and touch information 1000 of the left touchpad 803 are present, the direction determining unit 1703 may use one of touch information items 1000 which has a greater amount of data.

Here, when the shape of the trajectory is "convex upward" (YES in S2004), the direction determining unit 1703 determines a direction of the user's finger 804 as an upward direction at the time when the screen display apparatus 3 is held longitudinally, in view of the structural characteristics of the person's finger. It is to be noted that, in this embodiment, a coordinate system of the right touchpad 802 and a coordinate system of the left touchpad 803 are fixed in a direction to which the operating device 31 is held with the right touchpad 802 facing a forward direction.

It is considered that the direction of the operating device 31 intended by the user matches the direction of the user's finger 804. Thus, the direction determining unit 1703 determines the direction of the operating device 31 as the "correct direction" (S2005). The direction determining unit 1703 notifies the cursor position determining unit 1704 of the determined direction of the operating device 31, and ends this process.

When the shape of the trajectory is not "convex upward" (NO in S2004), the direction determining unit 1703 checks whether or not the shape of the trajectory checked in the preceding process is "convex downward" (S2006).

Here, when the shape of the trajectory is "convex downward" (YES in S2006), the direction determining unit 1703 determines the direction of the user's finger 804 as a downward direction at the time when the screen display apparatus 3 is held longitudinally, in view of the structural characteristics or the like of the person's finger.

Moreover, it is considered that the direction of the operating device 31 intended by the user matches the direction of the user's finger 804. Thus, in contradiction to the case where the direction determining unit 1703 determines the direction of the operating device 31 as the "correct direction" (S2005), the direction determining unit 1703 determines the direction of the operating device 31 as a "reverse direction" (S2007). The direction determining unit 1703 notifies the cursor position determining unit 1704 of the determined direction of the operating device 31, and ends this process.

On the other hand, when the shape of the trajectory is not "convex downward" (NO in S2006), as with the case where the touch information items of both touchpads are absent (NO in S2003), the direction determining unit 1703 determines the direction of the operating device 31 as the "indefinite direction" (S2008).

This is the end of the description of the longitudinal-holding direction determining process flow in the direction determining unit 1703.

Figure 21:
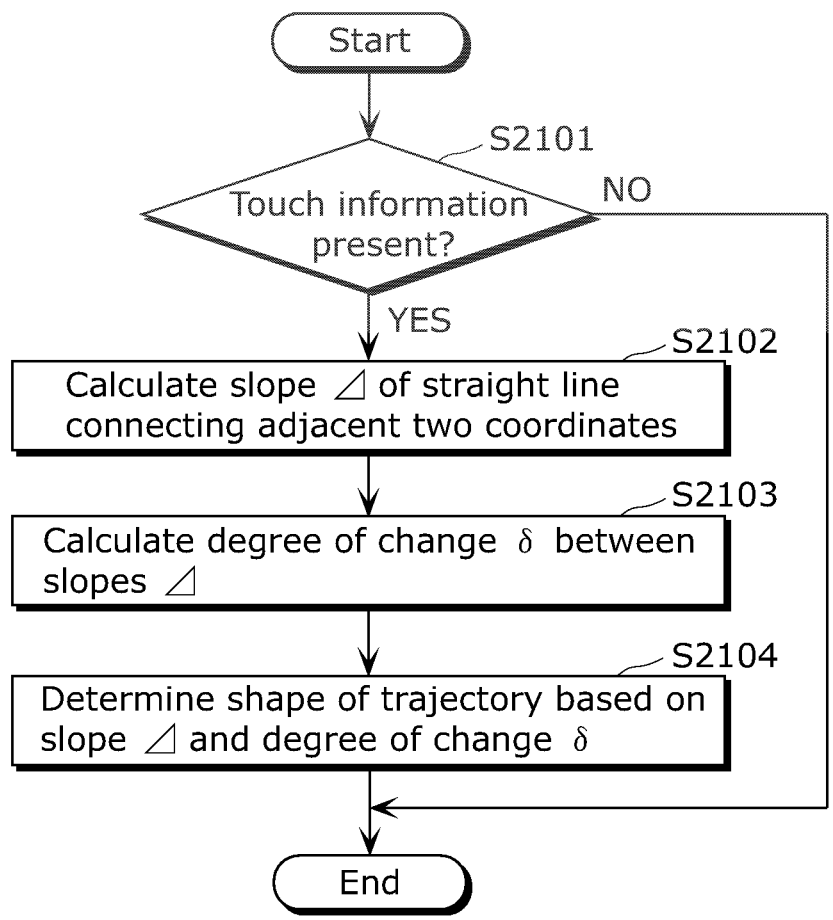
FIG. 21 is a diagram showing a trajectory shape determining process flow in the direction determining unit according to Embodiment 3.

The following describes flows of the trajectory shape determining process for the right touchpad (S1901) and the trajectory shape determining process for the left touchpad (S1902) shown in FIG. 19, and the trajectory shape determining process for the right touchpad (S2001) and the trajectory shape determining process for the left touchpad (S2002) shown in FIG. 20, with reference to FIG. 21 and FIGS. 15A and 15B.

First, the direction determining unit 1703 checks the presence or absence of the touch information 1000 read out from the touch information table 1100 (S2101).

Here, when the read touch information 1000 is absent (NO in S2101), the direction determining unit 1703 ends this process.

On the other hand, when the read touch information 1000 is present (YES in S2101), the direction determining unit 1703 calculates, for the touch information 1000, a slope $\Delta$ of a line segment connecting, on a trajectory, two points each of which is indicated by the position information 1003 (S2102).

The slope $\Delta$ is calculated as (Slope $\Delta$)=(yb−ya)/(xb−xa), where position information items of two points A and B adjacent to each other in chronological order are A (xa, ya) and B (xb, yb). However, here, signs of (yb−ya) and (xb−xa) are considered, and held in association with the calculated slope $\Delta$. In this manner, the direction determining unit 1703 calculates slopes $\Delta$ for all of read touch information items 1000.

Next, the direction determining unit 1703 calculates, for the slope $\Delta$ calculated in the preceding process (S2102), a degree of change $\delta$ between two slopes $\Delta$ adjacent to each other in chronological order (S2103). The degree of change $\delta$ is calculated as (Degree of Change $\delta$)=$\Delta$B−$\Delta$A, where the two slopes $\Delta$ adjacent to each other in chronological order are $\Delta$A and $\Delta$B. The direction determining unit 1703 calculates degrees of change $\delta$ for all of slopes $\Delta$ calculated in the preceding process (S2102).

Next, the direction determining unit 1703 determines a shape of a trajectory from the position information 1003, the slope $\Delta$, and the degree of change $\delta$ (S2104). This process is described again with reference to FIGS. 15A and 15B described in Embodiment 2.

Each of FIGS. 15A and 15B is the diagram showing the method of determining a shape of a trajectory from the slopes $\Delta$ and the degrees of change $\delta$ and further estimating a direction of a user's finger based on the shape of the trajectory, and consequently determining a direction of the operating device 31. Examples of the direction of the operating device 31 include two patterns, that is, a "correct direction" and a "reverse direction". FIG. 15A shows the "correct direction", and FIG. 15B shows the "reverse direction".

The direction determining unit 1703 judges whether (i) a value of the slope calculated in the slope $\Delta$ calculation process (S2102) in the direction determining process flow shown in FIG. 21, (ii) a difference "$\Delta$x" of the x coordinate and a difference "$\Delta$y" of the y coordinate at the time of calculating the slope $\Delta$, and (iii) a value of the degree of change $\delta$ calculated in the degree of change calculation process is positive or negative (S2103) are positive or negative.

In each of FIGS. 15A and 15B, the table shows the results of judging whether the values are positive or negative. Here, "+" indicates positive, and "−" indicates negative. Though not shown in the table, the case where the slope $\Delta$ or the degree of change $\delta$ is 0 may be considered as the special situation expressed by "±". Moreover, though not shown in the table, the case where the slope $\Delta$ is infinity, the case where the slope $\Delta$ cannot be calculated when $\Delta$x is 0, or the like can be considered. These cases may be considered as the characteristics of the shape of the trajectory.

In the case of FIG. 15A, the slope Δ changes from "+" to "−", and all of the degrees of change δ are "−". The direction determining unit 1703 determines that the trajectory is "convex upward", in consideration of values of Δx and Δy.

In the case of FIG. 15B, the slope Δ changes from "−" to "+", and all of the degrees of change δ are "+". The direction determining unit 1703 determines that the trajectory is "convex downward", in consideration of values of Δx and Δy.

When the combination of the changes in the slope Δ and the degree of change δ does not correspond to any of the cases of FIGS. 15A and 15B, the direction determining unit 1703 cannot determine the shape of the trajectory. As a result, the direction determining unit 1703 determines the shape of the trajectory as the "indefinite shape". For instance, the case where the number of position information items 1003 included in the trajectory is not enough can be considered as the case where the direction determining unit 1703 cannot determine the shape of the trajectory.

It is to be noted that even when the combination of the changes in the slope Δ and the degree of change δ does not correspond to any of the cases of FIGS. 15A and 15B, the direction determining unit 1703 may determine which of the patterns of FIGS. 15A and 15B the combination of the changes in the slope Δ and the degree of change δ is most similar to. In this manner, the direction determining unit 1703 may determine the shape of the trajectory as one of the shapes shown in FIGS. 15A and 15B.

This is the end of the description of the flows of the trajectory shape determining process for the right touchpad (S1901) and the trajectory shape determining process for the left touchpad (S1902) shown in FIG. 19, and the trajectory shape determining process for the right touchpad (S2001) and the trajectory shape determining process for the left touchpad (S2002) shown in FIG. 20.

This is the end of the description of the process flow of the screen display apparatus 3 according to Embodiment 3.

With the above-described configuration, the screen display apparatus 3 causes the sensor information detecting unit 1702 to detect the sensor information from the sensor 1701, and thus recognizes the holding direction of the operating device 31. The touch information accumulation unit 902 accumulates the touch information items 1000 detected on the two touchpads, the right touchpad 802 and the left touchpad 803, by the touch information detecting unit 901.

The direction determining unit 1703 determines the direction of the operating device 31 using the shape of the trajectory of one of the right touchpad 802 and the left touchpad 803 or the shapes of the trajectories of both right touchpad 802 and left touchpad 803, from the result of recognizing the holding direction by the sensor information detecting unit 1702 and the position information 1003 in the touch information 1000. The cursor position determining unit 1704 properly corrects the position information 1003 in the touch information 1000 received from the touch information detecting unit 901, depending on the holding direction and the direction of the operating device 31, and determines the display position of the cursor 806.

Consequently, even when the user laterally or longitudinally holds the operating device 31 in any direction, the screen display apparatus 3 makes it possible to properly and automatically determine the direction of the operating device 31 based only on the inputs to the right touchpad 802 and the left touchpad 803 by the user, and display the cursor 806 at the correct position. Therefore, the screen display apparatus 3 makes it possible to achieve the comfortable operability for the user.

Embodiment 4

A screen display apparatus according to Embodiment 4 includes two touchpads, a sensor for detecting which part of an operating device a user holds, and a sensor for detecting a gravity direction of the operating device. The screen display apparatus recognizes a direction of the operating device using inputs on the touchpads of the screen display apparatus by the user and the result of detecting a holding direction of the operating device by the sensor, and displays an alert on a screen when the result of the recognition does not match the result of detecting the holding direction of the operating device by the sensor.

Figure 22:
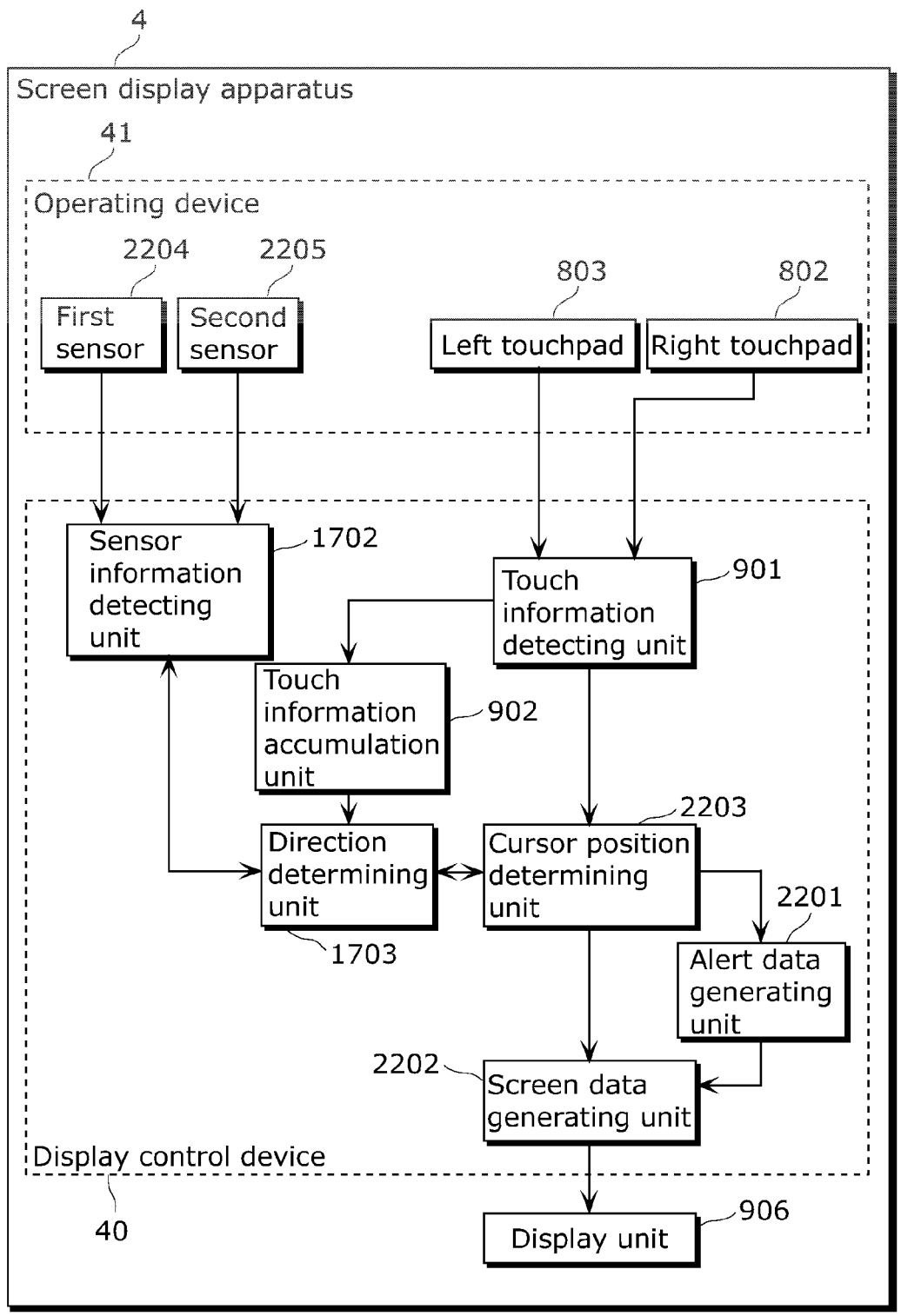
FIG. 22 is a configuration diagram of a screen display apparatus according to Embodiment 4.

FIG. 22 is a configuration diagram of a screen display apparatus according to Embodiment 4. In FIG. 22, the same reference signs are assigned to the same constituent elements as in FIG. 17, and a description thereof is omitted.

A screen display apparatus 4 shown in FIG. 22 includes an alert data generating unit 2201, a screen data generating unit 2202, a cursor position determining unit 2203, a first sensor 2204, a second sensor 2205, the right touchpad 802, the left touchpad 803, the touch information detecting unit 901, the touch information accumulation unit 902, the display unit 906, the sensor information detecting unit 1702, and the direction determining unit 1703.

An operating device 41 shown in FIG. 22 includes the first sensor 2204, the second sensor 2205, the right touchpad 802, and the left touchpad 803. A display control device 40 includes the alert data generating unit 2201, the screen data generating unit 2202, the touch information detecting unit 901, the touch information accumulation unit 902, the cursor position determining unit 2203, the sensor information detecting unit 1702, and the direction determining unit 1703.

The display control device 40 receives signals from the operating device 41, and generates screen data to be displayed on a screen. It is to be noted that the display control device 40 may be incorporated into the operating device 41 or the display unit 906. Here, although the touch information detecting unit 901 is included in the display control device 40, the touch information detecting unit 901 may be included in the operating device 41.

The alert data generating unit 2201 determines that the user holds the operating device 41 in a "reverse direction", from a direction of the operating device 41 determined by the direction determining unit 1703, and generates an alert message (also referred to as alert data) to be presented to the user. When a coordinate system of the right touchpad 802 does not match that of the left touchpad 803, the alert data generating unit 2201 may generate the alert message.

It is to be noted that various feedback methods of not only generating an alert message but also changing a color or shape of an object on a screen can be applied as a method of presenting (feeding back) an alert or the like to a user. Moreover, a feedback method using not only screen display but also sound can be applied.

The screen data generating unit 2202 is a unit which generates screen data based on display positions or the like of a message generated by the alert data generating unit 2201 and a cursor determined by the cursor position determining unit 2203.

The screen data generating unit 2202 superimposes a cursor image on an image of an application such as a video viewer and a web browser, and further superimposes, when receiving the alert message from the alert data generating unit 2201, the alert message on the screen data. In this manner, the screen data generating unit 2202 generates the screen data to be displayed by the display unit 906.

The cursor position determining unit 2203 is a unit which calculates a position of the cursor to be displayed on the screen, from the holding direction of the operating device 41 notified by the direction determining unit 1703, the direction of the operating device 41 determined by the direction determining unit 1703, and the touch information detected by the touch information detecting unit 901.

The cursor position determining unit 2203 converts (coordinate converts) values of position information in the touch information, based on the holding direction (lateral holding or longitudinal holding) of the operating device 41. Moreover, when the direction determining unit 1703 determines that the user does not hold the operating device 41 in the "correct direction", the cursor position determining unit 2203 requests the alert data generating unit 2201 to generate the alert message for calling attention to the user, urging the user to switch the holding direction of the operation device 41, and so on.

Here, the conversion of the position information based on the holding direction (lateral holding or longitudinal holding) of the operating device 41 refers to a process of converting position information into a coordinate system of a holding direction set as a standard. For instance, when coordinate systems of the right touchpad 802 and the left touchpad 804 are set as fixed with the longitudinal holding of the operating device 41 (the holding direction of the remote control 1601 shown in FIG. 16) being a standard and when the operating device 41 is held laterally, position information is converted.

In this case, the cursor position determining unit 2203 turns the coordinate systems of the right touchpad 802 and the left touchpad 803 90 degrees to the left so that the coordinate systems correspond to the coordinate system of the holding direction set as the standard. In other words, the cursor position determining unit 2203 turns the position information 90 degrees to the left with central coordinates C of the coordinate system of each of the right touchpad 802 and the left touchpad 803 being a pivot.

The first sensor 2204 is a touch sensor for detecting a touch with a user's finger. At least one touch sensor is provided at an outer peripheral part of the operating device 41. It is to be noted that such a sensor for detecting the touch with the user's finger is a publicly known technique, and thus a detailed description thereof is omitted here.

The second sensor 2205 is a gravity sensor for detecting a gravity direction of the operating device 41, and is included in the operating device 41. It is to be noted that such a gravity sensor for recognizing one of head and tail directions of the operating device 41 by detecting a direction of gravity on the operating device 41 is a publicly known technique, and thus a detailed description thereof is omitted here.

The sensor information detecting unit 1702 detects held-part information that is information about part of the operating device 41 held by the user, from the first sensor 2204, and gravity direction information that is information about a direction of gravity on the operating device 41, from the second sensor 2205. The gravity direction information may include information about a slope of the operating device 41 with respect to a gravity direction. Moreover, the gravity direction information may include information about upward and downward directions of the operating device 41, that is, information indicating which face of the operating device 41 is an upper side or a lower side with respect to the gravity direction.

Moreover, the cursor position determining unit 2203 determines a display position of the cursor (a cursor position) on the screen using the position information received from the touch information detecting unit 901 or the position information corrected by the cursor position determining unit 2203.

This is the end of the description of the configuration of the screen display apparatus 4 according to Embodiment 4.

Figure 23:
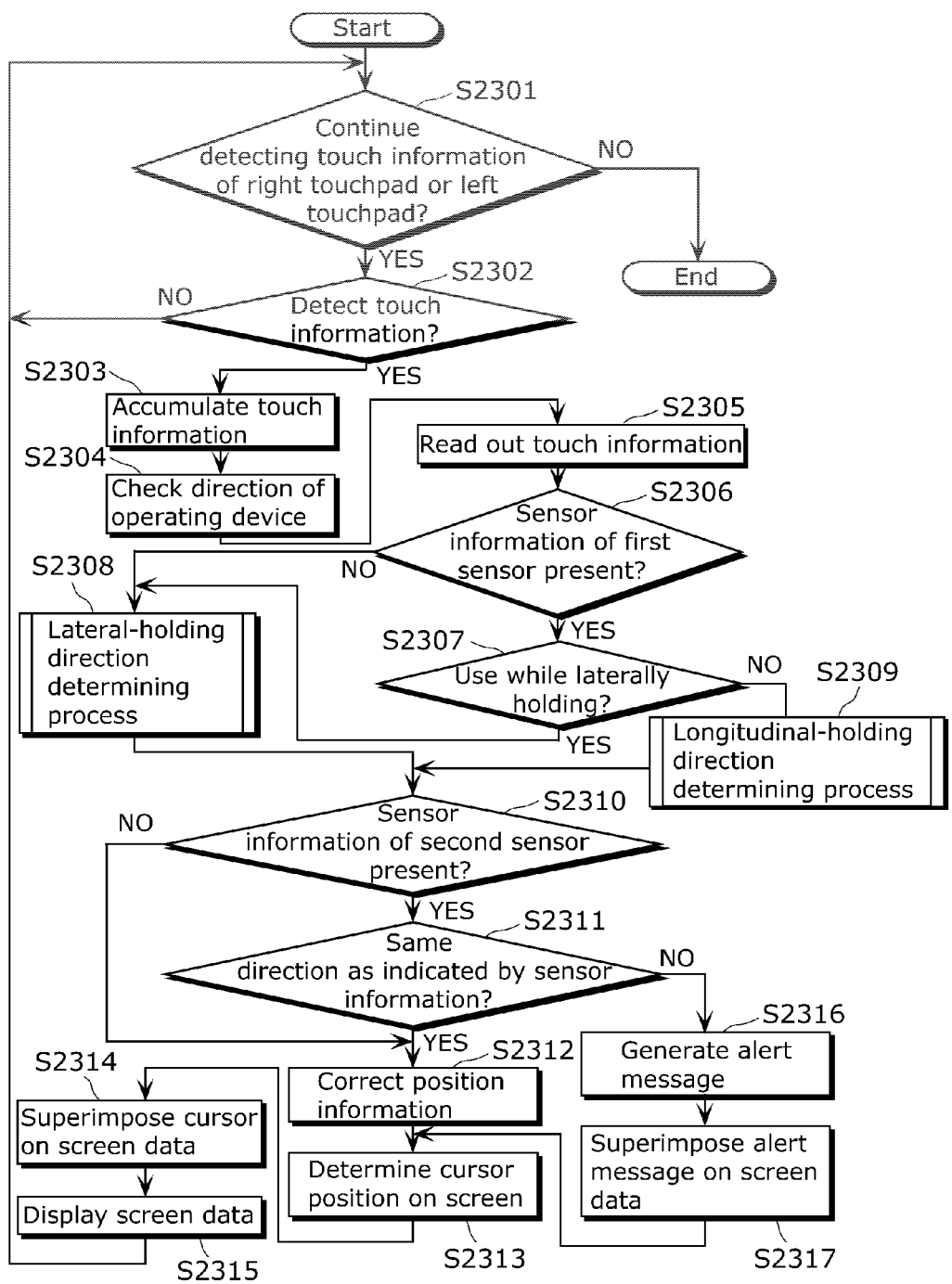
FIG. 23 is diagram showing a whole process flow of a screen display apparatus according to Embodiment 4.

The following describes a whole process flow of the screen display apparatus 4 according to Embodiment 4 shown in FIG. 22 with reference to FIG. 23. It is to be noted that the "lateral-holding direction determining process (S2308)" and the "longitudinal-holding direction determining process (S2309)" shown in FIG. 23 are the same as those described in Embodiment 3 with reference to FIGS. 19 to 21. Thus, referring to the description of FIGS. 19 to 21 in Embodiment 3, a description of the processes is omitted here. However, in the description of FIGS. 19 to 21 in Embodiment 3, the "screen display apparatus 3" corresponds to the "screen display apparatus 4", and the constituent elements in Embodiment 3 such as the "cursor position determining unit 1704" correspond to constituent elements in Embodiment 4 such as the "cursor position determining unit 2203".

First, the touch information detecting unit 901 of the screen display apparatus 4 checks whether or not to continue detecting an input to the right touchpad 802 or the left touchpad 803, based on an instruction from an instruction unit not shown in FIG. 22 (S2301).

Here, when the touch information detecting unit 901 is instructed to discontinue detecting the input to the right touchpad 803 or the left touchpad 803 (NO in S2301), the screen display apparatus 4 ends the process.

On the other hand, when the touch information detecting unit 901 is instructed to continue detecting the input to the right touchpad 802 or the left touchpad 803 (YES in S2301), the touch information detecting unit 901 checks the presence or absence of the input to the right touchpad 802 or the left touchpad 803. Then, the touch information detecting unit 901 detects the presence or absence of the touch information 1000 shown in FIG. 10 (S2302).

Here, when the touch information detecting unit 901 detects "the absence of the touch information" (NO in S2302), the touch information detecting unit 901 checks again whether or not to continue detecting the input (S2301).

On the other hand, when the touch information detecting unit 901 detects "the presence of the touch information" (YES in S2302), the touch information detecting unit 901 causes the touch information accumulation unit 902 to accumulate the touch information 1000 (S2303). More specifically, the touch information detecting unit 901 adds the touch information 1000 to the touch information table 1100 shown in FIG. 11. Moreover, the touch information detecting unit 901 transmits the detected touch information 1000 to the cursor position determining unit 2203, for cursor display on the screen.

The cursor position determining unit 2203 receives the touch information 1000 from the touch information detecting unit 901. Then, the cursor position determining unit 2203 checks a direction of the operating device 41 with the direction determining unit 1703 so as to determine whether or not it is necessary to correct position information 1003 in the touch information 1000 (S2304).

The direction determining unit 1703 is checked by the cursor position determining unit 2203. Then, the direction determining unit 1703 accesses the touch information table 1100 of the touch information accumulation unit 902 to read out the touch information 1000 (S2305). Here, the direction determining unit 1703 reads out touch information 1000 generated during a predetermined time period or touch information 1000 having a predetermined amount which is set to the direction determining unit 1703 in advance.

It is to be noted that the touch information accumulation unit 902 sequentially accumulates the touch information 1000 received from the touch information detecting unit 901 at predetermined time intervals. This makes it possible to obtain, by calculation, an amount of touch information generated during a predetermined time period.

Moreover, when the direction determining unit 1703 reads out the touch information 1000, the touch information accumulation unit 902 may cause the direction determining unit 1703 or the like to temporarily hold the read touch information 1000. The touch information accumulation unit 902 may read out only a difference from touch information 1000 to be newly required. This reduces an amount of the touch information 1000 to be read out subsequently.

Next, the direction determining unit 1703 checks, with the sensor information detecting unit 1702, the presence or absence of sensor information from the first sensor 2204. The sensor information detecting unit 1702 checks the presence or absence of a signal detected by the first sensor 2204 (S2306).

Here, when the sensor information detecting unit 1702 detects the sensor information from the first sensor 2204 (YES in S2306), the sensor information detecting unit 1702 obtains the sensor information from the first sensor 2204. Then, the sensor information detecting unit 1702 detects which part of the operating device 41 the user holds, and checks whether the operating device 41 is "held laterally" (S2307).

For instance, the sensor 1701, which is a touch sensor, may be disposed at each of four sides of the operating device 41 that are two long side faces and two short side faces. When the sensor information detecting unit 1702 detects touches at the sensors 1701 on the two short side faces, the operating device 41 is recognized as being "held laterally". When the sensor information detecting unit 1702 detects a touch at one of the sensors 1701 on the long side faces, the operating device 41 is recognized as being "held longitudinally".

Subsequently, the sensor information detecting unit 1702 notifies the direction determining unit 1703 of "lateral holding" or "longitudinal holding" as a holding direction.

When the operating device 41 is "held laterally" (YES in S2307) or when the sensor information detecting unit 1702 does not detect the sensor information from the first sensor 2204 (NO in S2306), the direction determining unit 1703 determines a direction of the operating device 41 at the time when the operating device 41 is "held laterally", using the touch information 1000 read out in the touch information readout process (S2305) (S2308: a lateral-holding direction determining process).

Subsequently, the direction determining unit 1703 notifies the cursor position determining unit 2203 of the determined direction of the operating device 41. The lateral-holding direction determining process is the same as the process described in Embodiment 3 with reference to FIG. 19.

On the other hand, when the operating device 41 is "held longitudinally" (NO in S2307), the direction determining unit 1703 determines the direction of the operating device 41 at the time when the operating device 41 is "held longitudinally", using the touch information 1000 read out in the touch information readout process (S2305) (S2309: a longitudinal-holding direction determining process). Subsequently, the direction determining unit 1703 notifies the cursor position determining unit 2203 of the determined direction of the operating device 41. The longitudinal-holding direction determining process is the same as the process described in Embodiment 3 with reference to FIG. 20.

Next, the cursor position determining unit 2203 checks, with the direction determining unit 1703, the presence or absence of sensor information from the second sensor 2205. Next, the direction determining unit 1703 checks, with the sensor information detecting unit 1702, the presence or absence of sensor information from the first sensor 2204 (S2310).

Here, when the sensor information detecting unit 1702 detects the sensor information from the second sensor 2205 (YES in S2310), the cursor position determining unit 2203 is notified of two directions. In other words, the direction determining unit 1703 notifies the cursor position determining unit 2203 of the direction of the operating device 41 determined in one of the lateral-holding direction determining process (S2308) and the longitudinal-holding direction determining process (S2309), and the direction of the operating device 41 detected by the second sensor 2205. The cursor position determining unit 2203 judges whether or not the directions match each other (S2311).

When the directions do not match each other (NO in S2311), the cursor position determining unit 2203 requests the alert data generating unit 2201 to generate an alert message. The alert data generating unit 2201 generates the alert message for notifying the user that the direction of the operating device 41 is reverse or causing the user to recognize the direction of the operating device 41 (S2316).

More specifically, the alert data generating unit 2201 generates the alert message such as "Please check whether the remote control is held in the correction direction" and "Please reverse the direction of the remote control", and transmits the generated alert message to the screen data generating unit 2202.

When the screen data generating unit 2202 receives the alert message from the alert data generating unit 2201, the screen data generating unit 2202 superimposes the alert message on screen data (S2317).

Meanwhile, when the sensor information detecting unit 1702 does not detect the sensor information from the second sensor 2205 (NO in S2310), the cursor position determining unit 2203 converts the position information 1003 based on the holding direction (lateral holding or longitudinal holding) of the operating device 41. Moreover, when the direction of the operating device 41 determined by the direction determining unit 1703 is the same as the direction indicated by the sensor information (YES in S2311), the cursor position determining unit 2203 converts the position information 1003 based on the holding direction of the operating device 41.

For example, when the operating device 41 is "held longitudinally", the cursor position determining unit 2203 converts the position information 1003 in the touch information 1000 received from the touch information detecting unit 901. Specifically, when the operating device 41 is "held longitudinally", the cursor position determining unit 2203 turns the position information 90 degrees to the left with central coordinates C of the coordinate system of each of the right touchpad 802 and the left touchpad 803 being a pivot. This makes it possible to obtain an appropriate cursor position.

Meanwhile, when the operating device 41 is "held laterally", the coordinate systems of both right touchpad 802 and left touchpad 803 match the direction. Thus, such coordinate conversion is not performed.

Furthermore, the cursor position determining unit 2203 corrects the position information 1003 in the touch information 1000 received from the touch information detecting unit 901 (S2312: a position information correcting process). Here, the cursor position determining unit 2203 corrects the position information 1003 based on the direction of the operating device 41 which is notified by the direction determining unit 1703 and determined in one of the lateral-holding direction determining process (S2308) or the longitudinal-holding direction determining process (S2309).

More specifically, the cursor position determining unit 2203 corrects the position information 1003 so that the cursor is displayed at the same position as in the case where the direction of the operating device 41 is the "correct direction". The position information correcting process is the same as the process described in Embodiment 1.

Next, the cursor position determining unit 2203 determines the cursor position on the screen (S2313). Specifically, the cursor position determining unit 2203 obtains, from the maximum value and the minimum value in each of a coordinate system of the right touchpad 802 and a coordinate system on screen display, a magnification ratio between the coordinate system of the right touchpad 802 and the coordinate system on the screen display. Moreover, the cursor position determining unit 2203 obtains, from the maximum value and the minimum value in each of a coordinate system of the left touchpad 803 and the coordinate system on the screen display, a magnification ratio between the coordinate system of the left touchpad 803 and the coordinate system on the screen display. This allows the cursor position determining unit 2203 to determine the cursor position on the screen.

In other words, the cursor position determining unit 2203 determines, for each of an x coordinate and a y coordinate of the position information, a cursor position corresponding to the right touchpad 802 through the following calculation: (the cursor position of the right touchpad 802 on the screen display)=(the cursor position on the right touchpad 802)×{(the maximum value of the coordinate system on the screen display)−(the minimum value of the coordinate system on the screen display)}/{(the maximum value of the coordinate system on the right touchpad 802)−(the minimum value of the coordinate system on the right touchpad 802)}.

Likewise, the cursor position determining unit 2203 determines a cursor position corresponding to the left touchpad 803 through the following calculation: (the cursor position of the left touchpad 803 on the screen display)=(the cursor position on the left touchpad 803)×{(the maximum value of the coordinate system on the screen display)−(the minimum value of the coordinate system on the screen display)}/{(the maximum value of the coordinate system on the left touchpad 803)−(the minimum value of the coordinate system on the left touchpad 803)}.

Subsequently, the cursor position determining unit 2203 notifies the screen data generating unit 2202 of the x coordinate and the y coordinate of each of the determined cursor positions.

It is to be noted that a different coordinate system on the screen display may be assigned to each of the right touchpad 802 and the left touchpad 803. In this case, "the maximum value of the coordinate system on the screen display" and "the minimum value of the coordinate system on the screen display" are provided for each of the right touchpad 802 and the left touchpad 803 in the above respective calculations. This allows each cursor position to be determined.

Next, the screen data generating unit 2202 generates screen data by superimposing a cursor image on a video, an animation, or the like to be displayed by the display unit 906, based on the cursor position notified by the cursor position determining unit 2203 (S2314).

The display unit 906 displays, on the screen or the like, the screen data received from the screen data generating unit 2202 (S2315). After this process ends, the touch information detecting unit 901 checks again whether or not to continue detecting the input (S2301).

It is to be noted that when the sensor information detecting unit 1702 does not detect the sensor information from the second sensor 2205 (NO in S2310), the cursor position determining unit 2203 may not perform the correction of the position information (S2312) but request the generation of the alert message (S2316). Alternatively, the cursor position determining unit 2203 may determine the cursor position on the screen (S2313) without the correction.

This is the end of the description of the whole process flow of the screen display apparatus 4 which is shown in FIG. 23.

With the above-described configuration, the touch information accumulation unit 902 of the screen display apparatus 4 accumulates the touch information items 1000 detected on the two touchpads, the right touchpad 802 and the left touchpad 803, by the touch information detecting unit 901. Then, the direction determining unit 1703 determines the direction of the operating device 41 using the shapes of the trajectories of the right touchpad 802 and the left touchpad 803, from the position information 1003 in the touch information 1000.

The direction of the operating device 41 determined by the direction determining unit 1703 is checked against the direction of the operating device 41 detected by the second sensor 2205. When the directions do not match each other, the alert message is displayed on the screen. Thus, when it is judged that the user improperly holds the operating device 41, the screen display apparatus 4 makes it possible to properly and promptly urge the user to switch the holding direction of the operating device 41 or the like, using the inputs to the right touchpad 802 and the left touchpad 803 by the user.

Embodiment 5

A screen display apparatus according to Embodiment 5 includes two touchpads, and recognizes a direction of an operating device using a distribution of position information (coordinates) indicating inputs on the touchpads by a user. The screen display apparatus then corrects a display position of a cursor on a screen based on the direction of the operating device.

Figure 24:
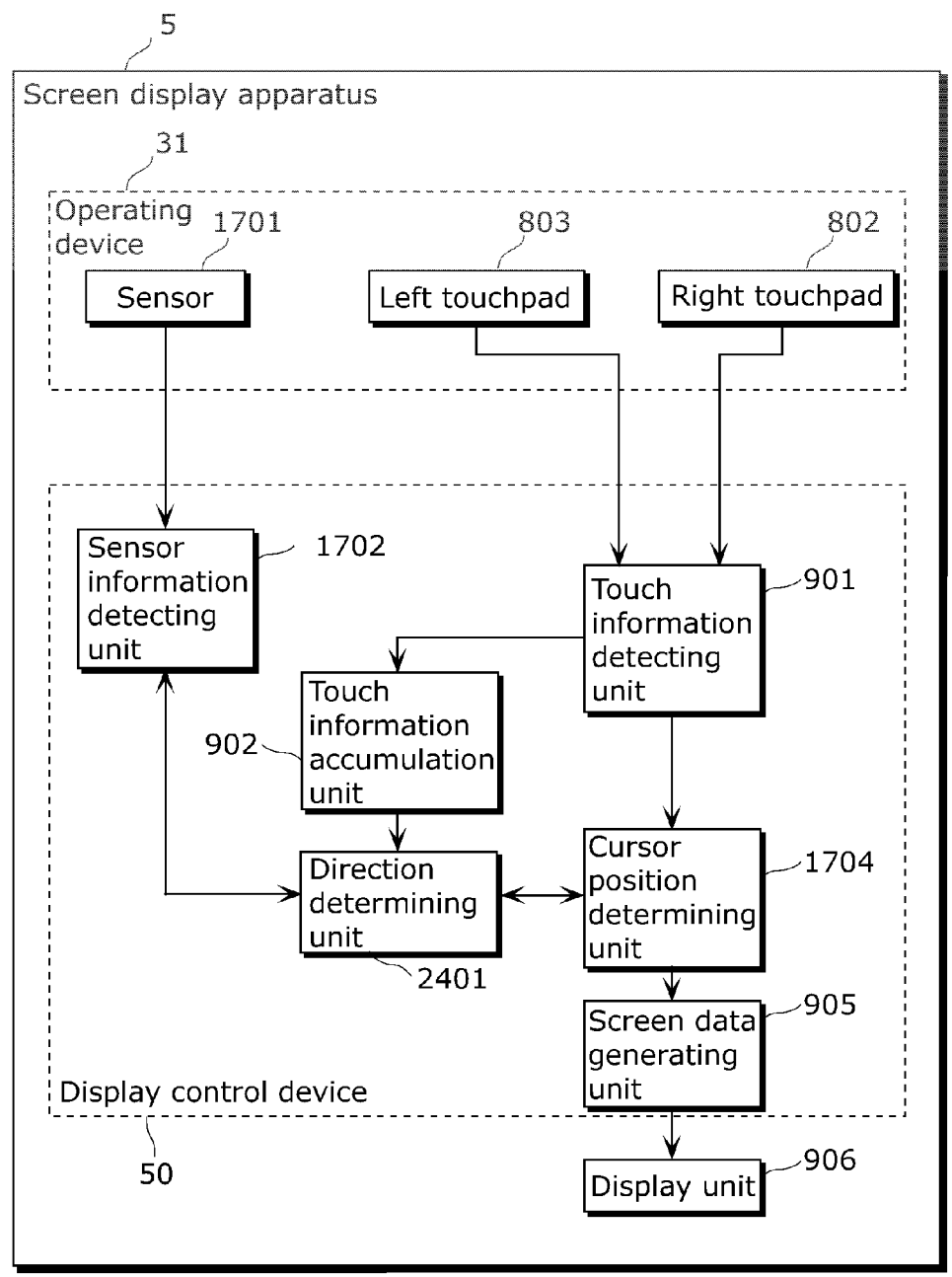
FIG. 24 is a configuration diagram of a screen display apparatus according to Embodiment 5.

FIG. 24 is a configuration diagram of a screen display apparatus according to Embodiment 5. In FIG. 24, the same reference signs are assigned to the same constituent elements as in FIG. 17, and a description thereof is omitted.

A screen display apparatus 5 shown in FIG. 24 includes a direction determining unit 2401, the right touchpad 802, the left touchpad 803, the touch information detecting unit 901, the touch information accumulation unit 902, the screen data generating unit 905, the display unit 906, the sensor 1701, the sensor information detecting unit 1702, and the cursor position determining unit 1704.

The operating device 31 shown in FIG. 24 includes the right touchpad 802, the left touchpad 803, and the sensor 1701. A display control device 50 includes the direction determining unit 2401, the touch information detecting unit 901, the touch information accumulation unit 902, the screen data generating unit 905, the sensor information detecting unit 1702, and the cursor position determining unit 1704.

The display control device 50 receives signals from the operating device 31, and generates screen data to be displayed on a screen. It is to be noted that the display control device 50 may be incorporated into the operating device 31 or the display unit 906. Here, although the touch information detecting unit 901 is included in the display control device 50, the touch information detecting unit 901 may be included in the operating device 31.

The direction determining unit 2401 is a unit which determines the direction of the operating device 31 based on a holding position of the operating device 31 by the user, which is detected by the sensor information detecting unit 1702, and touch information accumulated by the touch information accumulation unit 902. Specifically, the direction determining unit 2401 determines, from the holding position detected by the sensor information detecting unit 1702, whether the holding direction of the operating device 31 is lateral holding or longitudinal holding. Then, the direction determining unit 2401 determines which direction the operating device 31 faces, based on a distribution of position information in touch information generated during a predetermined time period or having a predetermined amount.

It is to be noted that, hereafter, although the direction determining unit 2401 can basically determine the direction of the operating device 31 using touch information obtained through an operation of naturally touching a touchpad by the user, the present invention is not limited to this. Such touch information is obtained at a moment when the user starts holding the operating device 31, when an application is switched, when a holding direction of the operating device 31 is changed while an application is being used, or the like.

This is the end of the description of the configuration of the screen display apparatus 5 according to Embodiment 5.

The following describes a process flow of the screen display apparatus 5 according to Embodiment 5 shown in FIG. 24 with reference to FIGS. 25 to 28.

Figure 25:
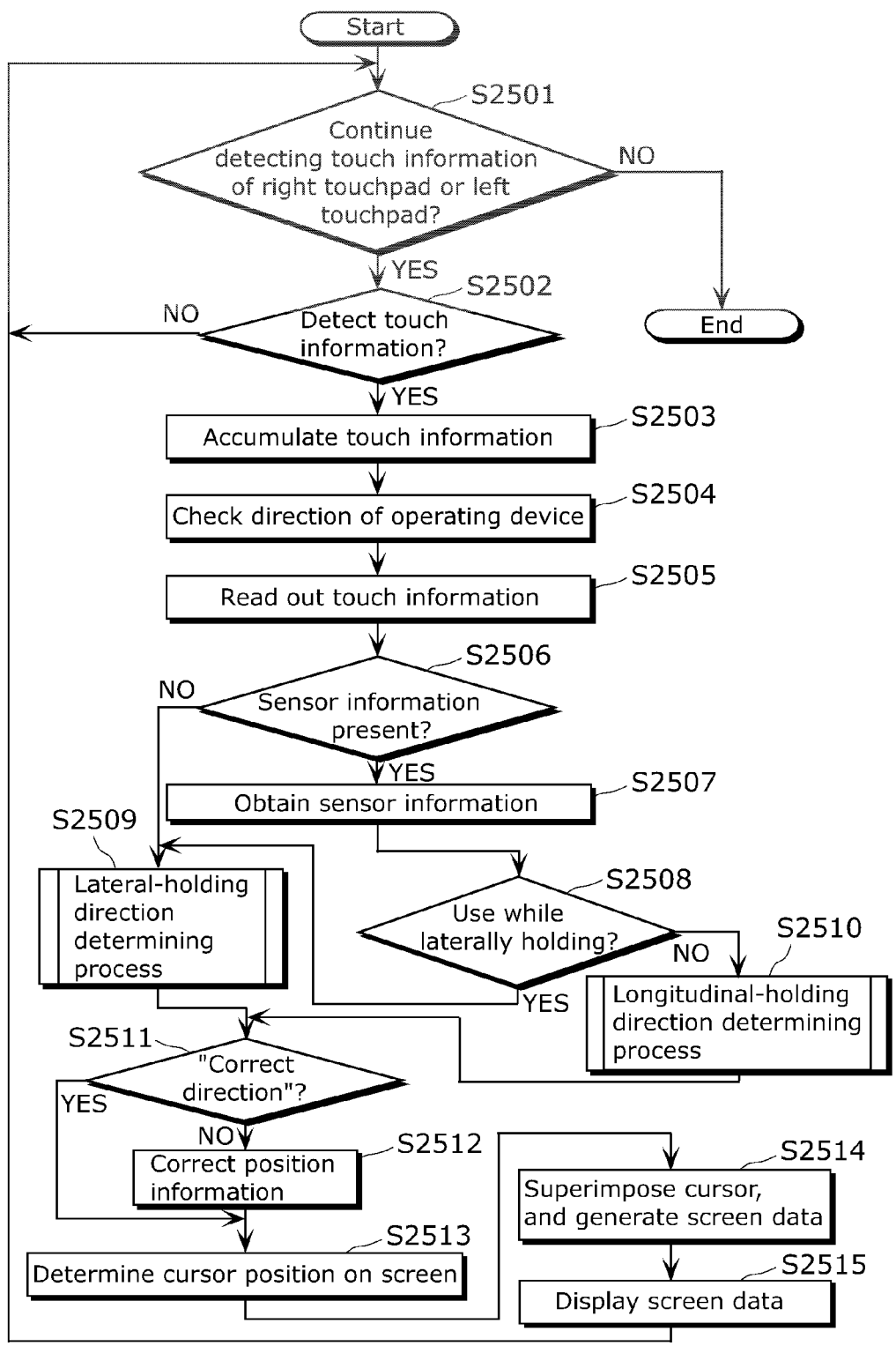
FIG. 25 is diagram showing a whole process flow of the screen display apparatus according to Embodiment 5.

FIG. 25 is a whole process flow of the screen display apparatus 5 according to Embodiment 5 which is shown in FIG. 24.

First, the touch information detecting unit 901 of the screen display apparatus 5 checks whether or not to continue detecting an input to the right touchpad 802 or the left touchpad 803, based on an instruction from an instruction unit not shown in FIG. 24 (S2501).

Here, when the touch information detecting unit 901 is instructed to discontinue detecting the input to the right touchpad 802 or the left touchpad 803 (NO in S2501), the screen display apparatus 5 ends the process.

On the other hand, when the touch information detecting unit 901 is instructed to continue detecting the input to the right touchpad 802 or the left touchpad 803 (YES in S2501), the touch information detecting unit 901 checks the presence or absence of the input to the right touchpad 802 or the left touchpad 803. Then, the touch information detecting unit 901 detects the presence or absence of the touch information 1000 shown in FIG. 10 (S2502).

Here, when the touch information detecting unit 901 detects "the absence of the touch information" (NO in S2502), the touch information detecting unit 901 checks again whether or not to continue detecting the input (S2501).

On the other hand, when the touch information detecting unit 901 detects "the presence of the touch information" (YES in S2502), the touch information detecting unit 901 causes the touch information accumulation unit 902 to accumulate the touch information 1000 (S2503). More specifically, the touch information detecting unit 901 adds the touch information 1000 to the touch information table 1100 shown in FIG. 11. Moreover, the touch information detecting unit 901 transmits the detected touch information 1000 to the cursor position determining unit 1704, for cursor display on the screen.

Next, the cursor position determining unit 1704 receives the touch information 1000 from the touch information detecting unit 901. Then, the cursor position determining unit 1704 checks a direction of the operating device 31 with the direction determining unit 2401 so as to determine whether or not it is necessary to correct position information 1003 in the touch information 1000 (S2504).

Next, the direction determining unit 2401 is checked by the cursor position determining unit 1704. Then, the direction determining unit 2401 accesses the touch information table 1100 of the touch information accumulation unit 902 to read out the touch information 1000 (S2505). Here, the direction determining unit 2401 reads out touch information 1000 generated during a predetermined time period or touch information 1000 having a predetermined amount which is set to the direction determining unit 2401 in advance.

It is to be noted that the touch information accumulation unit 902 sequentially accumulates the touch information 1000 received from the touch information detecting unit 901 at predetermined time intervals. This makes it possible to obtain, by calculation, an amount of touch information generated during a predetermined time period.

Moreover, when the direction determining unit 2401 reads out the touch information 1000, the touch information accumulation unit 902 may cause the direction determining unit 2401 or the like to temporarily hold the read touch information 1000. The touch information accumulation unit 902 may read out only a difference from touch information 1000 to be newly required. This reduces an amount of the touch information 1000 to be read out subsequently.

Next, the direction determining unit 2401 checks the presence or absence of sensor information with the sensor information detecting unit 1702. The sensor information detecting unit 1702 checks the presence or absence of a signal detected by the sensor 1701 (S2506).

Here, the sensor information detecting unit 1702 obtains the sensor information when detecting the sensor information (YES in S2506), and detects which part of the operating device 31 the user holds (S2507).

For instance, the sensor 1701, which is a touch sensor, may be disposed at each of four sides of the operating device 31 that are two long side faces and two short side faces. When the sensor information detecting unit 1702 detects touches at the sensors 1701 on the two short side faces, the operating device 31 is recognized as being "held laterally". When the sensor information detecting unit 1702 detects a touch at one of the sensors 1701 on the long side faces, the operating device 31 is recognized as being "held longitudinally".

Subsequently, the sensor information detecting unit 1702 notifies the direction determining unit 2401 of "lateral holding" or "longitudinal holding" as a holding direction.

Next, the direction determining unit 2401 checks whether or not the operating device 31 is "held laterally", from the holding direction notified by the sensor information detecting unit 1702 (S2508).

When the operating device 31 is "held laterally" (YES in S2508), the direction of the operating device 31 is determined (S2509: a lateral-holding direction determining process). In this case, the direction determining unit 2401 determines the direction of the operating device 31 at the time when the operation device 31 is held laterally, using the touch information 1000 read out in the touch information readout process (S2505).

Moreover, when the sensor information detecting unit 1702 does not detect the sensor information (NO in S2506), the direction determining unit 2401 determines, using the touch information 1000, the direction of the operating device 31 at the time when the operating device 31 is "held laterally". Subsequently, the direction determining unit 2401 notifies the cursor position determining unit 1704 of the determined direction of the operating device 31. The lateral-holding direction determining process is described in detail later with reference to FIG. 26.

On the other hand, when the operating device 31 is "held longitudinally" (NO in S2508), the direction determining unit 2401 determines the direction of the operating device 31 at the time when the operating device 31 is "held longitudinally", using the touch information 1000 read out in the touch information readout process (S2505) (S2510: a longitudinal-holding direction determining process). Subsequently, the direction determining unit 2401 notifies the cursor position determining unit 1704 of the determined direction of the operating device 31. The longitudinal-holding direction determining process is described in detail later with reference to FIG. 27.

Next, the cursor position determining unit 1704 is notified of the determined direction of the operating device 31 by the direction determining unit 2401. Then, the cursor position determining unit 1704 determines whether or not the direction of the operating device 31 is a "correct direction" (S2511).

Here, when the direction of the operating device 31 is the "correct direction" (YES in S2511), the cursor position determining unit 1704 performs a process of determining a cursor position on a screen (S2513).

On the other hand, when the direction of the operating device 31 is other than the "correct direction" (NO in S2511), the cursor position determining unit 1704 corrects the position information 1003 in the touch information 1000 received from the touch information detecting unit 901 (S2512: a position information correcting process). In this case, the cursor position determining unit 1704 corrects, based on the direction of the operating device 31, the position information 1003 so that the cursor is displayed at the same position as in the case where the direction of the operating device 31 is the "correct direction". The position information correcting process is the same as the process described in Embodiment 1.

Next, the cursor position determining unit 1704 determines the cursor position on the screen using the position information 1003 in the touch information 1000 received from the touch information detecting unit 901 or the corrected position information 1003 (S2513).

Specifically, the cursor position determining unit 1704 obtains, from the maximum value and the minimum value in each of a coordinate system of the right touchpad 802 and a coordinate system on screen display, a magnification ratio between the coordinate system of the right touchpad 802 and the coordinate system on the screen display. Moreover, the cursor position determining unit 1704 obtains, from the maximum value and the minimum value in each of a coordinate system of the left touchpad 803 and the coordinate system on the screen display, a magnification ratio between the coordinate system of the left touchpad 803 and the coordinate system on the screen display. This allows the cursor position determining unit 1704 to determine the cursor position on the screen.

In other words, the cursor position determining unit 1704 determines, for each of an x coordinate and a y coordinate of the position information, a cursor position corresponding to the right touchpad 802 through the following calculation: (the cursor position of the right touchpad 802 on the screen display)=(the cursor position on the right touchpad 802)×{(the maximum value of the coordinate system on the screen display)−(the minimum value of the coordinate system on the screen display)}/{(the maximum value of the coordinate system on the right touchpad 802)−(the minimum value of the coordinate system on the right touchpad 802)}.

Likewise, the cursor position determining unit 1704 determines a cursor position corresponding to the left touchpad 803 through the following calculation: (the cursor position of the left touchpad 803 on the screen display)=(the cursor position on the left touchpad 803)×{(the maximum value of the coordinate system on the screen display)−(the minimum value of the coordinate system on the screen display)}/{(the maximum value of the coordinate system on the left touchpad 803)−(the minimum value of the coordinate system on the left touchpad 803)}.

Subsequently, the cursor position determining unit 1704 notifies the screen data generating unit 905 of the x coordinate and the y coordinate of each of the determined cursor positions.

It is to be noted that a different coordinate system on the screen display may be assigned to each of the right touchpad 802 and the left touchpad 803. In this case, "the maximum value of the coordinate system on the screen display" and "the minimum value of the coordinate system on the screen display" are provided for each of the right touchpad 802 and the left touchpad 803 in the above respective calculations. This allows each cursor position to be determined.

The screen data generating unit 905 generates screen data by superimposing a cursor image on a video, an animation, or the like to be displayed by the display unit 906, based on the cursor position notified by the cursor position determining unit 1704 (S2514). Then, the screen data generating unit 905 transmits the generated screen data to the display unit 906.

The display unit 906 displays, on the screen or the like, the screen data received from the screen data generating unit 905 (S2515). After this process ends, the touch information detecting unit 901 checks again whether or not to continue detecting the input (S2501).

This is the end of the description of the whole process flow of the screen display apparatus 5 which is shown in FIG. 25.

Figure 26:
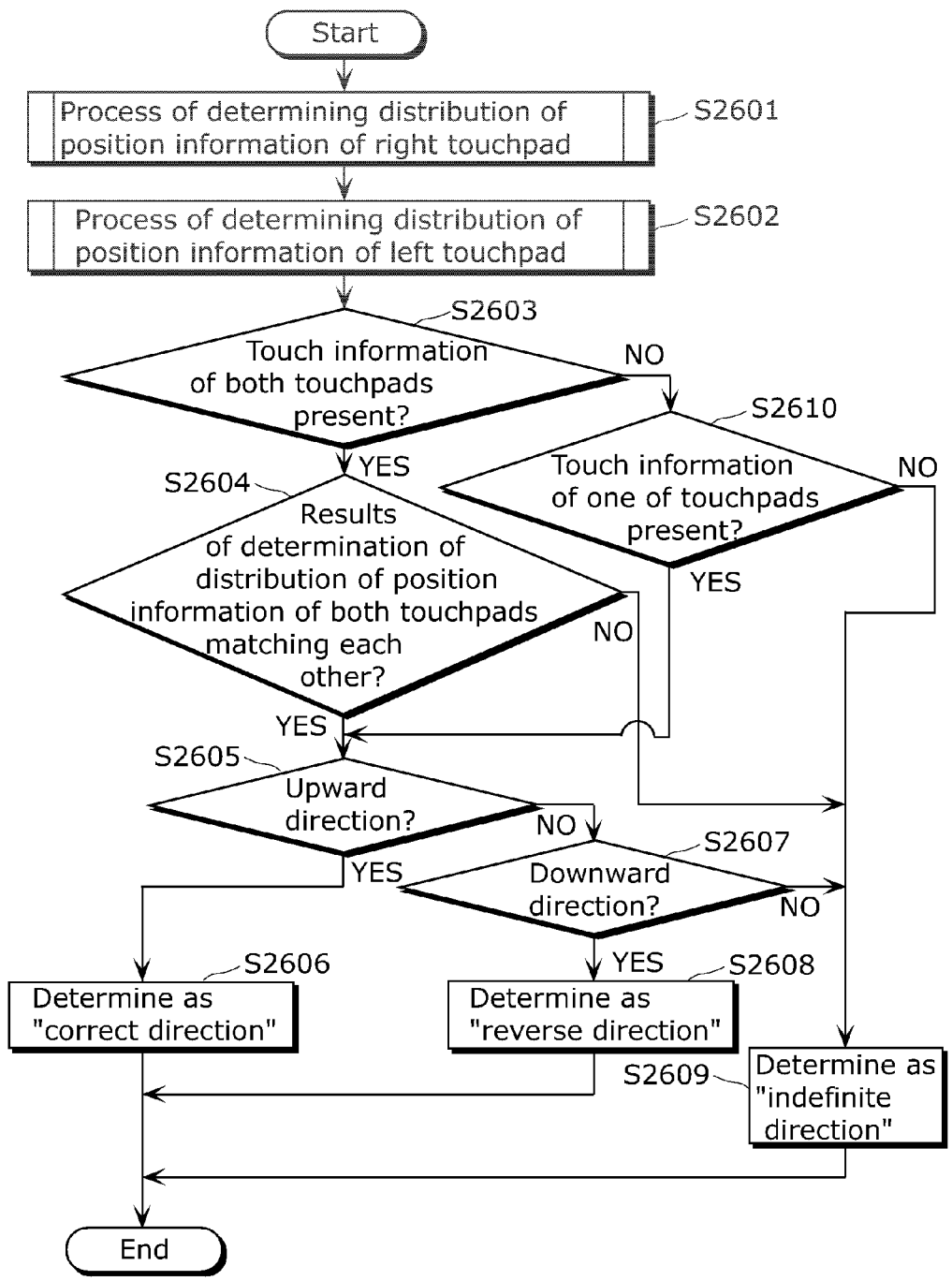
FIG. 26 is a diagram showing a lateral-holding direction determining process flow in a direction determining unit according to Embodiment 5.

The following describes the lateral-holding direction determining process (S2506) shown in FIG. 25 with reference to FIG. 26.

First, the direction determining unit 2401 performs a distribution of position information determining process for the right touchpad 802 using the touch information 1000 read out from the touch information table 1100 (S2601). The distribution of position information determining process is described in detail later with reference to FIG. 28.

Figure 28:
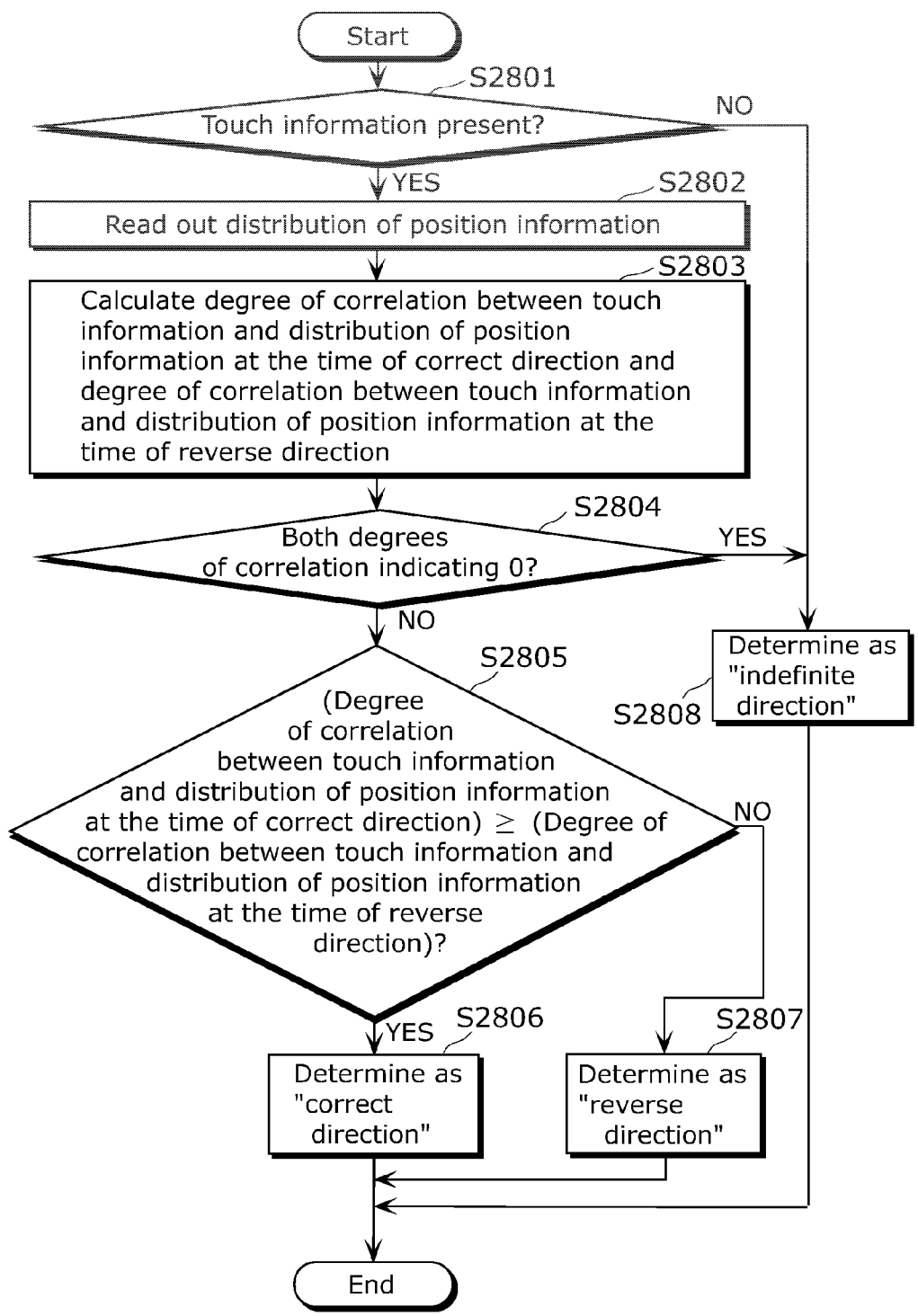
FIG. 28 is a diagram showing a distribution of position information determining process flow in the direction determining unit according to Embodiment 5.

Next, the direction determining unit 2401 performs a distribution of position information determining process for the left touchpad 803 using the touch information 1000 read out from the touch information table 1100 (S2602). Although the distribution of position information determining process is the same as the distribution of position information determining process for the right touchpad (S2601), when a distribution of position information is determined, a distribution for left finger to be described with reference to FIG. 28 is used.

Next, the direction determining unit 2401 checks the presence of both touch information 1000 of the right touchpad 802 and touch information 1000 of the left touchpad 803, from the results of the distribution of position information determining process for the right touchpad (S2601) and the distribution of position information determining process for the left touchpad (S2602) (S2603).

Here, when both touch information 1000 of the right touchpad 802 and touch information 1000 of the left touchpad 803 are present (YES in S2603), the direction determining unit 2401 checks whether or not the two determination results match each other (S2604). In other words, the direction determining unit 2401 checks, from the results of the distribution of position information determining process for the right touchpad (S2601) and the distribution of position information determining process for the left touchpad (S2602), whether or not the result of determining a distribution of position information of the right touchpad 802 matches that of the left touchpad 803. Specifically, the direction determining unit 2401 checks whether or not both determination results of the right touchpad 802 and the left touchpad 803 indicate an "upward direction" or whether or not the both indicate a "downward direction".

On the other hand, when one of the touch information 1000 of the right touchpad 802 and the touch information 1000 of the left touchpad 803 is absent (NO in S2603), the direction determining unit 2401 checks the presence or absence of the one of the touch information 1000 of the right touchpad 802 and the touch information 1000 of the left touchpad 803 (S2610). In other words, in this case, the direction determining unit 2401 checks, from the results of the distribution of position information determining process for the right touchpad (S2601) and the distribution of position information determining process for the left touchpad (S2602), which one of the touch information 1000 of the right touchpad 802 and the touch information 1000 of the left touchpad 803 is present.

It is to be noted that, here, an example is shown where, when one of the touch information 1000 of the right touchpad 802 and the touch information 1000 of the left touchpad 801 is detected, the direction determining unit 2401 performs the direction determining process using a distribution. However, only when both touch information 1000 of the right touchpad 802 and touch information 1000 of the left touchpad 803 are detected, the direction determining unit 2401 may perform the direction determining process. In this case, this process (S2610) can be omitted.

When the determination result of the distribution of the position information of the right touchpad 802 does not match that of the left touchpad 803 (NO in S2604), the direction determining unit 2401 determines the direction of the operating device 31 as an "indefinite direction" (S2609). Moreover, when both touch information 1000 of the right touchpad 802 and the left touchpad 801 are absent (NO in S2620), the direction determining unit 2403 also determines the direction of the operating device 31 as the "indefinite direction".

It is to be noted that, in this case, the direction determining unit 2401 may determine that the direction of the operating device 31 is the "correct direction" as a default direction. The default direction may be a direction set in advance as a default value to the screen display apparatus 5 before shipping or a direction set in advance as a default value by the user.

When the determination result of the distribution of the position information of the right touchpad 802 matches that of the left touchpad 803 (YES in S2604), the direction determining unit 2401 checks whether or not the matched determination result of the distribution of the position information checked in the preceding process indicates the "upward direction" (S2605). Moreover, when one of the touch information 1000 of the right touchpad 802 and the touch information 1000 of the left touchpad 801 is present (YES in S2610), the direction determining unit 2401 also checks whether or not the matched determination result of the distribution of the position information indicates the "upward direction".

Here, when the matched determination result of the distribution of the position information indicates the "upward direction" (YES in S2605), the direction determining unit 2401 determines a direction of the user's finger 804 as an upward direction of the right touchpad 802 and the left touchpad 803, in view of structural characteristics or the like of a person's finger. In other words, the direction determining unit 2401 determines that the direction of the user's finger 804 is the same as a direction in the coordinate system of the right touchpad 802 and the coordinate system of the left touchpad 803.

Moreover, it is considered that the direction of the operating device 31 intended by the user matches the direction of the user's finger 804. Thus, the direction determining unit 2401 determines the direction of the operating device 31 as the "correct direction" (S2606). The direction determining unit 2401 notifies the cursor position determining unit 1704 of the determined direction of the operating device 31, and ends this process.

Meanwhile, when the matched determination result of the distribution of the position information does not indicate the "upward direction" (NO in S2605), the direction determining unit 2401 checks whether or not the matched determination result of the distribution of the position information checked in the preceding process indicates a "downward direction" (S2607).

Here, when the matched determination result of the distribution of the position information indicates the "downward direction" (YES in S2607), the direction determining unit 2401 determines the direction of the user's finger 804 as a downward direction of the right touchpad 802 and the left touchpad 803, in view of the structural characteristics or the like of the person's finger. In other words, the direction determining unit 2401 determines that the direction of the user's finger 804 is upside-down of the direction in the coordinate system of the right touchpad 802 and the coordinate system of the left touchpad 803 or a direction resulting from turning each of the right touchpad 802 and the left touchpad 803 180 degrees to the right or the left.

Moreover, it is considered that the direction of the operating device 31 intended by the user matches the direction of the user's finger 804. Thus, in contradiction to the case where the direction determining unit 2401 determines the direction of the operating device 31 as the "correct direction" (S2606), the direction determining unit 2401 determines the direction of the operating device 31 as a "reverse direction" (S2608). The direction determining unit 2401 notifies the cursor position determining unit 1704 of the determined direction of the operating device 31, and ends this process.

Meanwhile, when the matched determination result of the distribution of the position information does not indicate the "downward direction" (NO in S2607), as with the case where the distributions of the position information of both touchpads do not match each other (NO in S2604) or the like, the direction determining unit 2401 determines the direction of the operating device 31 as the "indefinite direction" (S2609).

This is the end of the description of the lateral-holding direction determining process flow in the direction determining unit 2401.

Figure 27:
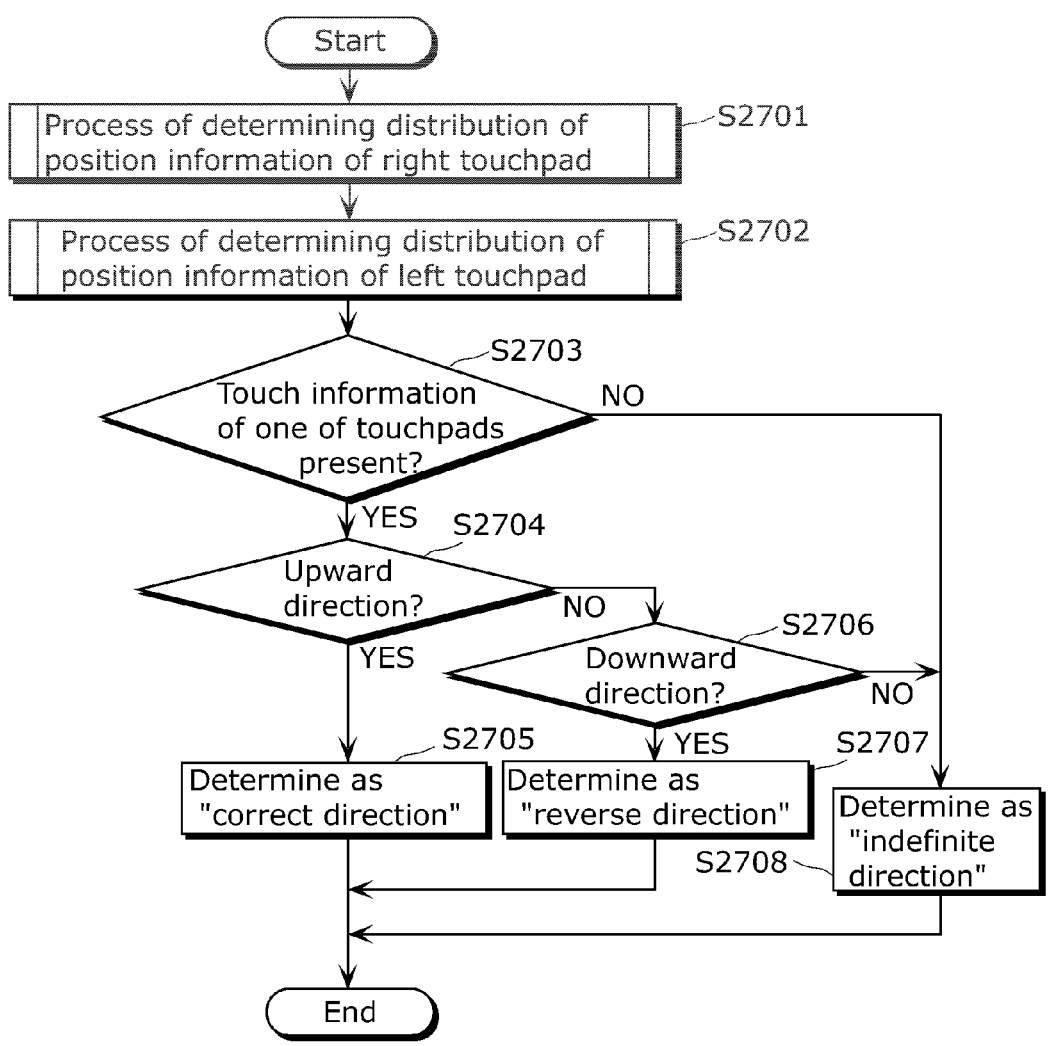
FIG. 27 is a diagram showing a longitudinal-holding direction determining process flow in the direction determining unit according to Embodiment 5.

The following describes the longitudinal-holding direction determining process (S2510) shown in FIG. 25 with reference to FIG. 27.

First, the direction determining unit 2401 performs a distribution of position information determining process for the right touchpad 802 using the touch information 1000 read out from the touch information table 1100 (S2701). The distribution of position information determining process is described in detail later with reference to FIG. 28.

Next, the direction determining unit 2401 performs a distribution of position information determining process for the left touchpad 803 using the touch information 1000 read out from the touch information table 1100 (S2702). Although the distribution of position information determining process is the same as the distribution of position information determining process for the right touchpad (S2701), when a distribution of position information is determined, a distribution for left finger to be described with reference to FIG. 28 is used.

Next, the direction determining unit 2401 checks the presence of at least one of the touch information 1000 of the right touchpad 802 and the touch information 1000 of the left touchpad 803, from the results of the distribution of position information determining process for the right touchpad (S2701) and the distribution of position information determining process for the left touchpad (S2702) (S2703).

Here, when both touch information 1000 of the right touchpad 802 and touch information of 1000 the left touchpad 803 are absent (NO in S2703), the direction determining unit 2401 determines a direction of the operating device 31 as the "indefinite direction" (S2708).

It is to be noted that, in this case, the direction determining unit 2401 may determine that the direction of the operating device 31 is the "correct direction" as a default direction. The default direction may be a direction set in advance as a default value to the screen display apparatus 5 before shipping or a direction set in advance as a default value by the user.

On the other hand, when at least one of the touch information 1000 of the right touchpad 802 and the touch information 1000 of the left touchpad 803 is present (YES in S2703), the direction determining unit 2401 checks whether or not a determination result of a distribution of the position information checked in the preceding process indicates the "upward direction" (S2704).

It is to be noted that when both touch information 1000 of the right touchpad 802 and touch information 1000 of the left touchpad 803 are present, the direction determining unit 2401 may use, between the two touch information items 1000 received from the touch information accumulation unit 902, the touch information 1000 having a greater amount of data.

Here, when the determination result of the distribution of the position information indicates the "upward direction" (YES in S2704), the direction determining unit 2401 determines a direction of the user's finger 804 as the upward direction of the operating device 31 at the time when the operating device 31 is held longitudinally, in view of the structural characteristics or the like of the person's finger. It is to be noted that, in this embodiment, a coordinate system of the right touchpad 802 and a coordinate system of the left touchpad 803 are fixed to a direction in which the operating device 31 is held with the right touchpad 802 facing a forward direction.

It is considered that the direction of the operating device 31 intended by the user matches the direction of the user's finger 804. Thus, the direction determining unit 2401 determines the direction of the operating device 31 as the "correct direction" (S2705). The direction determining unit 2401 notifies the cursor position determining unit 1704 of the determined direction of the operating device 31, and ends this process.

Meanwhile, when the determination result of the distribution of the position information does not indicate the "upward direction" (NO in S2704), the direction determining unit 2401 checks whether or not the determination result of the distribution of the position information checked in the preceding process indicates the "downward direction" (S2706).

Here, when the determination result of the distribution of the position information indicates the "downward direction" (YES in S2706), the direction determining unit 2401 determines the direction of the user's finger 804 as the downward direction of the operating device 31 at the time when the operating device 31 is held longitudinally, in view of the structural characteristics or the like of the person's finger.

Moreover, it is considered that the direction of the operating device 31 intended by the user matches the direction of the user's finger 804. Thus, in contradiction to the case where the direction determining unit 2401 determines the direction of the operating device 31 as the "correct direction" (S2705), the direction determining unit 2401 determines the direction of the operating device 31 as a "reverse direction" (S2707). The direction determining unit 2401 notifies the cursor position determining unit 1704 of the determined direction of the operating device 31, and ends this process.

Meanwhile, when the determination result of the distribution of the position information does not indicate the "downward direction" (NO in S2706), as with the case where the touch information items of both touchpads are absent (NO in S2703), the direction determining unit 2401 determines the direction of the operating device 31 as the "indefinite direction" (S2708).

This is the end of the description of the longitudinal-holding direction determining process flow in the direction determining unit 2401.

Figure 29A:
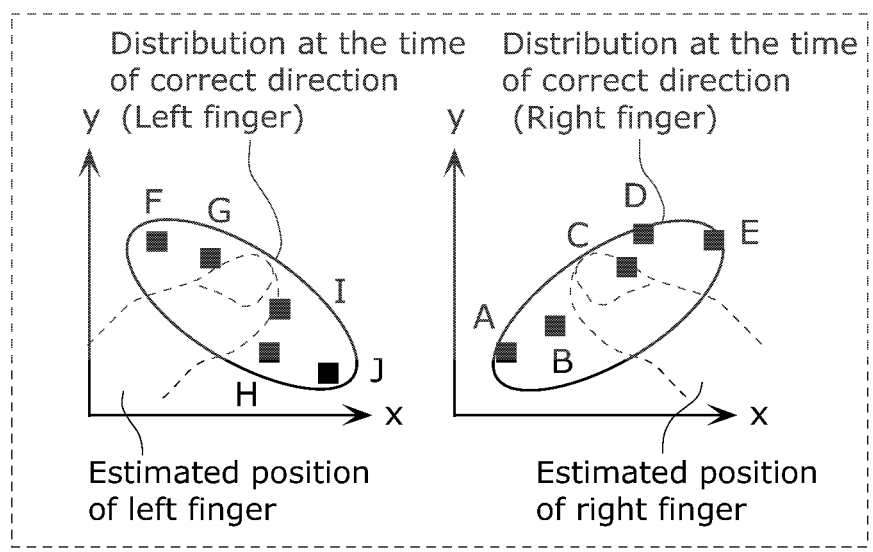
FIG. 29A is an explanatory diagram showing a first example of a distribution of position information determining process in the direction determining unit according to Embodiment 5.
Figure 29B:
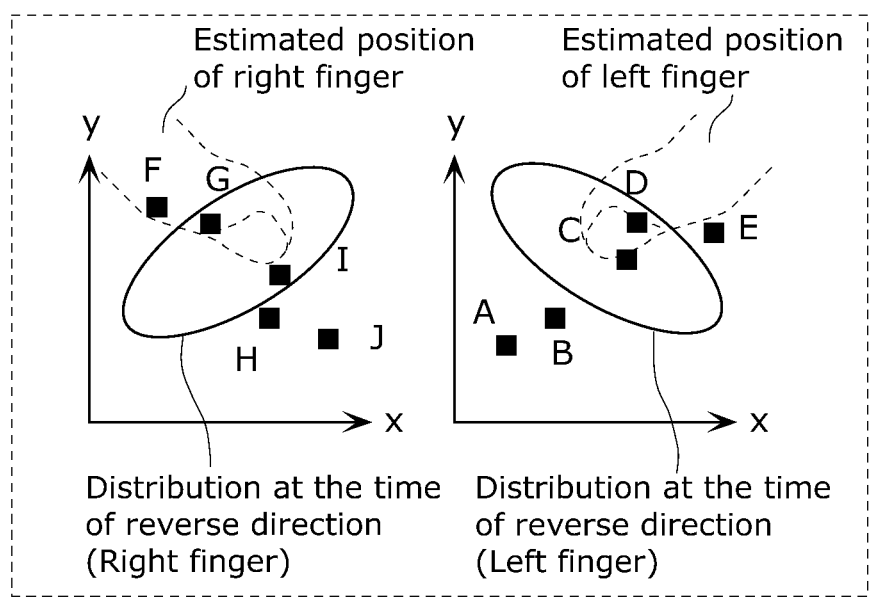
FIG. 29B is an explanatory diagram showing a second example of a distribution of position information determining process in the direction determining unit according to Embodiment 5.

The following describes, with reference to FIGS. 28, 29A, and 29B, process flows of the distribution of position information determining process for the right touchpad (S2601) and the distribution of position information determining process for the left touchpad (S2602) shown in FIG. 26, and process flows of the distribution of position information determining process for the right touchpad (S2701) and the distribution of position information determining process for the left touchpad (S2702) shown in FIG. 27.

First, the direction determining unit 2401 checks the presence or absence of the touch information 1000 read out from the touch information table 1100 (S2801).

Here, when the read touch information 1000 is absent (NO in S2801), the direction determining unit 2401 determines a direction of the operating device 31 as the "indefinite direction" (S2808).

On the other hand, when the read touch information 1000 is present (YES in S2801), the direction determining unit 2401 reads out a distribution of position information held within (S2802).

Specifically, when the direction determining unit 2401 determines a distribution of position information for the right touchpad 802, the direction determining unit 2401 reads out a distribution of position information (for right finger) at the time of the correct direction and a distribution of position information (for right finger) at the time of the reverse direction which are shown in FIGS. 29A and 29B. Then, when the direction determining unit 2401 determines a distribution of position information for the left touchpad 803, the direction determining unit 2401 reads out a distribution of position information (for left finger) at the time of the correct direction and a distribution of position information (for left finger) at the time of the reverse direction which are shown in FIGS. 29A and 29B.

Next, the direction determining unit 2401 calculates a degree of correlation between the touch information 1000 read out in the touch information checking process (S2801) and the distribution of the position information read out in the distribution of position information readout process (S2802) (S2803). In the calculation of the degree of correlation, the number of position information items 1003 in the distribution of the position information at the time of the correct direction and the number of position information items 1003 in the distribution of the position information at the time of the reverse direction are calculated, the distributions being read out in the distribution of position information readout process (S2802).

For instance, in examples shown in FIGS. 29A and 29B, each of ten position information items 1003 at points A to J (five position information 1003 of the right touchpad 802 and five position information 1003 of the left touchpad 803) is read out as the touch information 1000. In this case, the ten position information items at points A to J are included in the "distribution of the position information at the time of the correct direction" in FIG. 29A, and thus a degree of correlation can be calculated as "10". On the other hand, four position information items at points C, D, G, and I are included in "the distribution of the position information at the time of the reverse direction" in FIG. 29B, and thus a degree of correlation can be calculated as "4".

Next, the direction determining unit 2401 checks whether or not both degrees of correlation calculated in the degree of correlation calculation process (S2803) indicate "0" (S2804).

Here, when both degrees of correlation indicate "0" (YES in S2804), the direction determining unit 2401 cannot determine a direction of the operating device 31 from the degrees of correlation, and thus determines the direction of the operating device 31 as the "indefinite direction" (S2808).

On the other hand, when at least one of the two degrees of correlation does not indicate "0" (NO in S2804), the direction determining unit 2401 checks, for the degrees of correlation calculated in the degree of correlation calculation process (S2803), whether or not (a degree of correlation between touch information and a distribution of position information at the time of correct direction)≥(a degree of correlation between touch information and a distribution of position information at the time of reverse direction) is satisfied (S2805).

Here, when (a degree of correlation between touch information and a distribution of position information at the time of correct direction)≥(a degree of correlation between touch information and a distribution of position information at the time of reverse direction) is satisfied (YES in S2805), the position information 1003 in the touch information 1000 has a high degree of correlation with position information at the time of correct direction, and thus the direction determining unit 2401 determines the direction of the operating device 31 as the "upward direction" (S2806).

On the other hand, when (a degree of correlation between touch information and a distribution of position information at the time of correct direction)<(a degree of correlation between touch information and a distribution of position information at the time of reverse direction) is satisfied (NO in S2805), the position information 1003 in the touch information 1000 has a high degree of correlation with position information at the time of reverse direction, and thus the direction determining unit 2401 determines the direction of the operating device 31 as the "downward direction" (S2807).

This is the end of the description of the process flow of the distribution of position information determining process for the right touchpad (S2601) and the distribution of position information determining process for the left touchpad (S2602) shown in FIG. 26, and the process flows of the distribution of position information determining process for the right touchpad (S2701) and the distribution of position information determining process for the left touchpad (S2702) shown in FIG. 27.

This is the end of the description of the process flow of the screen display apparatus 5 according to Embodiment 5.

With the above-described configuration, the touch information accumulation unit 902 of the screen display apparatus 5 accumulates the touch information 1000 detected by the touch information detecting unit 901. Then, the direction determining unit 2401 determines the direction of the operating device 31 using the distribution of the position information 1003 in the touch information 1000. The cursor position determining unit 1704 properly corrects the position information 1003 in the touch information 1000 received from the touch information detecting unit 901, depending on the direction of the operating device 31, and determines a display position of a cursor.

Thus, even when the user holds the operating device 31 in any direction, the screen display apparatus 5 makes it possible to properly and automatically determine the direction of the operating device 31 based only on the inputs to the right touchpad 802 and the left touchpad 803 by the user, and display the cursor at the correct position. Therefore, the screen display apparatus 5 makes it possible to achieve the comfortable operability for the user.

It is to be noted that "the lateral-holding direction determining process (S2509, FIG. 26)" and "the longitudinal-holding direction determining process (S2510, FIG. 27)" shown in FIG. 25 are applied in Embodiment 5 instead of "the lateral-holding direction determining process (S1809, FIG. 19)" and "the longitudinal-holding direction determining process (S1810, FIG. 20)" of Embodiment 3 shown in FIG. 18.

In other words, only the direction determining processes in the direction determining unit are substituted. In this manner, the direction determining processes in each of Embodiments 1 to 4 may be substituted for the direction determining processes described in Embodiment 5.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention is not limited only to the screen display apparatus, and may be used as a display control device which receives an input from an operating device having a touchpad and generates data to be displayed by a display unit. The display control device may be incorporated into the operating device or the display unit. Alternatively, the display control device may be an independent device. Furthermore, the display control device may include the operating device and the display unit.

The operating device described in each embodiment may be a wireless or wired remote control. Moreover, the operating device may be other than the remote control, and may be physically integrated with, for instance, the display unit, the display control device, or the screen display apparatus.

When the cursor is not used, the cursor position determining unit needs not be included. Furthermore, when it is unnecessary to accumulate the touch information, the touch information accumulation unit needs not be included. The following describes such cases with reference to FIGS. 30 and 31.

Figure 30:
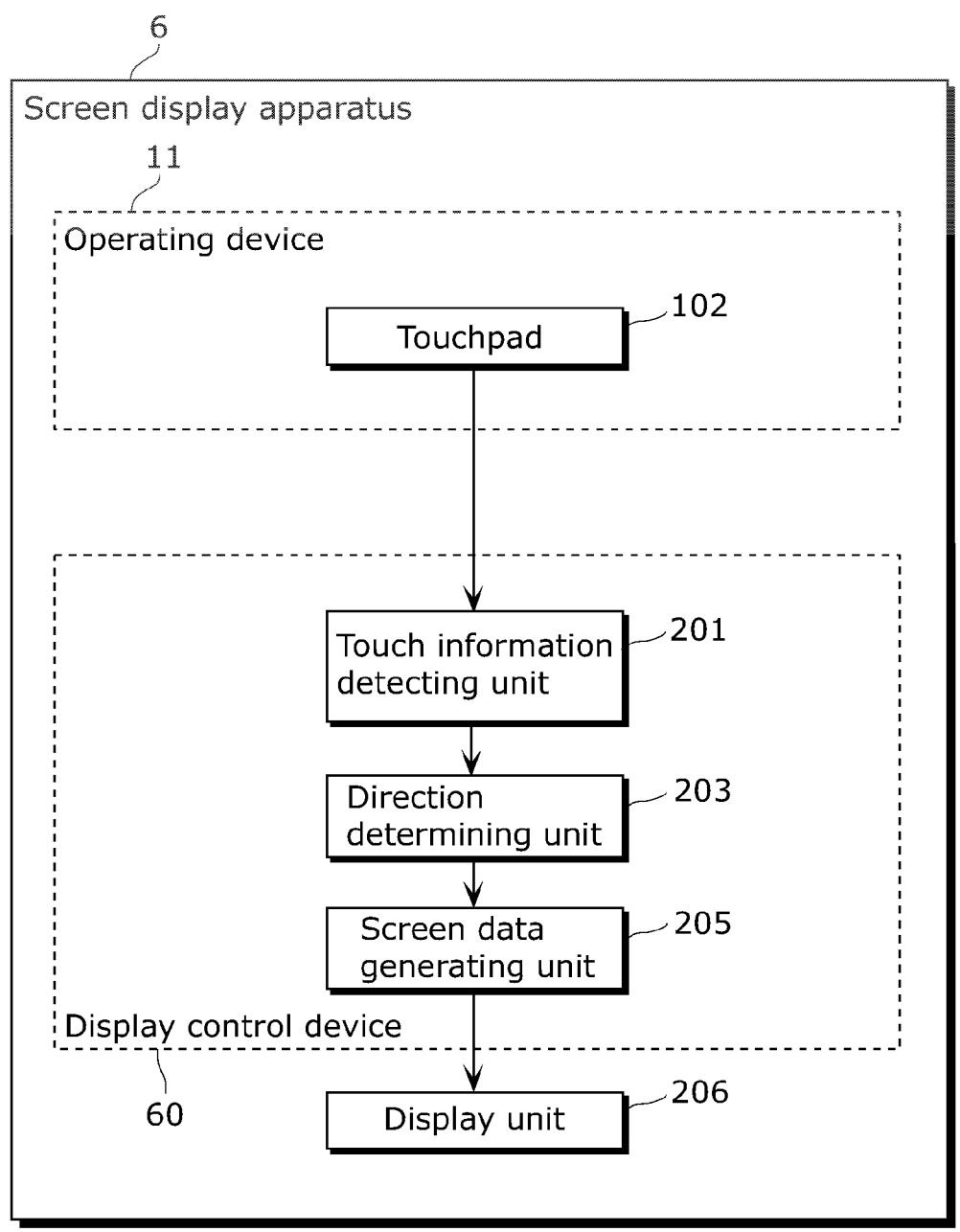
FIG. 30 is a configuration diagram of a screen display apparatus according to a modification of Embodiment 1.

FIG. 30 is a configuration diagram of a modification of the screen display apparatus according to Embodiment 1. An operating device 11, a display control device 60, and a display unit 206 are physically integrated with a screen display apparatus 6 shown in FIG. 30. Consequently, directions of the screen display apparatus 6, the operating device 11, the display control device 60, and the display unit 206 match with each other.

A direction determining unit 203 determines the direction of the operating device 11 based on characteristics resulting from an operation with a finger. For example, a range in which the user can touch a touchpad 102 with a finger while holding the operating device 11 in hand is limited due to the characteristics of the finger structure. Thus, the direction determining unit 203 may determine the direction of the operating device 11 using one detected touch information item, without using accumulated plural touch information items, according to such characteristics.

Then, a screen data generating unit 205 generates screen data depending on the direction of the operating device 11 determined by the direction determining unit 203, and causes the display unit 206 to display an image or the like.

Figure 31:
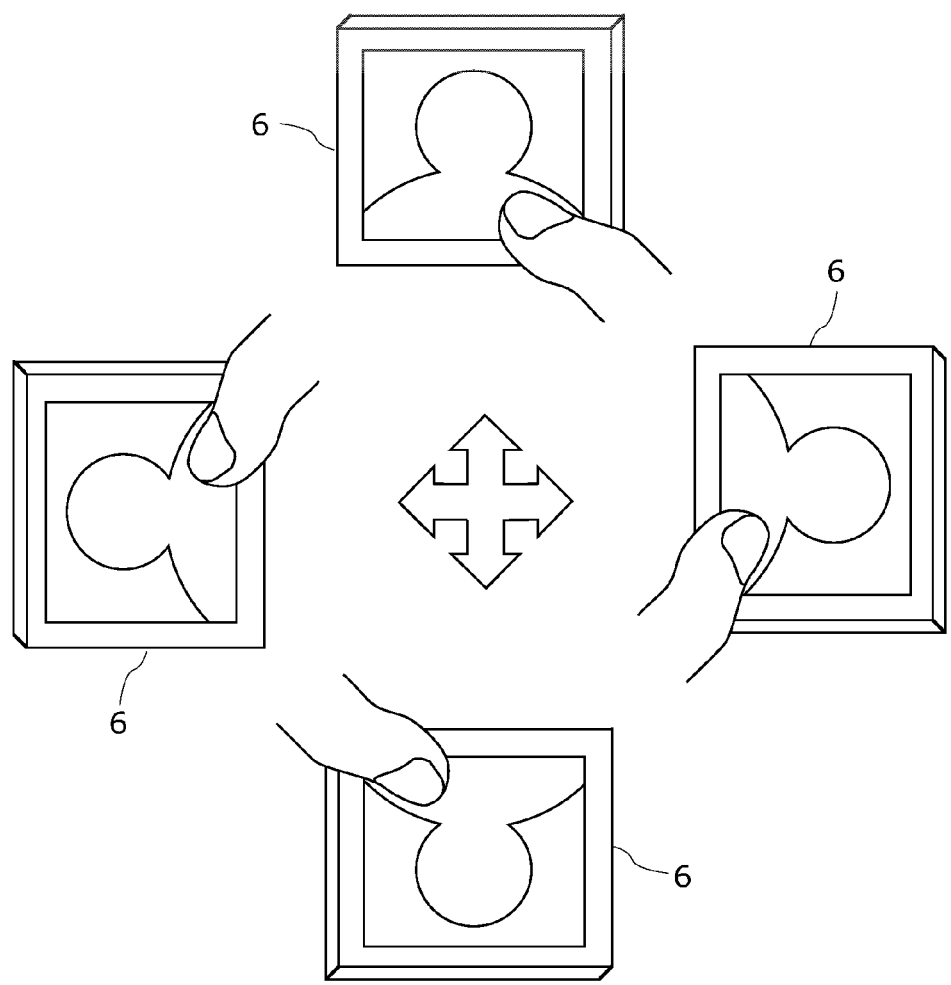
FIG. 31 is a use state of the screen display apparatus according to the modification of Embodiment 1.

FIG. 31 is a schematic diagram showing a case where the screen display apparatus 6 shown in FIG. 30 is used. In the screen display apparatus 6 facing one of various directions, an image or the like is displayed in a proper direction corresponding to the direction. In other words, the display control device 60 makes it possible to detect the proper direction for display, based on the operation with the finger, and display the image or the like.

Each of Embodiments 1 to 5 has described the case where the direction determining unit continuously determines the direction of the operating device, corrects the cursor position on the screen, generates the alert message, and so on. However, when the screen display apparatus includes an application monitoring unit and when the user switches the holding direction of the operating device such as at the time of starting an application and at the time of switching an application, the direction determining unit may determine the direction of the operating device. With this, the screen display apparatus is configured to recognize the direction of the operating device only when required, and thus the processing load of the screen display apparatus is reduced.

The screen display apparatus according to each of Embodiments 1 to 5 determines the direction of the operating device, using the position information input on the touchpad by the user, based on the characteristics resulting from the operation with the finger. The characteristics resulting from the operation with the finger are characteristics resulting from the finger structure, shape, movement, and so on. The screen display apparatus according to each of Embodiments 1 to 5 determines the direction of the operating device, especially using, as the characteristics, the slope of the trajectory of the position information (a slope approximated by a straight line) and the degree of change, or the distribution of the position information. However, the characteristics resulting from the operation with the finger are not limited to such a trajectory or distribution.

The screen display apparatus may approximate the trajectory of the position information by a curve, and use its curvature as the characteristics. Moreover, the screen display apparatus may approximate the trajectory of the position information by the curve, and use an angle between endpoints of the approximated curve. When the distribution of the position information is circular or elliptical, the screen display apparatus may determine whether or not a starting position of the circle or the ellipse is in a predetermined region on a touchpad easy to be operated with the user's finger.

In the above description, the direction determined by the direction determining unit is expressed as the direction of the operating device. However, the direction may be treated as the direction intended by the user.

The direction determining unit according to each of Embodiments 1 to 4 specifies the shape of the trajectory of the position information input on the touchpad by the user, by calculating the slope of the straight line and the degree of change. However, the direction determining unit may hold an estimated trajectory in advance, and specify a shape of a trajectory by calculating a degree of correlation or a degree of deviation between a trajectory of position information input on the touchpad by the user and a trajectory held in advance.

The touchpad according to each of Embodiments 1 to 5 obtains two-dimensional coordinate values of the x coordinate and the y coordinate as the position information input on the touchpad by the user. A touchpad may be used which can obtain three-dimensional coordinate values including a z coordinate (a z-axis direction).

Such a touchpad can obtain, for a touch operation or a click operation by the user, information including the z-axial strength. As a result, the input by the user is expressed as area. Thus, the direction determining unit may determine the direction of the operating device by recognizing the shape of the user's finger based on the shape of the area expressing the input.

Moreover, the trajectory of the position information at the time when the direction determining unit determines that the trajectory indicates the "correction direction" may be stored (learned) in Embodiments 1 to 4. The stored trajectory may be used in a subsequent direction determining process. Likewise, the distribution of the position information on the touchpad may be stored (learned) in Embodiment 5.

For instance, in the direction determining process, an effect of adapting to a user's habit or the like can be expected by calculating a degree of correlation or a degree of deviation between the trajectory of the position information input on the touchpad by the user and a learned trajectory.

In Embodiments 1 to 5, when the user longitudinally holds an operating device having two or more touchpads, the direction determining unit may determine that a direction of one of the touchpads having a greater amount (number) of touch information is an upward direction intended by the user.

Embodiment 4 has described the example where the direction of the operating device 41 determined by the direction determining unit 1703 is compared with the direction of the operating device 41 detected by the second sensor 2205. The display control device 40 may compare the direction of the operating device 41 determined by the direction determining unit 1703 with a pre-fixed direction of the coordinate systems on the right touchpad 802 and the left touchpad 803. When the direction does not match the pre-fixed direction, the display control device 40 may generate and display an alert message or the like on the display unit 206.

In Embodiment 4, when the switching of the holding direction of the operating device 41 by the user is detected or the next direction of the operating device 41 is recognized by the direction determining unit 1703 after once the alert message is displayed, the screen data generating unit 2202 may delete a previously displayed alert message.

A method of alerting is not only limited to the method of generating an alert message performed by the alert data generating unit 2201 in Embodiment 4. The screen display apparatus may include an alert unit outside the display control device 40. When the direction of the operating device determined by the direction determining unit does not match the pre-fixed direction of the coordinate systems on the touchpads or the direction of the operating device detected by the sensor, the alert unit may present an alert to the user through various feedback methods. For example, the alert may be presented by applying various methods of changing a color or shape of an object on a screen, notifying with sound, and so on.

Embodiment 4 has described the case of the screen display apparatus including both of the first sensor 2204 and the second sensor 2205. However, the screen display apparatus may include only one of the sensors. This configuration also makes it possible to achieve the same process.

In this case, the screen display apparatus including only the first sensor 2204 compares, with the direction of the operating device determined by the direction determining unit 1703, the direction of the coordinate systems on the touchpads which is pre-fixed based on the holding direction of the operating device detected by the first sensor 2204. In contrast, the screen display apparatus including only the second sensor 2205 compares, with the direction of the operating device determined by the direction determining unit 1703, the direction of the operating device based on one of the upward and downward directions detected by the second sensor 2205.

The direction determining unit 1703 according to Embodiment 4 can determine the direction using information obtained from each of the first sensor 2204, the second sensor 2205, the right touchpad 802, and the left touchpad 803, or from a given combination of these. For instance, the direction determining unit 1703 can determine the direction using information obtained from each of the second sensor 2205 and the left touchpad 803.

Moreover, the direction determining unit 1703 may check the validity of the direction using another information obtained from each of the first sensor 2204, the second sensor 2205, the right touchpad 802, and the left touchpad 803, or from a given combination of these. In other words, the direction determining unit 1703 may check the validity of the direction by determining whether or not a direction estimated, based on the other information, as the direction intended by the user matches the direction determined based on the characteristics resulting from the operation with the finger.

For example, the direction determining unit 1703 may check whether or not a direction estimated from information obtained from each of the first sensor 2204 and the second sensor 2205 matches a direction determined using information obtained from each of the right touchpad 802 and the left touchpad 803. Then, when they match each other, the cursor position determining unit 2203 may determine a cursor position, and when they do not match each other, the alert data generating unit 2201 may generate alert data.

When the direction determined by the direction determining unit 1703 is different from a direction predetermined in the operating device 41, the cursor position determining unit 2203 may determine the cursor position by correcting a cursor position determined according to the predetermined direction. Alternatively, when the direction determined by the direction determining unit 1703 is different from the direction predetermined in the operating device 41, the alert data generating unit 2201 may generate the alert data.

In Embodiments 1 to 5, at the moment when the user starts holding the operating device, when the application is switched, when the holding direction of the operating device is changed within the application, or the like, the display control device recognizes the direction of the operating device through the operation with the finger on the touchpad. However, a case is assumed where touch information necessary for the recognition cannot be sufficiently obtained only through such an initial operation.

In this case, the display control device may automatically perform a process such as the extension of a recognition time and an attempt to recognize again, or notify the user of failure in recognition.

In Embodiments 1 to 5, there is a case where, although the screen display apparatus has performed the cursor display based on the determined direction, the user performs a strange operation on the touchpad. For instance, the user sometimes performs an operation such as a frequent operation in a region where there is no object to be selected on the screen and the repetitive rotation or the like of the finger on the touchpad. In this case, the screen display apparatus may determine that the determined direction of the operating device is wrongly recognized, and perform a process of reversing the determined direction of the operating device to an upper-lower direction automatically or after checking with the user.

In Embodiments 1 to 5, there is a case where, although the screen display apparatus has performed the cursor display based on the determined direction, the user switches the holding direction of the operating device by reversing the operating device to the upper-lower direction. In this case, it is determined that the direction determined by the screen display apparatus has been wrongly recognized. As a result, the screen display apparatus does not need to recognize the direction of the operating device immediately after the user switches the holding direction of the operating device. The screen display apparatus may recognize again the direction of the operating device when the application is switched next time or when the user switches the holding direction of the operating device after the elapse of a predetermined time.

In Embodiments 1 to 5, the screen display apparatus may present an application screen to the user so that the user naturally operates the touchpad. For example, it is possible to consider a method of presenting, as part of the application, a GUI such as opening a door with both hands when the lateral holding and the longitudinal holding of the operating device is switched between at the start of the application and within the same application.

The screen display apparatus makes it possible to cause the user to be least aware of a special operation for recognizing the direction of the operating device, by incorporating such a GUI into the application, and to increase the accuracy of recognizing the direction of the operating device accordingly.

In Embodiments 1 to 5, the screen display apparatus may present a GUI which indicates whether or not the direction of the operating device has been determined. It is possible to conceive, as the GUI, various methods such as changing a color and a depth, changing an object on the screen, a cursor position and shape, or the like, displaying a message, and notifying with sound.

For instance, before the direction of the operating device is determined, the screen display apparatus may perform transmissive display (a display) such as increasing the transmissivity of a cursor image, or display no cursor. After the direction of the operating device is determined, the screen display apparatus may display the cursor image as usual.

Embodiments 2 to 5 have described the case of the operating device including the two touchpads on its top surface. The configuration described in each of Embodiments 2 to 5 may be applied to an operating device including at least three touchpads on its top surface, an operating device collectively including a plurality of touchpads on both its top and bottom (back) surfaces, and so on.

Alternatively, the screen display apparatus may detect touches from one touchpad compatible with multi-touch. For example, even when the screen display apparatus according to each of Embodiments 2 to 5 includes only one touchpad, the screen display apparatus makes it possible to perform the same process by detecting touches with the finger from the one touchpad.

Embodiments 2 to 5 have described the case where the cursor display is free pointing (a free cursor). However, such display for the touchpad may be display by focusing on a specific object or the like.

Embodiments 2 to 5 have described the case where the two independent cursors are displayed for the right touchpad 802 and the left touchpad 803, respectively. However, a cursor common to the right touchpad 802 and the left touchpad 803 may be displayed. Different regions on the screen may be assigned to the right touchpad 802 and the left touchpad 803, respectively.

In the case of a screen display apparatus including a touchpad on a back surface of an output unit such as a screen, the user operates the touchpad with a finger other than a thumb (e.g., an index finger and a middle finger). Even in such a case, it goes without saying that the effect of the present invention can be obtained by using the characteristics resulting from the structure, shape, movement, and the like of each finger of a person.

The constituent elements of the display control device shown in FIGS. 2, 9, 17, 22, 24, and 30 may be realized as an LSI (Large Scale Integration) that is an integrated circuit. The constituent elements may be individually integrated on one chip or part or all of the constituent elements may be integrated on one chip. Although the LSI is mentioned here, the integrated circuit can also be called an IC (Integrated Circuit), a system LSI, a super LSI, and an ultra LSI, depending on differences in the degree of integration.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the constituent elements in the display control device.

Among the constituent elements of the display control device, only the unit which stores data may have a different configuration without being integrated on one chip.

The present invention can be realized not only as the display control device but also as a method including, as steps, processing units included in the display control device. The method is typically executed by a computer. Moreover, the present invention can be realized as a program causing the computer to execute the method. Furthermore, the present invention can be realized as a computer-readable recording medium on which the program is recorded such as a CD-ROM.

INDUSTRIAL APPLICABILITY

A display control device in the present invention properly displays an image or the like on a screen according to a user's natural operation on an operating device operated in various direction, and is applicable to, for example, a screen display apparatus such as a digital television.

REFERENCE SIGNS LIST

1, 2, 3, 4, 5, 6 Screen display apparatus
10, 20, 30, 40, 50, 60 Display control device
11, 21, 31, 41 Operating device
101, 801, 1601 Remote control
102 Touchpad
103, 804 Finger
104, 805 Screen
105, 806 Cursor
106 Eye
201, 901 Touch information detecting unit
202, 902 Touch information accumulation unit
203, 903, 1703, 2401 Direction determining unit
204, 904, 1704, 2203 Cursor position determining unit
205, 905, 2202 Screen data generating unit
206, 906 Display unit
300, 1000 Touch information
301, 1002 Operation ID
302, 1003 Position information
400, 1100 Touch information table
802 Right touchpad
803 Left touchpad
1001 Touchpad ID
1701 Sensor
1702 Sensor information detecting unit
2201 Alert data generating unit
2204 First sensor
2205 Second sensor

The invention claimed is:

1. A display control device which receives a signal from an operating device having a touchpad and generates screen data to be displayed on a screen, said display control device comprising:
   a touch information detecting unit configured to detect touch information including position information about a position of a finger of a user on the touchpad that is touched with the finger of the user during an operation of the touchpad;
   a direction determining unit configured to determine an orientation of the touchpad as intended by the user, using a characteristic which is indicated by the touch information detected by said touch information detecting unit and which results from a structure of the finger; and
   a screen data generating unit configured to generate the screen data depending on the orientation of the touchpad determined by said direction determining unit,
   wherein the characteristic is a shape of a trajectory formed by a movement of the position of the finger of the user indicated by the position information, and
   wherein said direction determining unit is configured to determine the orientation of the touchpad, such that (i) when the trajectory is convex, a convex side of the trajectory is an upper side of the touchpad, or (ii) when the trajectory is concave, a concave side of the trajectory is a lower side of the touchpad.

2. The display control device according to claim 1, wherein said direction determining unit is configured to determine, using the characteristic, whether the orientation of the touchpad upward, downward, left, or right as viewed by the user.

3. The display control device according to claim 1, wherein said direction determining unit is configured to determine, using the characteristic, the orientation of the operating device.

4. The display control device according to claim 1, further comprising a touch information accumulation unit configured to accumulate a plurality of touch information items including the touch information detected by said touch information detecting unit,
   wherein said direction determining unit is configured to determine the orientation using the characteristic indicated by the touch information items accumulated by said touch information accumulation unit.

5. The display control device according to claim 1, further comprising a cursor position determining unit configured to determine a display position of a cursor indicating a pointing position on the screen, from the position information in the touch information detected by said touch information detecting unit,
   wherein said cursor position determining unit is configured to determine the display position depending on the orientation determined by said direction determining unit, and said screen data generating unit is configured to generate the screen data for displaying the cursor at the display position determined by said cursor position determining unit.

6. The display control device according to claim 5, wherein said cursor position determining unit is configured to correct, when the orientation determined by said direction determining unit is different from a predetermined orientation for the operating device, the display position determined by the position information and the predetermined orientation, to determine the display position.

7. The display control device according to claim 1, further comprising an alert data generating unit configured to generate alert data for notifying the user of an alert,
wherein said alert data generating unit is configured to generate the alert data when the orientation determined by said direction determining unit is different from a predetermined orientation for the operating device.

8. The display control device according to claim 1, further comprising a sensor information detecting unit configured to detect held-part information that is information about a part of the operating device held by the user, from a sensor provided at an outer periphery of the operating device and detecting a touch by the user,
wherein said direction determining unit is configured to determine the orientation depending on the characteristic and the held-part information detected by said sensor information detecting unit.

9. The display control device according to claim 7, further comprising a sensor information detecting unit configured to detect gravity direction information that is information about a gravity direction of gravity on the operating device, from a sensor detecting the gravity direction,
wherein said direction determining unit is configured to determine the orientation depending on the characteristic and the gravity direction information detected by said sensor information detecting unit.

10. The display control device according to claim 1, further comprising:
an alert data generating unit configured to generate alert data for notifying the user of an alert; and
a sensor information detecting unit configured to detect held-part information that is information about a part of the operating device held by the user, from a sensor provided at an outer periphery of the operating device and detecting a touch by the user,
wherein said alert data generating unit is configured to generate the alert data when an orientation estimated, based on the held-part information detected by said sensor information detecting unit, as the orientation intended by the user is different from the orientation determined by said direction determining unit.

11. The display control device according to claim 1, further comprising:
an alert data generating unit configured to generate alert data for notifying the user of an alert; and
a sensor information detecting unit configured to detect gravity direction information that is information about a gravity direction of gravity on the operating device, from a sensor detecting the gravity direction,
wherein said alert data generating unit is configured to generate the alert data when an orientation estimated, based on the gravity direction information detected by said sensor information detecting unit, as the orientation intended by the user is different from the orientation determined by said direction determining unit.

12. The display control device according to claim 5, further comprising:
an alert data generating unit configured to generate alter data for notifying the user of an alert; and
a sensor information detecting unit configured to detect, from a first sensor, held-part information that is information about a part of the operating device held by the user, and detect, from a second sensor, gravity direction information that is information about a gravity direction of gravity on the operating device, the first sensor being provided at an outer periphery of the operating device and detecting a touch by the user, and the second sensor detecting the gravity direction,
wherein said cursor position determining unit is configured to determine the display position depending on the orientation determined by said direction determining unit, when an orientation estimated, based on the held-part information and the gravity direction information detected by said sensor information detecting unit, as the orientation intended by the user matches the orientation determined by said direction determining unit, and
said alert data generating unit is configured to generate the alert data when the orientation estimated, based on the held-part information and the gravity direction information detected by said sensor information detecting unit, as the orientation intended by the user does not match the orientation determined by said direction determining unit.

13. The display control device according to claim 1,
wherein said touch information detecting unit is configured to receive a signal from the operating device having two touchpads, and detect two touch information items each including position information about a position on one of the two touchpads which is touched with one of the user's fingers during an operation of the two touchpads, and
when two characteristics respectively indicated by the two touch information items detected by said touch information detecting unit match each other, said direction determining unit is configured to determine the orientation using one of the two characteristics.

14. A display control method for receiving a signal from an operating device having a touchpad, and generating screen data to be displayed on a screen, said display control method comprising:
detecting touch information including position information about a position of a finger of a user on the touchpad that is touched with the finger of the user during an operation of the touchpad;
determining an orientation of the touchpad as intended by the user, using a characteristic which is indicated by the touch information detected in said detecting and which results from a structure of the finger; and
generating the screen data depending on the orientation of the touchpad determined in said determining,
wherein the characteristic is a shape of a trajectory formed by a movement of the position of the finger of the user indicated by the position information, and
wherein said determining further determines the orientation of the touchpad, such that (i) when the trajectory is convex, a convex side of the trajectory is an upper side of the touchpad, or (ii) when the trajectory is concave, a concave side of the trajectory is a lower side of the touch pad.

15. A non-transitory computer-readable recording medium for use in a computer, said recording medium having a computer program recorded thereon for causing the computer to execute said display control method according to claim 14.

16. An integrated circuit which receives a signal from an operating device having a touchpad and generates screen data to be displayed on a screen, said integrated circuit comprising:
- a touch information detecting unit configured to detect touch information including position information about a position of a finger of a user on the touchpad that is touched with the finger of the user during an operation of the touchpad;
- a direction determining unit configured to determine an orientation of the touchpad as intended by the user, using a characteristic which is indicated by the touch information detected by said touch information detecting unit and which results from a structure of the finger; and
- a screen data generating unit configured to generate the screen data depending on the orientation of the touchpad determined by said direction determining unit,
- wherein the characteristic is a shape of a trajectory formed by a movement of the position of the finger of the user indicated by the position information, and
- wherein said direction determining unit is configured to determine the orientation of the touchpad, such that (i) when the trajectory is convex, a convex side of the trajectory is an upper side of the touchpad, or (ii) when the trajectory is concave, a concave side of the trajectory is a lower side of the touchpad.

\* \* \* \* \*